(12) United States Patent
Koide

(10) Patent No.: US 7,016,635 B2
(45) Date of Patent: Mar. 21, 2006

(54) IMAGE-FORMATION APPARATUS, CONTROLLING METHOD THEREOF AND IMAGE-FORMATION METHOD

(75) Inventor: Hiroshi Koide, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/167,844

(22) Filed: Jun. 28, 2005

(65) Prior Publication Data

US 2005/0254864 A1    Nov. 17, 2005

Related U.S. Application Data

(62) Division of application No. 10/846,705, filed on May 17, 2004, now Pat. No. 6,931,227, which is a division of application No. 10/308,062, filed on Dec. 3, 2002, now Pat. No. 6,760,559, which is a division of application No. 09/816,456, filed on Mar. 26, 2001, now Pat. No. 6,507,713.

(30) Foreign Application Priority Data

| Mar. 27, 2000 | (JP) | ................. 2000-86014 |
| May 26, 2000 | (JP) | ................. 2000-156933 |
| Jun. 6, 2000 | (JP) | ................. 2000-169516 |
| Jul. 6, 2000 | (JP) | ................. 2000-204531 |

(51) Int. Cl.
  *G03G 15/01*  (2006.01)
(52) U.S. Cl. .................. 399/299; 399/38; 399/167; 399/301
(58) Field of Classification Search ............... 399/301, 399/394, 395
  See application file for complete search history.

(56) References Cited

U.S. PATENT DOCUMENTS

| 5,565,965 A | 10/1996 | Costanza et al. ........... 399/167 |
| 5,970,286 A | 10/1999 | Numazu et al. ............ 399/167 |
| 6,070,041 A | 5/2000 | Nakayasu et al. .......... 399/301 |
| 6,085,053 A | 7/2000 | Saeki ........................ 399/165 |
| 6,104,899 A | 8/2000 | Hokari et al. ............... 399/165 |
| 6,574,451 B1 | 6/2003 | Miyasaka et al. ........... 399/401 |

FOREIGN PATENT DOCUMENTS

| JP | 63-081373 | 4/1988 |
| JP | 04-291365 A | * 10/1992 |
| JP | 05-229688 | 9/1993 |
| JP | 09-208075 | 8/1997 |
| JP | 10-246995 | 9/1998 |

* cited by examiner

*Primary Examiner*—Sophia S. Chen
(74) *Attorney, Agent, or Firm*—Oblon, Spivak, McClelland, Maier & Neustadt, P.C.

(57) ABSTRACT

An image formation apparatus is provided with a photosensitive drum, an optical writing device which writes an image on the outer surface of the photosensitive drum, a developing device which develops the image using toner an intermediate transfer belt onto which the toner image on the photosensitive drum is transferred, a rotation angle detection unit which detects the rotation angle of the photosensitive drum, an eccentric detection unit which detects the amount eccentricity of the photosensitive drum from the rotary axis of the photosensitive drum, and a correction unit which, obtains eccentricity of the photosensitive drum based on the amount eccentricity, the rotation angle and the radius of the photosensitive drum, and corrects a distortion and a color offset in the toner image based on the obtained eccentricity.

14 Claims, 32 Drawing Sheets

|    | O0 | O1 | O2 | O3 | O4 |
|----|----|----|----|----|----|
| S0 | D3 | D4 | D0 | D1 | D2 |
| S1 | D4 | D0 | D1 | D2 | D3 |
| S2 | D0 | D1 | D2 | D3 | D4 |
| S3 | D1 | D2 | D3 | D4 | D0 |
| S4 | D2 | D3 | D4 | D0 | D1 |

ROLLER SHAPE

ENTIRE DRIVING MOTOR ROTATION VELOCITY SIGNAL S3

*BACKGROUND ART*

IMAGE-FORMATION APPARATUS, CONTROLLING METHOD THEREOF AND IMAGE-FORMATION METHOD

CROSS-REFERENCE TO RELATED APPLICATIONS

The present application is a divisional of U.S. application Ser. No. 10/846,705 filed on May 17, 2004 now U.S. Pat. No. 6,931,227, which in turn is a divisional of U.S. application Ser. No. 10/308,062 filed Dec. 3, 2002, now U.S. Pat. No. 6,760,559, which in turn is a divisional of U.S. application Ser. No. 09/816,456 filed Mar. 26, 2001, now U.S. Pat. No. 6,507,713, and in turn claims priority to JP 2000-86014 filed on Mar. 27, 2000, JP 2000-156933 filed on May 26, 2000, JP 2000-169516 filed on Jun. 6, 2000, and JP 2000-204531 filed on Jul. 6, 2000, the entire contents of each of which are hereby incorporated herein by reference.

FIELD OF THE INVENTION

The present invention relates to an image formation apparatus and a control method thereof, and, more particularly, concerns an image formation apparatus that is provided with a rotary member and belts, such as a belt for transporting paper toward the rotary member or a transfer belt for allowing an image formed on the surface of the rotary member to be transferred on its own surface, and a control method of such an apparatus. Moreover, the present invention also relates to an image formation apparatus provided with a photosensitive drum and a belt, such as a transporting belt for transporting paper or an intermediate transfer belt, and an image formation method of such an apparatus, and a controlling device that is applicable to a mechanism that moves both a rotary member, which normally has eccentricities or deviations in its diameter, and a belt in an integral manner.

BACKGROUND OF THE INVENTION

In recent years, there is an ever-increasing demand for color image formation apparatuses capable of forming color images. One type of image formation apparatuses capable of forming color images at high speeds has an electrophotographic system of a tandem type. With respect to conventional image formation apparatuses of the tandem type, for example, the inventions disclosed in Japanese Patent Application Laid-Open Nos. 63-81373 and 10-246995 have been known.

Each of the inventions disclosed in the above-mentioned publications, Japanese Patent Application Laid-Open Nos. 63-81373 and 10-246995, has four photosensitive drums each of which has a scanning unit for applying a laser light beam to each of the four photosensitive drums so as to write a latent image thereon.

The four photosensitive drums are placed in parallel with each other in the transporting direction of the paper, which is transported by the transporting belt. Each of these is scanned (main-scanning process) in the direction of the rotary axis by a laser light beam directed from the scanning unit, while being rotated, so that a latent image is written thereon. Here, one line of the latent image written by one main-scanning process is hereinafter referred to as a scanning line.

On the surfaces of the four photosensitive drums bearing the latent images written thereon are supplied toners having respective colors of Y (yellow), M (magenta), C (cyan) and K (black) so as to adhere to the respective latent images. Thus, a toner image having one of the colors is formed on each of the surfaces of the four photosensitive drums. A sheet of paper is successively pressed onto the four photosensitive drums on which toner images have been formed. Consequently, the toner images of the respective colors are successively transferred the sheet of paper to form a color image.

In this case, if there is an offset between the scanning lines constituting the toner images of the respective colors in the color image thus formed, a so-called color offset will occur in the color image, resulting in degradation in the image quality. In order to prevent the color-offset, Japanese Patent Application Laid-Open No. 10-246955 has proposed an arrangement in which the photosensitive drums are designed to rotate freely, while an annular transport belt is driven to rotate by a motor so that the transport belt is made to contact the photosensitive drums by press-contact rollers installed below the transport belt. The four photosensitive drums are driven to rotate, following the transport belt. At this time, the four photosensitive drums are subjected to the same rotary force so that they are allowed to rotate at the same angular velocity, thereby making it possible to form a color image that is free from positional offsets between the scanning lines.

However, in image formation apparatuses such as printers and copying machines, there will be ever-increasing demands for high resolution (1200 dpi or more).

In contrast, the technique disclosed in Japanese Patent Application Laid-Open No. 10-246995 fails to meet these demands. In other words, in the technique disclosed in Japanese Patent Application Laid-Open No. 10-246995, the image distortion in the sub-scanning direction due to the eccentricity of the rotary axis of the photosensitive drum is corrected by detecting a outer surface dislocation and using the dislocation information continuously. However, when a high resolution is required, the actual amount of correction tends to deviate from the dislocation information in their correlation as the resolution becomes higher.

Moreover, in general, the photosensitive drum tends to have a slight eccentricity due to the limitation in its assembling precision. FIG. 43 is a drawing that shows a state in which a transfer belt is made to contact a photosensitive drum 1801 having such an eccentricity by a contact roller. The photosensitive drum 1801 shown in this Figure has a cross-section that is orthogonal to the rotary axis perpendicular to the paper surface, that passes through point O.

The photosensitive drum 1801 having the eccentricity rotates centered on the center axis passing through point O. In contrast, a transport belt 1802, which has an annular shape, is allowed to move in the direction of arrow A. A contact roller 1803 is made to contact the transport belt 1802 from below while being supported by a spring 1804 so that the transport belt 1802 is made to press-contact the photosensitive drum 1801. A sheet of paper, not shown, is made to press-contact the photosensitive drum 1801 by the press-contact roller 1803 through the transport belt 1802. Thus, a toner image formed on the surface of the photosensitive drum 1801 is transferred onto the sheet of paper.

The distance from point O to the outer surface of the photosensitive drum 1801 having the eccentricity varies depending on the angle of rotation when observed at a fixed point. For this reason, when the center of gravity of the photosensitive drum 1801 is located at $G_1$, the paper and the photosensitive drum 1801 are in contact with each other at press-contact position $P_1$, while when the center of gravity of the photosensitive drum 1801 is located at $G_2$, they are in contact with each other at press-contact position $P_2$.

The press-contact roller 1803 is allowed to move up and down to a certain degree since this is supported by a spring 1804. Since the press-contact roller 1803 also has an eccentricity, the press-contact position varies in a complex manner, thereby giving greater adverse effects to the angular velocity of the photosensitive drum 1801.

When the angular velocity of the photosensitive drum 1801 varies, the distance between scanning lines of a latent image to be written on the photosensitive drum 1801 becomes irregular, resulting in a distortion in the image to be formed. Moreover, in the case of a color image formation apparatus of the tandem type having a plurality of photosensitive drums in which multi-color toner images are superposed so as to form a color image, if the angular velocities of the photosensitive drums deviate, offsets occur in the transferring positions of the toner images of the respective colors, resulting in degradation in the image quality of an image to be formed.

Here, another arrangement has been proposed in which: the transferring position of a toner image is estimated through calculations, and based upon the results thereof, the image forming conditions are adjusted so as to make the transferring positions coincident with each other. However, when the angular velocity of the photosensitive drum 1801 varies, it becomes difficult to accurately estimate the transferring positions of the toner images, resulting in failure to adjust the transferring positions of the toner images through adjustments of the image formation apparatus. Therefore, in the image formation apparatus in which the angular velocity of the photosensitive drum varies, it is impossible to improve the image quality by eliminating the offsets in the transferring positions of the toner images through the adjustments of the image forming conditions.

Moreover, the color image formation apparatus of the tandem type is provided with a writing unit for each of the photosensitive drums. Here, the writing timings and properties of the optical systems in the respective writing units placed in the respective photosensitive drums are not necessarily coincident with each other. For this reason, the writing timing deviates for each of the photosensitive drums, and even when there is no eccentricity in each of the photosensitive drums, there might be deviations in the transferring positions for the toner images of the respective colors.

Furthermore, the radius of each of the photosensitive drums tends to have a slight deviation due to the limitation in the processing precision. In this case also, deviations tend to occur in the transferring positions in the toner images of the respective colors, regardless of the eccentricity of each of the photosensitive drums.

In the future, along with the ever-increasing demands for high-quality printing with high resolution (1200 dpi or more), very high-precision photosensitive drums have to be produced in order to solve the above-mentioned problems. Taking into consideration the development of the technology in the future, it will be possible to improve the processing precision of the photosensitive drum to a certain extent; however, there will be a limitation in the improvement of the processing precision.

SUMMARY OF THE INVENTION

One of the objectives of the present invention is to provide an image formation apparatus which, even when high resolution is required for forming an image, sufficiently prevents a distortion and a color offset in the sub-scanning direction of an image, and makes deviations in the sub-scanning pitch due to the eccentricity of the photosensitive drum less conspicuous so that image data in the sub-scanning direction is outputted in the same timing as the case having neither eccentricity in the photosensitive drum nor deviations in the drum, and makes it possible to cut production costs and also to form correction data for correcting distortions and color offsets in the image in the sub-scanning direction with high precision.

Moreover, another objective of the present invention is to provide an image formation apparatus and a control method for the image formation apparatus, in which, independent of the states of respective image formation apparatuses such as eccentricity due to deviations at the time of assembling photosensitive drums, deviations in the writing timing of writing units and deviations in the radii of the photosensitive drums, toner images of the respective colors are transferred on a sheet of paper on the transfer belt without positional offsets, thereby making it possible to form high-quality images.

Furthermore, still another objective of the present invention is to provide an image formation apparatus and a control method for the image formation apparatus, in which independent of the states of respective image formation apparatuses such as eccentricity due to deviations at the time of assembling photosensitive drums and deviations in the radii of the photosensitive drums, toner images of the respective colors are transferred on a sheet of paper on the transfer belt without positional offsets, thereby making it possible to form high-quality images.

An image formation apparatus in accordance with the present invention is provided with: a photosensitive drum, an optical writing device which carries out an optical writing process in the main-scanning direction on the outer surface of the photosensitive drum at least line by line, a developing device which develops an electrostatic latent image optically written on the photosensitive drum by using toner, a transport member that is allowed to move in synchronism with the photosensitive drum while being pressed onto the photosensitive drum to transport a sheet of paper so that the toner image on the photosensitive drum is transferred on the sheet, or an intermediate transfer belt which transfers the toner image located on the photosensitive drum, that is shifted in synchronism with the photosensitive drum while being pressed onto the photosensitive drum, a rotation angle detection unit which detects the rotation angle of the photosensitive drum directly or indirectly, an eccentricity detection unit which detects the eccentric position from the rotary axis of the photosensitive drum located in the center of the circle cross-section of the photosensitive drum, and a correction unit which, based upon the results of detection by the rotation angle detection unit and the eccentricity detection unit, finds the amount of eccentricity of the photosensitive drum, the eccentric rotation angle and the radius of the photosensitive drum, and based upon the resulting values, corrects a distortion and a color offset in the toner image that has been transferred on the sheet or the intermediate transfer belt. With this arrangement, based upon the amount of eccentricity of the photosensitive drum, the eccentric rotation angle and the radius of the photosensitive drum, the distortion and color offset in the toner image that has been transferred are corrected so that, even when high resolution is required for forming an image, it is possible to sufficiently prevent the distortion and color offset in the sub-scanning direction of the image.

Moreover, another image formation apparatus in accordance with the present invention is provided with: at least one rotary member such as a photosensitive drum that is pressed onto the belt directly or indirectly and allowed to integrally rotate with the shift of the belt; a belt driving unit which moves the belt, or a rotary member driving unit which rotates the rotary member such as the photosensitive drum; and at least one of a rotary member load correction unit for correcting variations in the load imposed on the rotary member such as the photosensitive drum and a belt load correction unit for correcting variations in the load imposed on the belt. With this arrangement, it is possible to regulate the variations in the load imposed on the rotary member such as the photosensitive drum or the belt, and consequently to reduce the amount of the load variations transmitted to the belt such as the transport belt or the intermediate transfer belt; therefore, it becomes possible to prevent a slip from occurring between the belt or the sheet of paper and the rotary member such as the photosensitive drum.

Moreover, a control method for an image formation apparatus in accordance with the present invention, which is a control method for an image formation apparatus that is provided with a plurality of photosensitive drums for forming images, has at least one of an eccentricity detection step of detecting the eccentricity of each photosensitive drum, a measuring step of measuring the radius of each photosensitive drum and a distance detection step of detecting the distance between the photosensitive drums, and a detection function, placed at a certain portion thereof, for detecting the rotation angle of each photosensitive drum or for detecting the shift of the belt; thus, the positioning of the rotation angle is carried out independently for each photosensitive drum. With this arrangement, although variations in density occur in each latent image formed on the photosensitive drum due to the eccentricity of each photosensitive drum, a toner image, formed on a sheet of paper or the intermediate transfer belt by superposing the latent images, has a state of variations in density that are virtually made coincident with each other; thus, it becomes possible to obtain a high-quality image.

Moreover, still another image formation apparatus in accordance with the present invention, which is an image formation apparatus that uses a plurality of photosensitive drums for forming images, has at least one of an eccentricity detection unit which detects the eccentricity of each photosensitive drum, a measuring unit which measures the radius of each photosensitive drum and a distance detection unit which detects the distance between the photosensitive drums, and a detection unit, placed at a certain portion thereof, for detecting the rotation angle of each photosensitive drum or for detecting the shift of the belt; thus, the positioning of the rotation angle is carried out independently for each photosensitive drum. With this arrangement, although variations in density occur in each latent image formed on the photosensitive drum due to the eccentricity of each photosensitive drum, a toner image, formed on a sheet of paper or the intermediate transfer belt by superposing the latent images, has a state of variations in density that are virtually made coincident with each other; thus, it becomes possible to obtain a high-quality image.

Another control method for an image formation apparatus of the present invention, which is a control method for an image formation apparatus having at least one rotary member such as a photosensitive drum that is pressed onto the belt directly or indirectly and allowed to integrally rotate with the shift of the belt; and a belt driving unit which moves the belt, or a rotary member driving unit which rotates the rotary member such as the photosensitive drum, is provided with at least one of a rotary member load correction step of correcting variations in the load imposed on the rotary member such as the photosensitive drum and a belt load correction step of correcting variations in the load imposed on the belt. With this arrangement, it is possible to regulate the variations in the load imposed on the rotary member such as the photosensitive drum or the belt, and consequently to reduce the amount of the load variations transmitted to the belt such as the transport belt or the intermediate transfer belt; therefore, it becomes possible to prevent a slip from occurring between the belt or the sheet of paper and the rotary member such as the photosensitive drum.

Moreover, still another image formation apparatus in accordance with the present invention, which is an image formation apparatus having at least one rotary member that is pressed onto a belt directly or indirectly and allowed to rotate following the shift of the belt and a driving roller for driving the belt, is provided with a driving-roller drive unit which drives the driving roller, a rotary-member driving unit which drives the rotary member, a load variation detection unit which detects load variations in the belt and a control unit which controls the operation of the driving-roller drive unit or the rotary-member driving unit in accordance with variations in the load of the belt. The present invention is supposed to be used for an image formation apparatus provided with at least a rotary member that is pressed onto an annular belt for transporting, for example, a sheet of copy paper, directly or indirectly, with the paper interpolated in between, and allowed to move following the shift of the belt, and a driving roller for driving the belt. The driving-roller drive unit drives the belt. Moreover, the rotary-member driving unit drives the rotary member. The load variation detection unit detects the load variation imposed on the belt. The control unit controls the operations of the driving-roller drive unit and the rotary-member driving unit in accordance with variations in the load of the belt. With thins arrangement, it is possible to detect a load transmitted from the rotary member to the belt, and based upon the results of the detection, the driving operation of the rotary member is controlled so as to cope with the entire load imposed on the driving roller, thereby making it possible to eliminate a slip on the belt. Therefore, the image formation apparatus is readily applied to a high-quality printing operation.

Furthermore, still another image formation apparatus in accordance with the present invention, which is provided with at least a rotary member that rotates while being pressed onto the belt directly or indirectly, a velocity detection unit which detects at least one of the shifting velocity of the belt and the velocity related to the rotary member, and a control unit, and in the system having the velocity detection unit and the control unit, a velocity setting unit which sets the shifting velocity of the belt and the rotation velocity of the rotary member to velocities that allow the belt and the rotary member to move integrally is further installed. With this arrangement, even when there is a variation in the shape of each rotary member, it is possible to prevent a slip from occurring between the rotary member and the belt, between rotary member and the sheet of paper, or between the sheet of paper and the belt.

Moreover, still another image formation method in accordance with the present invention, which is an image formation method applied to an image formation apparatus having at least one rotary member that is pressed onto a belt directly or indirectly and allowed to rotate following the shift of the belt and a driving roller for driving the belt, is provided with a driving-roller driving step for driving the driving roller, a rotary-member driving step for driving the rotary member, a load variation detection step which detects load variations in the belt and a control step for controlling the operation of the driving roller or the rotary member in accordance with variations in the load of the belt. The present invention relates to an image formation method for controlling an image formation apparatus provided with at least a rotary member that is pressed onto an annular belt for transporting, for example, a sheet of copy paper, directly or indirectly, with the paper interpolated in between, and allowed to move following the shift of the belt, and a driving roller for driving the belt. The driving-roller driving step drives the belt. Moreover, the rotary-member driving step drives the rotary member. The load variation detection step detects the load variation imposed on the belt. The control step controls the operations of the driving roller and the rotary member in accordance with variations in the load of the belt. With this arrangement, it is possible to detect a load transmitted from the rotary member to the belt, and based upon the results of the detection, the driving operation of the rotary member is controlled so as to cope with the entire load imposed on the driving roller, thereby making it possible to eliminate a slip on the belt. Therefore, the image formation apparatus is readily applied to a high-quality printing operation.

Furthermore, still another image formation method in accordance with the present invention, which is an image formation method for controlling at least a rotary member that rotates while being pressed onto the belt directly or indirectly, is provided with a velocity detection step which detects at least one of the shifting velocity of the belt and the velocity related to the rotary member, and a control step, and in the system having the velocity detection step and the control step, a velocity setting step for setting the shifting velocity of the belt and the rotation velocity of the rotary member to velocities that allow the belt and the rotary member to move integrally is further provided. With this arrangement, even when there is a variation in the shape of each rotary member, it is possible to prevent a slip from occurring between the rotary member and the belt, between rotary member and the sheet of paper, or between the sheet of paper and the belt.

Other objects and features of this invention will become apparent from the following description with reference to the accompanying drawings.

DESCRIPTION OF THE PREFERRED EMBODIMENTS

Figure 1:
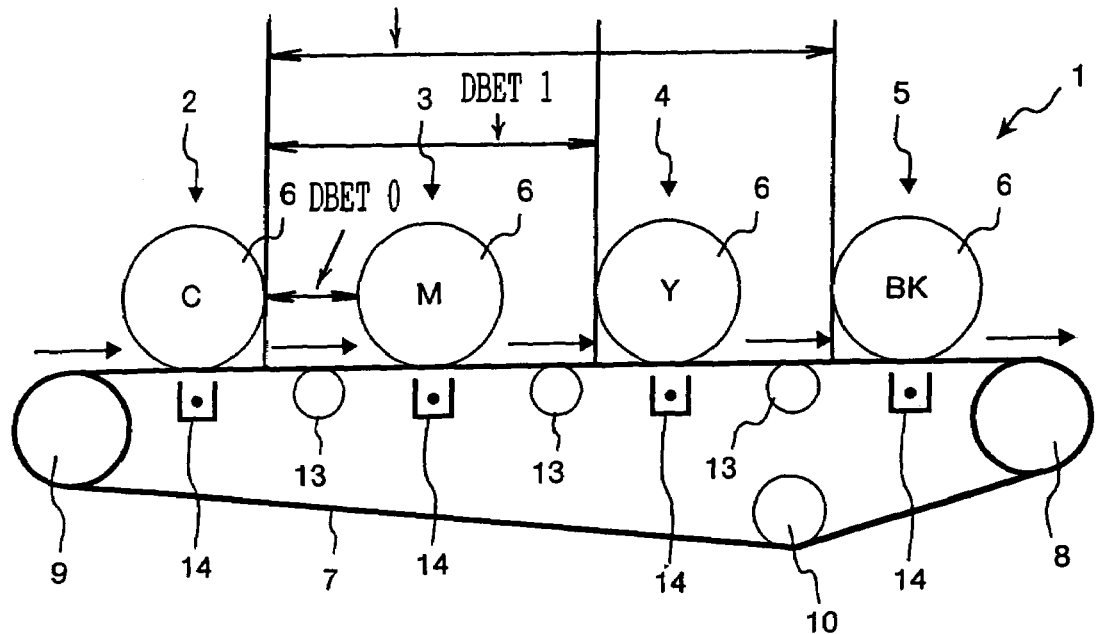
FIG. 1 is a conceptual drawing that shows the schematic structure of an image formation apparatus in accordance with the present invention.

The following description will discuss one embodiment of the present invention as a first embodiment. FIG. 1 is a conceptual drawing that shows a schematic structure of an image formation apparatus in accordance with the first embodiment of the present invention. This image formation apparatus 1 is an image formation apparatus of a tandem type for forming a color image on a sheet such as paper in the electrophotographic system, and has four image forming sections 2, 3, 4 and 5 that are aligned in a row. The image forming sections 2, 3, 4 and 5 are respectively provided with photosensitive drums 6, 6, .... Although not shown in FIG. 1, on the periphery of each of the photosensitive drums 6, devices having known structures for carrying out an image forming operation in the electrophotographic process, such as a charging device for charging each photosensitive drum 6, an optical scanning unit that is an optical writing device for optically writing an electrostatic latent image on each photosensitive drum 6, a developing device which develops the electrostatic latent image with toner and a cleaning device for removing residual toner from each photosensitive drum 6, are installed. The four image forming sections 2, 3, 4 and 5 form images having respective colors of C (cyan), M (magenta), Y (yellow) and Bk (black) on a sheet of paper.

An endless conveyor belt 7 serving as a transport member is placed below the image forming sections 2, 3, 4 and 5. This conveyor belt 7 is allowed to pass over a driving roller 8, a driven roller 9 and a tension roller 10. The conveyor 7, which is driven by a driving roller 8, forms a transport path on which a sheet of paper is successively transported to the image forming sections 2, 3, 4 and 5.

Figure 2:
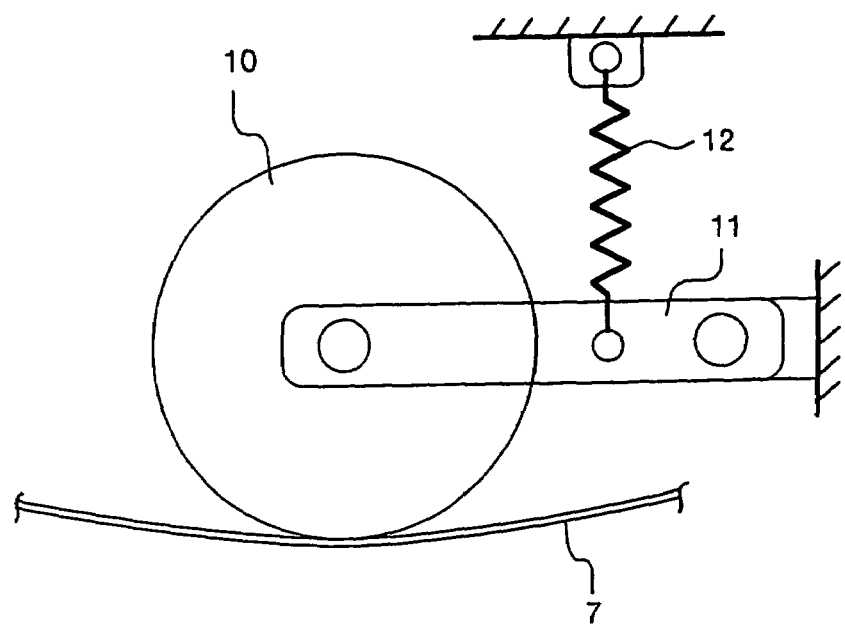
FIG. 2 is a front view that shows the structure of a tension roller in the image formation apparatus.

As illustrated in FIG. 2, the tension roller 10, which is supported on one end of a shaft 11 so as to freely rotate thereon, with the shaft 11 being freely rotatably attached to the frame of the image formation apparatus 1, is pressed by a spring 12 so that it is possible to prevent the conveyor belt 7 from slackening and also to press the conveyor belt 7 onto photosensitive drums 6, 6, ... along their tangential lines. In order to assist the press-contact between the endless conveyor belt 7 forming the paper transport path and the photosensitive drums 6, 6, ..., press-contact rollers 13, 13, ... are placed between the respective photosensitive drums 6,6. The press-contact rollers 13, 13, ... are supported so as to freely rotate, and pressed by a spring so as to be pressed against the conveyor belt 7. Thus, when the driving roller 8 is rotated by a driving motor, not shown, the conveyor belt 7 is transported at a constant velocity, the sheet of paper on the conveyor belt 7 is transported at a constant velocity, and the photosensitive drums 6, 6, ... are driven by the conveyor belt 7 to rotate.

At press-contact portions between the conveyor belt 7 and the photosensitive drums 6, 6, ... below the conveyor belt 7, transferring corona chargers 14, 14, ... each of which transfers a toner image of each photosensitive drum 6 onto the sheet of paper when the sheet of paper on the conveyor belt 7 is located below the respective photosensitive drums 6, 6, ... are placed.

Figure 3:
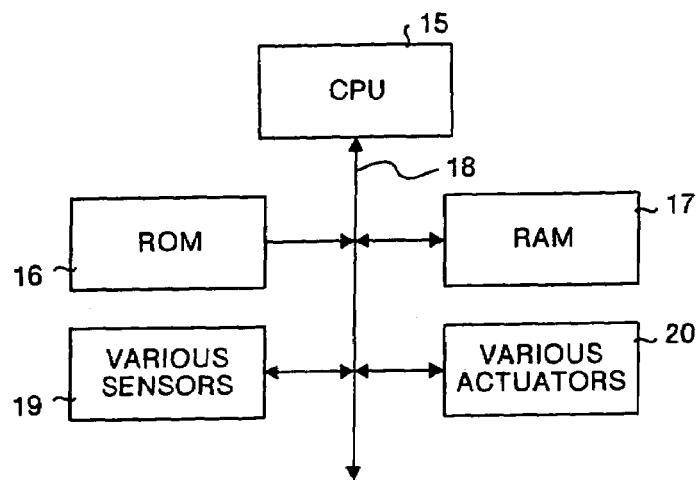
FIG. 3 is a block diagram that shows an electrical connection of a control system in the image formation apparatus.

FIG. 3 is a block diagram that shows electrical connections in a control system of the image formation apparatus 1. As illustrated in FIG. 3, in this control system, a CPU 15 for carrying out various calculations and for controlling the respective parts in a concentrated manner, a ROM 16 for storing fixed data such as various control programs and a RAM 17 for providing a work area for the CPU 15 are connected by a bus 18. Various sensors 19 and various actuators 20 are connected to the bus 18. The various sensors 19 include a linear encoder 22, which will be described later, and various detectors such as an exposure starting position detector 24, a paper leading position passage detector 25 and a reference position error detector 26, which will be described later. The various actuators 20 include motors for driving the photosensitive drum 6, the driving roller 8 and the press-contact rollers 13, which will be described later.

Referring to the following items 1 to 9, an explanation will be given of the idea of a controlling operation of the image formation apparatus 1 that is realized by the CPU 15 following a control program stored in the ROM 16.

1. Concerning the Shifting Velocity of the Conveyor Belt 7 and the Rotation Angular Velocity of the Photosensitive Drum 6

First, an explanation will be given of the relationship between the shifting velocity of the conveyor belt 7 and the rotation angular velocity of the photosensitive drum 6. Based on this, a rotation angle detection unit is realized.

Figure 4:
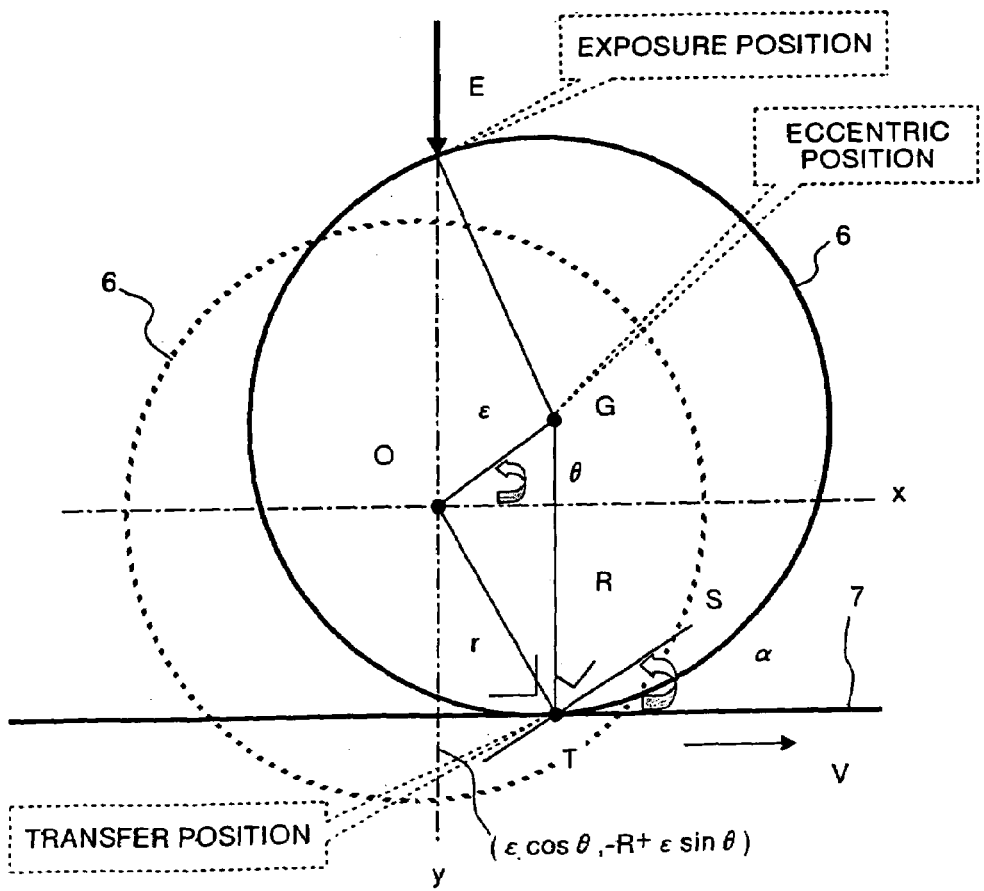
FIG. 4 is an explanatory drawing that explains the relationship between the shifting velocity of a transport belt and the rotation angular velocity of a photosensitive drum in the image formation apparatus.

The structure in FIG. 1 can be shown as a model as illustrated in FIG. 4. In FIG. 4, supposing that $\epsilon$ is an amount of eccentricity and $\theta$ is an angle of the eccentric position with respect to the x-axis, the shifting velocity of a contact point T between the conveyor belt 7 (hereinafter, referred to simply as "belt") and the photosensitive drum 6 (hereinafter, referred to simply as "drum") is represented as coordinates as follows:

$$(-\epsilon \sin\theta\cdot\omega, \epsilon \cos\theta\cdot\omega), \omega=d\theta/dt \qquad (1).$$

Therefore, the velocity Vs in the rotation direction S around the drum rotation center O is represented by the following equation:

$$V_s = V\cos\alpha - \epsilon\sin\theta\cdot\omega\cdot\cos\alpha + \epsilon\cos\theta\cdot\omega\cdot\sin\alpha \qquad (2)$$

Here, V is the belt shifting velocity, and $\alpha$ represents an angle made by the belt and a line that is orthogonal to a line r connecting the drum rotation center and the contact point at the position of the contact point T.

Therefore, the following equation is satisfied:

$$\omega = Vs/r = (V\cos\alpha - \epsilon\sin\theta\cdot\omega\cdot\cos\alpha + \epsilon\cos\theta\cdot\omega\cdot\sin\alpha)/r \quad (3)$$

Then, from the general formula of cosine, the following equation holds:

$$r^2 = R^2 + \varepsilon^2 - 2R\varepsilon\cos(\pi/2 - \theta) \quad (4)$$
$$= R^2 + \varepsilon^2 - 2R\varepsilon\sin\theta$$

Here, R represents the drum radius.

From the theorem of sine, the following equations hold:

$$\varepsilon/\sin\alpha = r/\sin(\pi/2 - \theta) \quad (5)$$
$$= r/\cos\theta$$
$$\sin\alpha = \varepsilon\cos\theta/r, \cos\alpha = (R - \varepsilon\sin\theta)/r \quad (6)$$

Here, substituting (4) and (5) to (3) forms:

$$\omega = \{VR - (V+\omega R)\epsilon\sin\theta + \omega\epsilon^2\}/(R^2+\epsilon^2-2R\epsilon\sin\theta),$$

Therefore, the following equation holds:

$$\omega(R^2+\epsilon^2-2R\epsilon\sin\theta) = VR - (V+\omega R)\epsilon\sin\theta + \omega\epsilon^2$$

$$V = R\omega \quad (7)$$

As clearly shown by the above description, even in the case when there is an eccentricity, if the belt shifting velocity V is constant without a slip, the rotation angular velocity of the drum is made constant in the same manner.

Figure 9:
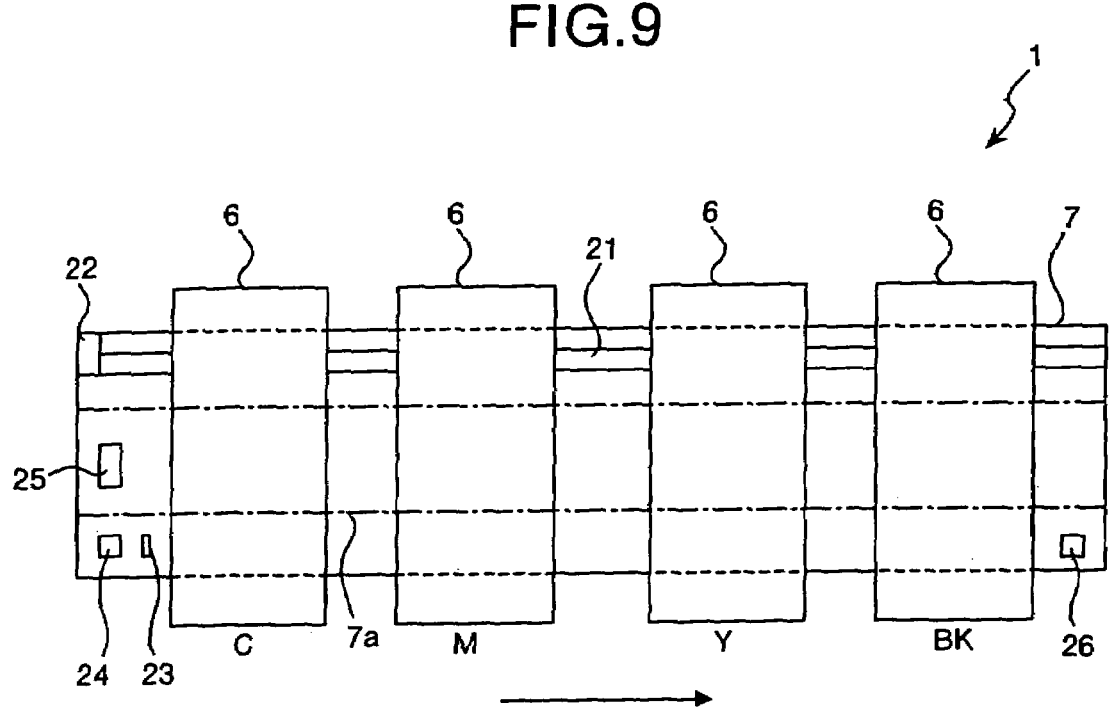
FIG. 9 is a plan view that shows respective photosensitive drums and a transport belt in the image formation apparatus.

Therefore, when a detector for detecting the movement or the absolute position of the belt (for example, as illustrated in FIG. 9, timing marks 21 having constant intervals are put on the edge of the belt on which no paper passes (portions outside the area indicated by symbol 7a) with a reference mark 23 being also put on the belt, and these marks 21 and 23 are detected so that the absolute position is recognized by a linear encoder 22, a leading position detector 25, etc.) is installed, it is possible to detect the reference position of the drum rotation (the detection being made by outputting one pulse for each rotation), and consequently to identify the rotation angle position of the drum, without the need of a rotary encoder that is used for detecting the rotation angle, and is capable of detecting the absolute position of each drum. Then, for example, the drum is rotated and the linear encoder 22 measures one cycle of the drum rotation detected by the reference position detector (the detector for detecting the reference angle position by outputting one pulse for each rotation of the photosensitive drum) so that the rotation angle of the drum that is rotated per one pulse of the output of the linear encoder 22 is found.

In contrast, one of the four drums of the tandem type may be provided with a detector such as a rotary encoder for measuring the absolute rotation angle with the other drums being provided with the reference position detectors for measuring the reference position of the rotation, and in order to detect the position of the belt, only the reference position of the belt may be detected; thus, it becomes possible to find the position on the belt or the rotation angle of each of the drums. In this case, however, since, based upon the radius of the one selected drum, measurements are made on the rotation angle positions of the four drums and the position of the belt, the corresponding errors arise. In other words, in this system, a slight magnification error may occur in the transferred image with respect to the sheet of paper.

Moreover, the rotation angular velocity of each drum may be controlled so as to have a constant rotation angular velocity in accordance with the disc radius thus, it becomes possible to eliminate a slip.

Figure 5:
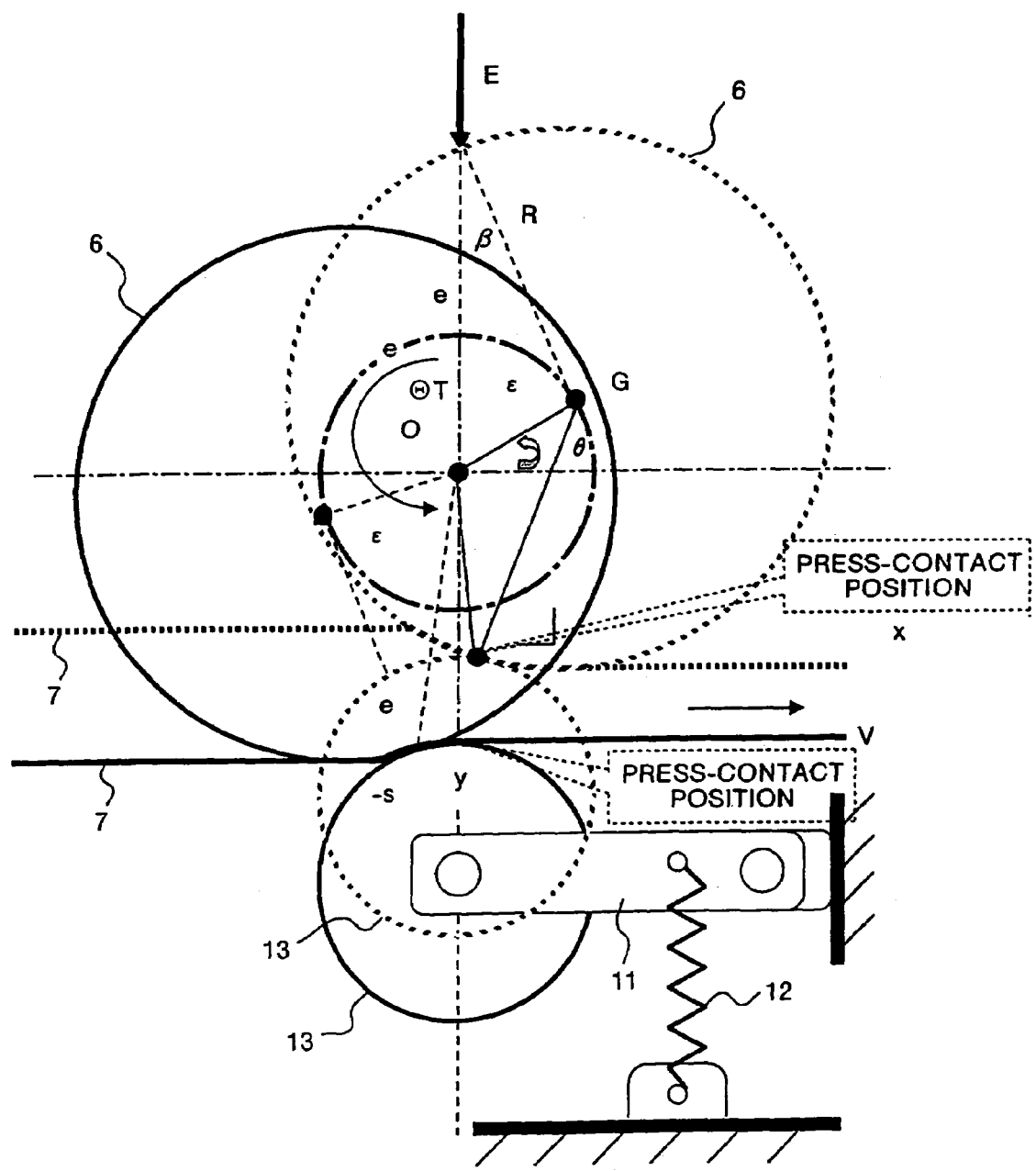
FIG. 5 is an explanatory drawing that explains the relationship between the shifting velocity of a transport belt and the rotation angular velocity of a photosensitive drum in a conventional image formation apparatus.

Even when there is an eccentricity in the drum, the contact portion between the belt and drum does not form a maximum value (apex) on the drum circle cross-section in the direction on the belt side; however, in the structure of the conventional image formation apparatus (see FIG. 5), since the rotation velocity of the drum is not constant even when the belt velocity is constant, it is clear that the above-mentioned effect is not obtained. In other words, in the structure of the conventional technique, the drum and the belt are pressed to contact each other by a spring force of the press-contact roller so as to transmit the driving force to the drum. Since the contact portion of the belt and the drum is located on the lower portion of the drum rotary axis, that is, in the proximity of the Y-axis in FIG. 4, it is clear that the rotation angular velocity of the drum varies due to the eccentricity.

2. Detection of the Eccentric Position of the Photosensitive Drum 6

Next, an explanation will be given of the detection of the drum eccentric position. Based upon this, an eccentricity detection unit is realized.

(1) System for Detecting Variations in the Reflection Angle

Figure 6:
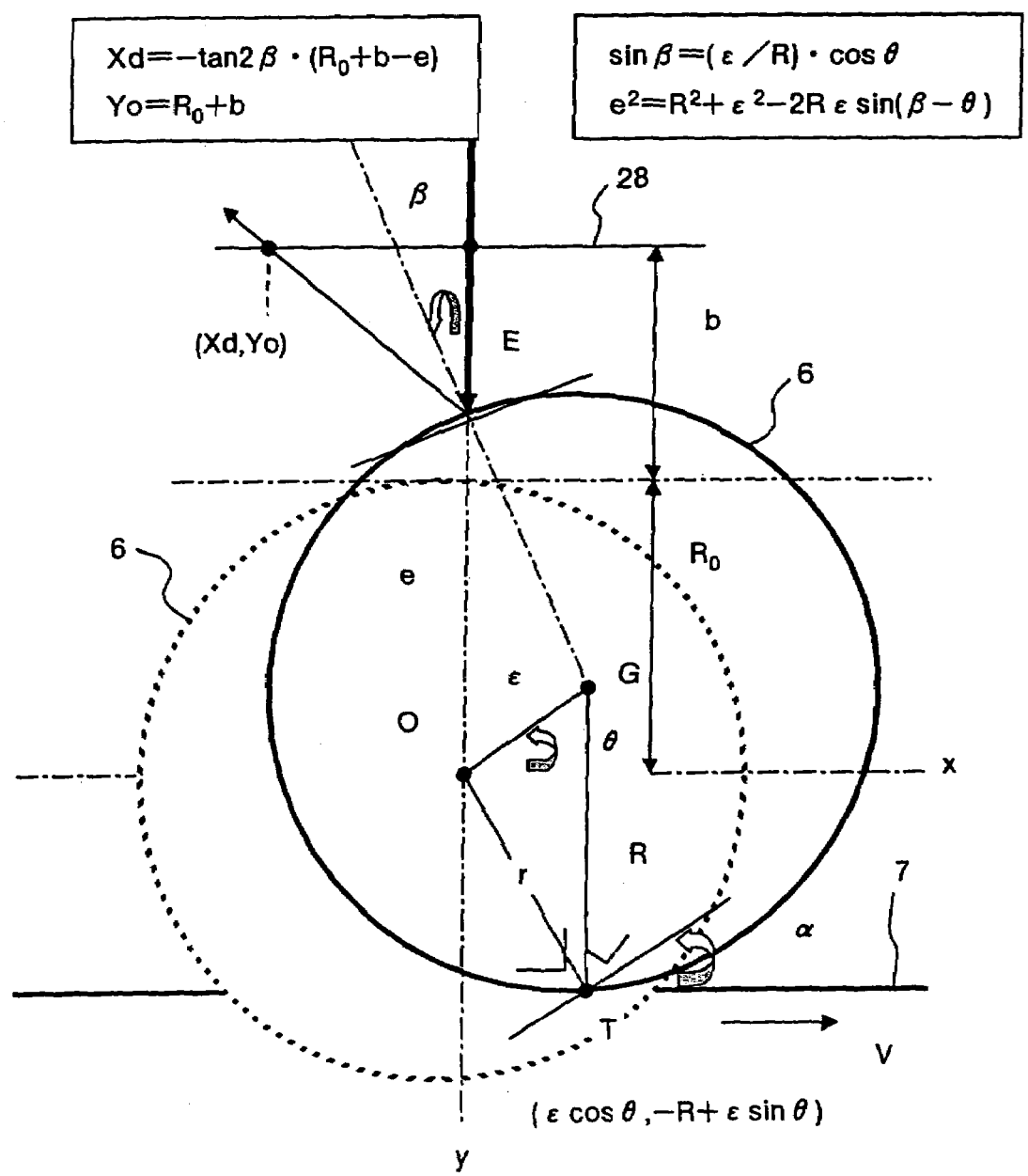
FIG. 6 is a drawing that explains an eccentric position detecting unit which detects the eccentric position of the photosensitive drum of the image formation apparatus.

In FIG. 6, a fluctuation in the x-axis direction in the reflected light of an exposing light beam that is made incident on the drum diagonally to the perpendicular cross-section on the paper face including the y-axis is detected by a position sensor 28 that is placed at a position indicated by "$Y = R_0 + b$" as shown in FIG. 6. Thus, the eccentric position can be measured when the drum is rotated. The rotation angle of the drum is detected by a rotary encoder, not shown, that is moved in association with the drum. The encoder may be a known device of a type capable of measuring the absolute angle, or may be one of a type that detects by using the aforementioned linear encoder 22, etc.

The rotation angle $\theta = \pi/2$ or $\theta = 3\pi/2$ of the eccentric position from the x-axis can be measured in the following manner. In the case when the light scanning width on the position sensor 28 is W, a position that satisfies 1/2W is detected, and this position corresponds to $\theta = \pi/2$. When this position is determined, each shift of rotation of $\pi/2$ detected by the rotation angle detection encoder in accordance with the drum rotation provides a position $\theta = 0$ or $\theta = \pi$. At this time, the position Xd of the beam directed onto the position sensor 28 is measured so as to find $\epsilon$.

Figure 7:
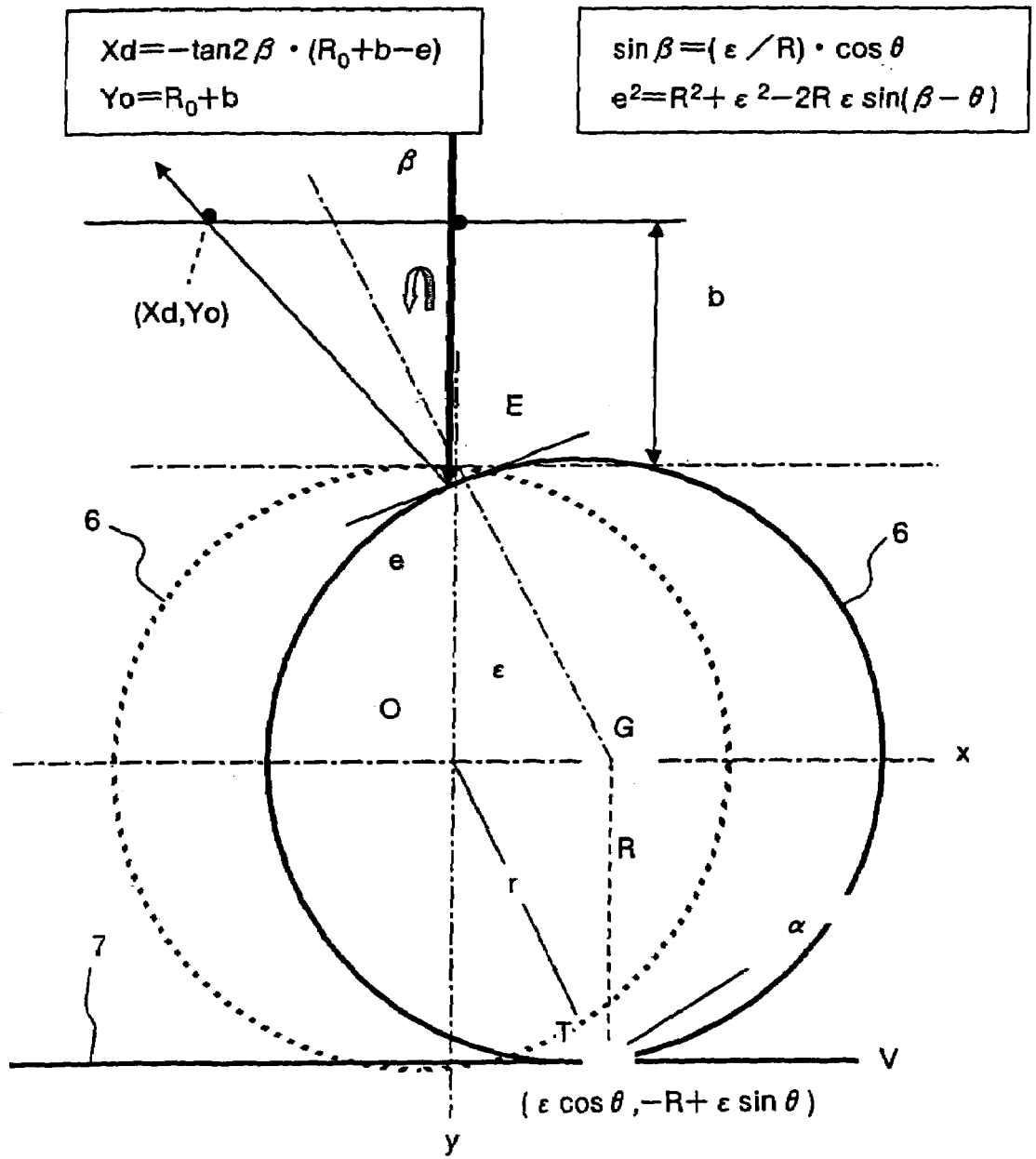
FIG. 7 is a drawing that explains the an eccentric position detecting unit which detects the eccentric position of the photosensitive drum of the image formation apparatus.

FIG. 7 shows a state in which the eccentric position is at a position on the x-axis, that is, $\theta = 0$.

In FIG. 7, the following equation holds:

$$Xd = \tan 2\beta \cdot (R_0 + b - E) \quad (8)$$

Here, $R_0$ represents the radius of an ideal drum that has an ideal shape (having no error in the drum shape), $\beta$ is an incident angle of light that is made incident on the exposing position E in FIG. 7 and reflected.

Here, the following equations hold:

$$\epsilon/R = \sin\beta \quad (9)$$

$$\tan 2\beta = 2\sin\beta\cos\beta/(\cos^2\beta - \sin^2\beta) = 2(\epsilon/R)\{1-(\epsilon/R)^2\}^{1/2}/\{1-2(\epsilon/R)^2\} \quad (10)$$

$$E(R^2-\epsilon^2)^{1/2} \tag{11}$$

$$Xd=2(\epsilon/R)\{1-(\epsilon/R)^2\}^{1/2}/\{1-2(\epsilon/R)^2\}\times[R_0+b-R\cdot[1-(\epsilon/R)^2]^{1/2}] \tag{12}$$

Here supposing that $\epsilon/R=\rho$, \hfill (13)

$$4R^2\rho^6+8RXd\rho^5+\{4Xd^2-8R^2+4(R_0+b)^2\}\rho^4-12RXd\rho^3+ \\ 4\{-Xd^2+R^2+(R_0+b)^2\}\rho^2+4RXd\rho+Xd^2=0 \tag{14}$$

Since R is detected by another means that will be explained below, when Xd is detected, $\epsilon$ is found. In fact, the solutions of equations using R and Xd as parameters are prepared as a table in ROM 16, etc., and this table may be looked up.

As described above, the eccentric position ($\theta$, $\epsilon$) is found from the x-axis of the drum.

(2) Dislocation Detecting System of the Surface on the Photosensitive Drum 6

This system, which detects the outer surface dislocation due to an eccentricity in the drum, uses a detector that is constituted by, for example, a light-emitting element for releasing an optical beam onto the dislocation detection position on the drum outer surface, a light-receiving element for receiving the light beam reflected by the drum (for example, two-division photodiode elements) and an optical system which allows light detected on the light-receiving element to vary due to variations of the drum outer surface caused by the eccentricity (for example, an optical system using a focus-error detection system, etc., used in an optical disk). With this arrangement, a photocurrent, which corresponds to the variation in the distance between the detector and the detection position, is allowed to flow through the light-receiving element. By detecting this, it is possible to detect the position of the eccentricity. Moreover, when the photosensitive drum is rotated, the zero-cross point of the change in the output signal and the peak position are detected so that, based upon the relationship of these and the set position of the detector, the eccentric position ($\theta$, $\epsilon$) from the x-axis is found.

In this image formation apparatus 1, it is only necessary to detect where the eccentric position ($\theta$, $\epsilon$) is located on the drum rotation angle. In other words, in the image formation apparatus 1, since the drum rotation angle is detected by another means as described earlier, it is only necessary to find where the eccentric position, detected by either of the above-mentioned two means (1) and (2), is located on the rotation angle of the photosensitive member and how much amplitude $\epsilon$ it has.

3. Concerning the Angle from the Exposing Position to the Transferring Position

Next, an explanation will be given of a means for finding the angle from the exposing position on the drum to the transferring position of the toner image on a sheet of paper. Based upon this, a correction unit is realized.

Figure 8:
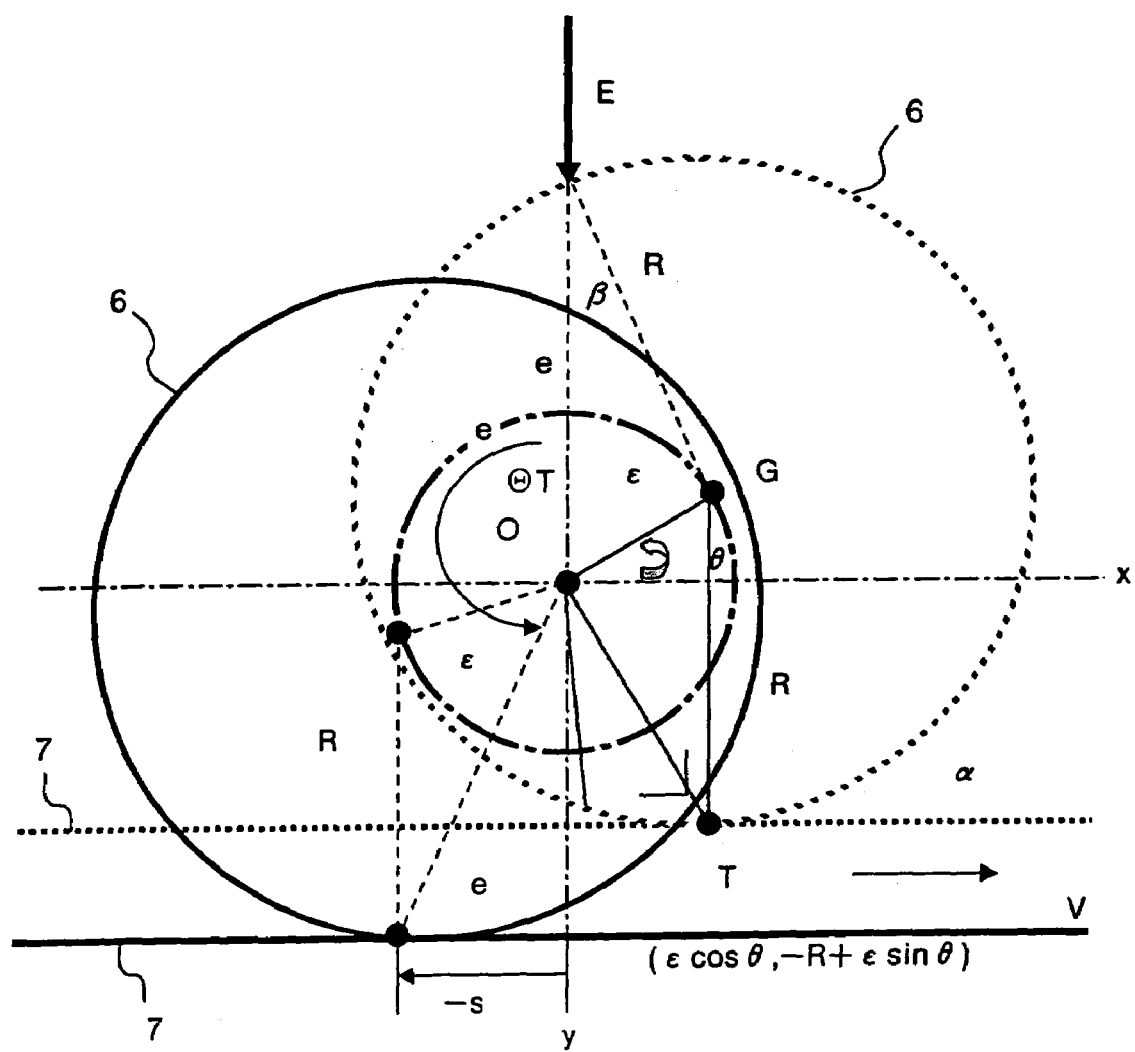
FIG. 8 is a drawing that explains a means for finding the angle from an exposing position to a transferring position in the image formation apparatus.

In FIG. 8, (in FIG. 8, for convenience of explanation, position E, which faces the belt with respect to the center axis of the photosensitive drum rotation, is selected as the exposing position), a triangle OGE indicated by a dotted line, which is determined at the time of exposure, is used for determining the transferring position. In other words, an image (indicated by a dotted line on the drum in FIG. 8), which has been exposed at a position (here, referred to as an eccentric position) at which the drum center of gravity (the center of the drum circle cross-section) G makes a rotation angle $\theta$ (angle GOx), is transferred at a position (x=−s) that is dislocated from an ideal transferring position (x=0) after having been rotated with a rotation angle $\Theta T$. Here, the rotation angle $\Theta T$ from the exposure to the transfer is represented by:

$$\Theta T=\pi-\beta \tag{15}$$

where $\beta$ represents an angle GEO.

$$\sin\beta=(\epsilon/R)\cos\theta \tag{16}$$

$$\Theta T=\pi-\sin^{-1}\{(\epsilon/R)\cos\theta\} \tag{17}$$

s indicating the transferring position is represented by:

$$s = \epsilon\cos(\theta-\beta) \tag{18}$$
$$= \epsilon\cos\theta(\epsilon/R)\left[[(R/\epsilon)^2-\cos^2\theta]^{1/2}+\sin\theta\right]$$

Based upon the above-mentioned facts, an output means for image data for modulating an exposing beam in order to correct distortion and color offset of an image is designed, and the description thereof will be given later.

For example, in the case when, instead of a transferring corona charger 14, a known system for transferring a toner image on paper by applying an electric potential to a roller facing the drum is used, the transferring position is different from s described here due to deviations in the rotation angle $\theta$ and the drum radius; however, $\Theta T$ and s are found by correcting these based upon a predetermine relationship.

4. Concerning Means for Outputting Image Data

Based upon these, a correction unit is realized.

4-1. Fixed Exposure Position System

1) Output Timing of Image Data at the Exposing Position

Output timing of the main-scanning image is adjusted in order to always transfer a toner image at an optimal position. In other words, at the time of an ideal drum diameter $R_0$, a toner image is transferred after having been shifted by $\pi R_0$. However, when there are eccentricities in the drum causing deviations in the drum diameter, the toner image is transferred on paper after having been shifted by a drum rotation angle of $\Theta T$, with the result that the transferring position has an offset of −s from the ideal transferring position T. After having been transferred, the transferred image on the belt is shifted at a speed V. Thus, the exposure data is transferred with the offset of −s from the ideal transferring position T after a lapse of time $\Theta T/\omega=\tau$. In other words, it is transferred after the belt has been shifted by a distance of V$\tau$. Supposing that the ideal drum radius is $R_0$ and the drum rotation angular velocity at this time is $\omega_0$, the following equation holds:

$$V=R_0\omega_0$$

In the ideal drum, the toner image is supposed to be transferred after a lapse of time $\pi/\omega_0=\tau_0$. Therefore, on the belt, the image, which is supposed to be located with a shift distance x=V$\tau_0$ after exposure, is formed at a position x=V$\tau$. In other words, it is possible to form an ideal image when image data corresponding to x=V$\tau$ is outputted on the exposing side. Data, d=V ($\tau_0-\tau$) before, needs to be outputted.

$$V=R\omega=R_0\omega_0 \tag{19}$$

$$\Theta T=\pi-\sin^{-1}\{(\epsilon/R)\cos\theta\} \tag{20}$$

$$d=V(\pi/\omega_0-\Theta T/\omega)=R[\pi\omega/\omega_0-\pi+\sin^{-1}\{(\epsilon/R)\cos\theta\}] \tag{21}$$

$$d=\pi(R_0-R)+R\sin^{-1}\{(\epsilon/R)\cos\theta\} \tag{22}$$

In the case of no eccentricities, the image data only needs to be outputted with an offset of $d=\pi(R_0-R)$. In this case, since the drum peripheral velocity is a constant value of V, the sub-scanning pitch is constant. Here, in the case when there are eccentricities, in accordance with the above-mentioned equation (22), after a delay corresponding to d, the data is outputted (depending on the angle θ, the image data is preliminarily outputted)

2) Synchronous Signal of Image Data Output

Based upon a clock synchronizing to the shift of the belt, a sub-scanning synchronous signal SYs with a pitch of P/N (N: integer) of the scanning pitch P, is generated. For this arrangement, as illustrated in FIG. 9, timing marks 21 are formed on the belt so as to be detected by a linear encoder 22. In the case when main-scanning image data is outputted and exposed in synchronism with the sub-scanning pitch P, if the drum has an ideal shape, the sub-scanning pitch of an exposed image onto the drum and the sub-scanning pitch of the image transferred onto the belt are the same, and the image is transferred at an ideal position on the belt. Here, in FIG. 9, reference number 7a indicates an area through which a sheet of paper on the conveyor belt 7 passes.

Here, in the case of no eccentricities in the drum shape with a size greater than the ideal shape, although the sub-scanning pitch is equal, the transferring position on the belt is located ahead of the ideal position in the belt advancing direction with an advance corresponding to $d_R=\pi|(R_0-R)|$. Therefore, by outputting image data with the advance corresponding to $d_R$ from the timing at which the image is outputted at the time of exposure in the case of the ideal drum, the image is formed at the same position as that of the ideal drum.

In the case when there are eccentricities, image data, which has a delay corresponding to d $(d=\pi(R_0-R)+R\sin^{-1}\{(\epsilon/R)\cos\theta\})$ from the timing at which the image is outputted at the time of exposure in the case of the ideal drum, is outputted. The rotation angle θ at the eccentric position is detected by, for example, a rotary encoder, not shown, connected to the drum axis.

3) Detection of Eccentricity ε and Drum Radius R (1) Self-Measuring System

The drum radius is found by shifting the belt with a length $L=2\pi R_0$ corresponding to the circumferential length of an ideal drum and measuring the rotation angle θi at this time of the rotary encoder, not shown, that is directly connected to the drum. In other words, it is found from the following equation:

$$R=L/\theta i \quad (23)$$

Moreover, in the case when no rotary encoder is provided and only the reference position of the rotation is detected, the belt shifting distance Lb at the time of one rotation of the drum is found. In other words, it is found by the following equation:

$$R=Lb/(2\pi) \quad (24)$$

The eccentricity ε is detected by the aforementioned two systems. In the aforementioned system in which the change in the reflection angle is detected, for example, the detection is realized by designing the optical system so as to use one portion of the reflected light of the main-scanning exposure beam to the drum or directing a light beam by an eccentricity-detecting light emitting element in a separate manner. In the case when the eccentricity is detected at a position facing the transferring position of a toner image, the detection is made by utilizing the aforementioned means (in the case of the present system, it is of course understood that even when the exposing position or the eccentricity detection position is not located at a position facing the transferring position of the toner image, the detection is made based upon the same principle, although relational expressions are different.).

(2) System in which Measurements are Made During the Manufacturing Process

In the manufacturing processes of the image formation apparatus 1, R and ε together with angle $\theta_0$ information from the home position of the rotary encoder, not shown, that moves in association with the rotation of the drum with ε are measured, and this information is recorded in a non-volatile memory (connected to a bus 18 of FIG. 3), not shown, provided in the image formation apparatus 1 using the tandem system, and utilized when the above-mentioned d is obtained; thus, the detection can be realized.

4) Concerning Fluctuations in the Shifting Speed of the Conveyor Belt 7

For example, as illustrated in FIG. 9, the timing marks 21 are formed on the belt, and the linear encoder 22 capable of detecting a timing signal in synchronism with the movement of the belt is installed; thus, the image data is outputted as described earlier in synchronism with a clock signal detected by this so that the image that is virtually identical is obtained although some errors in the data output timing, etc., (phase errors of a PLL (Phase Locked Loop), etc.) exist.

5) Output System of Image Data

In the case when there are eccentricities and deviations in the drum diameter, an image to be generated is shifted by an amount corresponding to d in the main-scanning direction, and supposing that the pitch in the sub-scanning direction of an image formed on the belt is P, Nd=<d/P>, which has been formed into an integer by rounding off, cutting down, or raising decimals of d/P (in this specification, "<>" indicates that the numeric value inside "<>" is obtained by forming into an integer), is set, and the address of the image data outputted in the main-scanning direction is shifted by this value Nd=<d/P> (in this explanation, shifted in the delay direction when Nd is positive).

In this case, in order to improve the image quality, the rounding-off process is preferably used, and in order to obtain higher quality, interpolation information in the sub-scanning direction is added to the image information to be scanned on the drum, and the main-scanning image data is selected.

(1) System in which Image Data to be Outputted onto the Photosensitive Drum 6 is Multiplied by $N_M$ in the Sub-Scanning Direction Here, for example, an explanation will be given of a case where $N_M$=2 times.

The interpolation data is determined by estimating image data located before and after in the sub-scanning direction. The image data used at the time of estimating is not limited to one line before and after, and a plurality of lines before and after may be used; thus, it is possible to provide images with higher quality. Moreover, in the case when interpolation data in the main-scanning direction with respect to one point is generated, not limited to estimation made only based upon the relationship in the sub-scanning direction, estimation may be made by including image data in the main-scanning direction, and the interpolation is made; thus, it is possible to further improve image quality.

Figure 10:
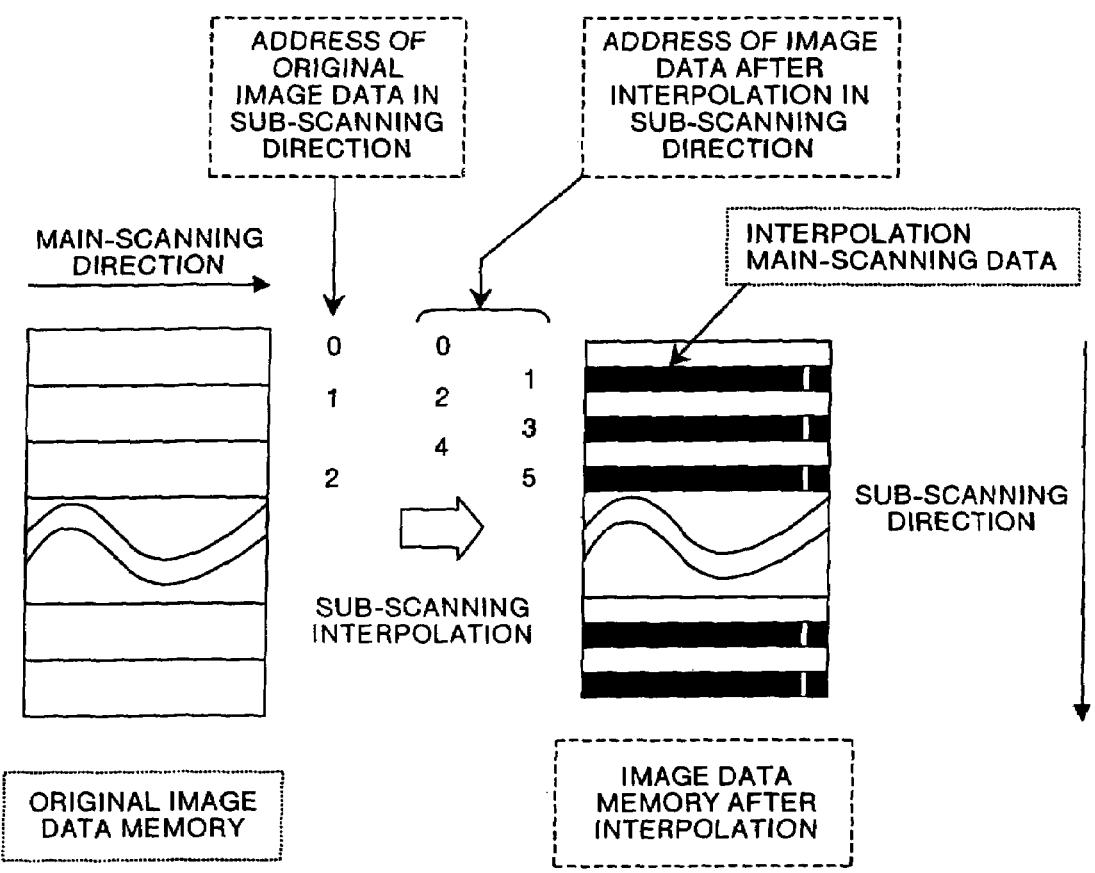
FIG. 10 is an explanatory drawing that shows a means for outputting image data in the image formation apparatus.

With respect to the address NC for accessing image data on the image memory including such interpolation data, the image data address in the sub-scanning direction at the time of exposing onto an ideal drum is represented by "NC=2Ns+<2d/P>", where Ns represents original data address. Moreover, interpolation data in the scanning direction is increased, and the process is carried out in the same manner. In FIG. 10, the main-scanning image data is represented by a collection of data corresponding to one dot (pixel), and data corresponding to one dot is constituted by a plurality of bits (words) so as to represent information (quantization level, etc.) to be recorded. In other words, this is stored in the memory on the basis of this word unit, and the main-scanning image data is also arranged so as to be taken out on the word basis.

(2) Method for Forming Interpolation Data without Increasing the Storage Capacity of the Image Memory to be Used In the above-mentioned method the memory is multiplied by N; however, the same process is carried out without increasing this. In other words, the main-scanning image data is outputted while carrying out calculations. That is, in order to readily carry out interpolation calculations, the original image memory is divided, and in order to carry out the estimation at the same time, provision is made to readily output necessary image data. Moreover, in the case when the estimation is made by using the main-scanning image data, a buffer register is installed on the output side of the image memory so that data required for interpolation is acquired from the image memory. Hereinafter, for example, an explanation will be given of a case in which the estimation is made by using the main-scanning image data corresponding to two lines before and two lines after.

Figure 11:
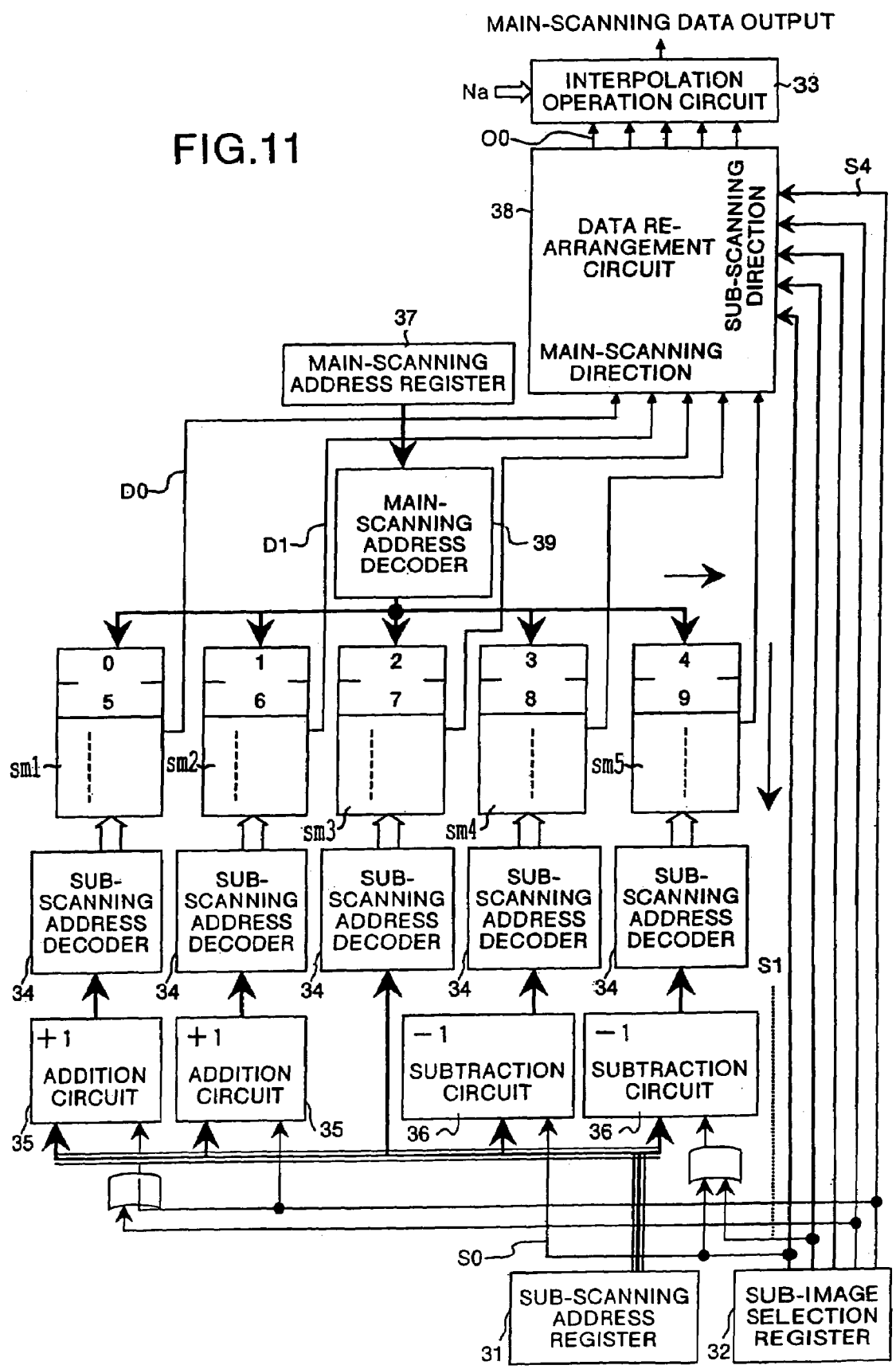
FIG. 11 is an explanatory drawing that shows the means for outputting image data in the image formation apparatus.

First, as illustrated in FIG. 11, the original image is divided into five to form five sub-image memories, that is, sub-image memory sm1, sub-image memory sm2, . . . , sub-image memory sm5. As illustrated in FIG. 11, with respect to the main-scanning lines, in succession, 0-line is stored in the sub-image memory sm 1, $1^{st}$-line is stored in the sub-image-memory sm 2, $2^{nd}$-line is stored in the sub-image memory sm 3, . . . , and $5^{th}$-line is stored in the sub-image memory sm1 . . . . By using a sub-image selection circuit not shown, the sub-image memory sm1 to sm5 is successively selected, and every time one cycle is made from the sub-image memories sm1 to sm5 in the main-scanning image data, the sub-scanning address is incremented by one. In this manner, as illustrated in FIG. 11, the main-scanning image data is stored in the respective sub-image memories sm1 to sm5.

Next, an explanation will be given of an output means for the main-scanning image data that is optically written on the drum actually. First, the sub-scanning address Ns, which has been shifted by Nd=<d/P> from the specified sub-scanning address in the case of the ideal drum, is found. Then, Ns is divided by 5, and the resulting quotient is set to a sub-scanning address register 31, and the remainder is set to a sub-image selection register 32.

In order to generate interpolation data, the sub-scanning address Ns and the main-scanning image data specified by sub-scanning addresses corresponding to before and after ±2 need to be sent to an interpolation calculation circuit 33 at the same time. For this reason, based upon the data set in the sub-image selection register 32 in FIG. 11, in order to select and send the address Ns and the main-scanning image data on the sub-image memories sm 1 to sm 5 located before and after this to respective sub-scanning address decoders 34, 34, . . . respective two +1 addition circuits 35, 35 and −1 subtraction circuits 36, 36 are installed. For example, when Ns=5, that is, when the fifth data of the main-scanning image data is selected, Ns/5=1 (remainder: 0). At this time, 0 is set to the sub-image selection register, and 1 is set to the sub-scanning register. Therefore, with respect to the sub-image memories sm1, sm2 and sm3, the same sub-scanning address 1 of the sub-image memory is selected, and with respect to the sub-image memories sm4, and sm5, the sub-scanning address 0 of the sub-image memory is selected. In other words, the main-scanning image data corresponding to before and after two of the address Ns are simultaneously specified.

Then, among these specified main scanning image data (main scanning line data), dot image data specified by the main scanning address register 37 is outputted from the individual sub-image memories sm1 to sm5. Here, the interpolation calculation circuit 33 interpolates based upon inputted main scanning dot data; therefore, upon inputting to the interpolation calculation circuit 33, the data is arranged so that the main scanning image data, specified by the sub-scanning address Ns, is always located in the center. This arranging operation is carried out by a data arranging circuit 38. In the case when Ns=5, the main-scanning dot data corresponding to the sub-scanning address 5 is consequently placed in the center 02, and the main scanning dot data corresponding to before and after data in the sub-scanning direction, are arranged, thereby providing 00, 01, 03, 04. In the conversion in the data arranging circuit 38, based upon the outputs S0, S1, . . . , S4 of the sub-image selection register 32, the sub-image memory outputs D0, D1, . . . , D4 are arranged so as to be outputted as 00, 01, . . . , 04, by the input/output table shown in FIG. 12.

Here, with respect to the sub-scanning address value <d/P> to be shifted in response to the amount d shifted in the sub-scanning direction, in order to output interpolated main-scanning image data corresponding to the position obtained by n-dividing the pitch P, Na=<nd/P>−n<d/P> is found, and inputted to the interpolation calculation circuit 33. In other words, the interpolation calculation circuit 33 carries out calculations so as to provide the main-scanning image data which looks as if it were displayed with a finer resolution of 1/n. Based upon data 00, 01, . . . , 04 inputted to the interpolation calculation circuit 33, for example, an interpolation curve is drawn, and finds a value corresponding to the position Na×P/n, and this is outputted as the main-scanning dot data. Here, in FIG. 11, the main scanning address decoder 39 is a decoder used for decoding the main scanning address information.

As described above, in an image formation apparatus 1 of a system in which exposure is carried out at a fixed position as a polygon motor system and exposure and scanning processes are continuously carried out with constant intervals, it becomes possible to improve the image quality.

6) Polygon Motor Constant Rotation System

In the case when the image formation apparatus 1 has a system in which a polygon motor rotates constantly, and exposure and scanning processes are carried out at a constant velocity in the main-scanning direction, the polygon motor is rotated constantly so that an exposing beam is allowed to scan at constant timing (time intervals) in the main-scanning direction (in a, direction orthogonal to the drum rotation direction). The scanning timing by this polygon mirror is determined based upon an ideal drum. In other words, the exposure and scanning processes are carried out by exposing beam at a constant speed independent of the drum eccentricities and drum diameter.

The drum is rotating at a constant angular velocity ω. Therefore, in the case of an eccentricity, if the distance from the rotation center 0 to the exposing position E is longer than the average value of the drum radius; then, the drum peripheral velocity is greater than the average peripheral velocity V, and if it is shorter; then the drum peripheral velocity is smaller. The beam that is allowed to scan by the polygon motor has a constant time interval in the beam sub-scanning direction. Therefore, as the drum peripheral velocity varies, the laser scanning pitch deviates. For example, on the drum having a longer drum radius in the vicinity of the exposing position, the pitch interval becomes longer in the scanning.

(1) Correction of Degradation in Image Quality Due to Fluctuations in Drum Peripheral Velocity Caused by Drum Eccentricities In order to prevent degradation in an image due to drum eccentricities, correction is made by controlling the size of dots (pixels) drawn on the drum. In other words, the dot diameter is made greater where there are rough pitches, and the dot diameter is made smaller where there are fine pitches. This change in the dot diameter is preferably made only in the sub-scanning direction in order to further improve the image quality. This correction is realized by properly controlling factors, such as the laser optical system and irradiation laser intensity, the pulse length and pulse shape, in accordance with the photosensitive member characteristics and the charging state.

Figures 12, 13:
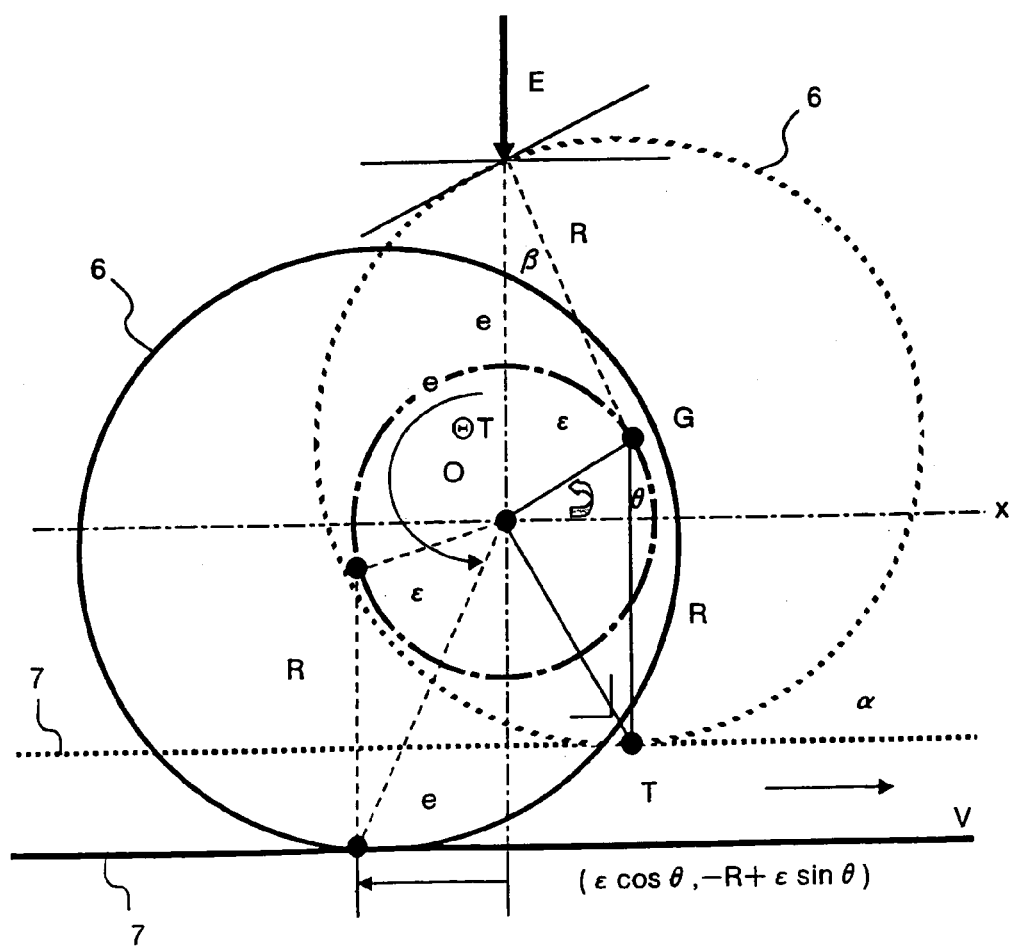
FIG. 12 is an explanatory drawing that shows the means for outputting image data in the image formation apparatus.
FIG. 13 is an explanatory drawing that shows the means for outputting image data in the image formation apparatus.

With respect to the drum peripheral velocity VL, the following equations hold, in FIG. 13.

$$VL = e\omega\cos\beta \quad (25)$$
$$= e\omega[1 - \sin^2\beta]^{1/2}$$
$$= e\omega[1 - (\varepsilon/R)^2 \cdot \cos^2\theta]^{1/2}$$
$$= e\omega[1 - g]^{1/2}$$

where $$e = [R^2 + \varepsilon^2 - 2R^2\{g - (\varepsilon/R)\sin\theta(1 - g)^{1/2}\}]^{1/2}$$
$$g = \{(\varepsilon\cos\theta)/R\}^2$$

In this case, the above-mentioned equation is found on the assumption that instantaneous time changes in e and β are minimum. Therefore, the laser output pulse is finally determined by the dot (pixel) data and the peripheral velocity.

(2) Relationship between Belt Shift and Beam Scanning on the Drum by the Polygon In the case when the belt velocity fluctuation is zero and when there is no phase change in timing for outputting the main-scanning image data for each sub-scanning pitch P in synchronism with the beam scanning by the polygon and the belt shift, the image data is outputted by using the above-mentioned means depending on the drum eccentricities and drum diameter. However, for example, when there is a belt velocity fluctuation, this relationship is not held. Since the laser scanning by the polygon is constantly carried out, the main-scanning image data needs to be outputted in synchronism with the laser main-scanning by the polygon.

It is supposed that the main scanning image data $I^M$ is specified in synchronism with the sub-scanning pitch P by the clock Ck synchronizing to the belt shift; however, the main-scanning image data $I^M$ can be selected at the main-scanning image output timing Tb synchronizing to the belt in relation to the laser beam main-scanning start time Smc. In this case, when there is a phase offset in the corresponding timing Tb and the output timing of the main-scanning image data $I^M$ synchronizing to the belt, the corresponding amount d is corrected. In other words, in the case when the timing Tb has a delay corresponding to the clock duty k synchronizing to the sub-scanning pitch P, the amount d is corrected by an amount of the output timing P×k, thereby forming the main-scanning image data. In some cases, k exceeds 1. If there is a delay not less than 1 pulse, k≧1 holds.

In other words, the output of the main scanning image data is interpolated in accordance with the following equation:

$$d = kP + \pi(R_0 - R) + R\sin^{-1}\{(\varepsilon/R)\cos\theta\} \quad (26)$$

2) Optical Scanning Unit System formed by Arranging a Plurality of Light-Emitting Elements (Laser Diodes or Light-Emitting Diodes)

In this system, since the main-scanning image data can be selected at desired time, the output of the main scanning image data is interpolated in accordance with the following equation:

$$d = \pi(R_0 - R) + R\sin^{-1}\{(\varepsilon/R)\cos\theta\} \quad (27)$$

4-2. Exposing Position Variable System

Figure 14:
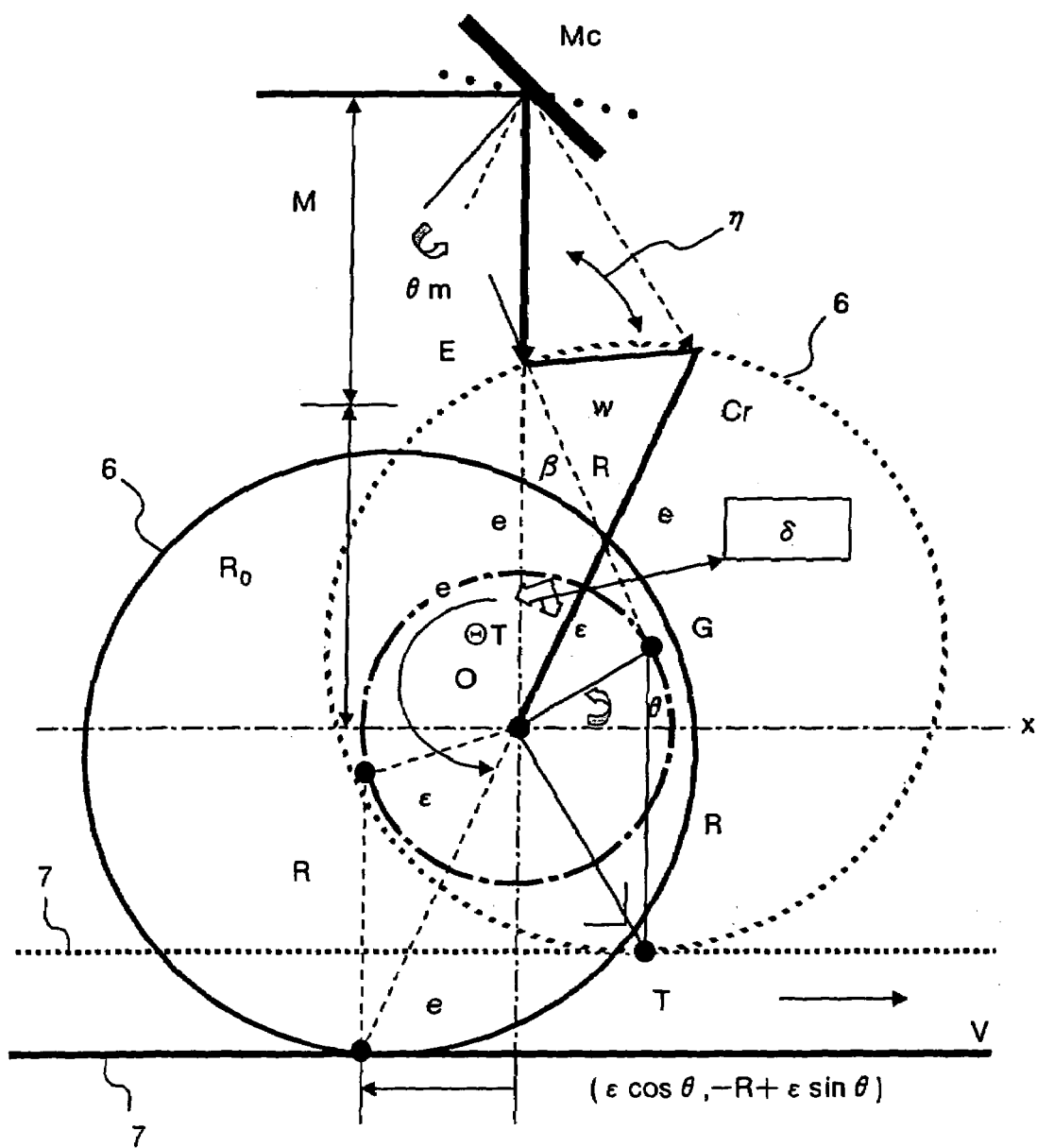
FIG. 14 is an explanatory drawing that shows the means for outputting image data in the image formation apparatus.

In FIG. 14, when there are an eccentricity (ε, θ) and deviations in the drum diameter R at the exposing position E, when the main scanning image data is outputted at timing of an ideal drum, the transfer takes place at a position having an advance d before the ideal transfer position, resulting in color offsets. Therefore, the exposing beam can be applied to Cr on the drum so as to output the main-scanning image data having a delay d at crossing point E between the drum circumference and the positive y-axis at this moment.

Thus, in order to always output at exposing timing in the same manner as the timing at the time of the ideal drum, the exposing position is controlled so that the information having the delay d is located at crossing point E between the drum circumference and the positive y-axis. Therefore, the exposure is applied to the position Cr on the drum corresponding to a rotation angle δ from the positive y-axis in FIG. 14. After having rotated by the rotation angle δ, the exposing position Cr comes to overlap the positive y-axis. Then, after a lapse of Dt=δ/ω, an image offset corresponding d occurs in the image exposed at the exposing position Cr, with an angle θ+δ of the eccentric position. The shift time of the conveyor belt 7, Dd=d/v, corresponding to this amount d, is added, and the exposure is applied to the position Cr of the angle δ upon arrival to the positive y-axis, it becomes possible to eliminate the color offset.

In other words, the color offset is eliminated when the following relationship is satisfied:

$$Dt = \delta/\omega = Dd = d/V,$$

In other words, $$\delta = d/R \quad (28)$$

(where, $d = \pi(R_0 - R) + R\sin^{-1}\{(\varepsilon/R)\cos(\theta+\delta)\}$). δ is found based upon this relative expression.

In other words, at the time of an angle θ of the eccentric position, the exposure is applied at the exposing position Cr that corresponds to the angle δ determined by the equation (28) before the positive y-axis. In other words, upon outputting the main-scanning image data, the irradiation is applied at the angle δ before the positive y-axis; thus, an electrostatic latent image corresponding to the delay distance d is automatically allowed to position on the positive y-axis after a lapse of time Dd.

The rotation center Mc of the correction-use rocking mirror is set at a position of $R_0+M$ on the y-axis. Here, it is supposed that the laser light is made incident on the mirror in parallel with the x-axis. The reflection face of the mirror-makes an angle of $\pi/4$ with respect to the x-axis in the case of the ideal drum. Suppose that the mirror rocking angle required for exposing to the exposing position Cr is θm. Moreover, supposing that the distance of the line connecting the two points of the exposing position E and the exposing position Cr is w and that the angle made by this line with the positive y-axis is η, the following equations hold:

$$w/\sin(2\theta m)=(R_0+M-e)/\sin(\pi-2\theta m-\eta) \quad (29)$$

$$w/\sin \delta=e/\sin(\eta-\delta) \quad (30)$$

$$-w/\sin \{2(\beta+\eta)\}=R/\sin(\beta+\eta) \quad (31)$$

$$w/(2R)=\cos(\beta+\eta) \quad (32)$$

$$\sin \beta=(\epsilon/R)\cdot\cos \theta \quad (33)$$

$$\beta=\sin^{-1}[(\epsilon/R)\cdot\cos \theta] \quad (34)$$

$$g=\{(\epsilon \cos \theta)/R\}^2 \quad (35)$$

Based upon the above equations, the following equations hold:

$$e^2=R^2+\epsilon^2-2R\epsilon \sin(\beta-\theta) \quad (36)$$

$$e=[R^2+\epsilon^2-2R^2\{g-(\epsilon/R)\sin \theta(1-g)^{1/2}\}]^{1/2} \quad (37)$$

Therefore, $$\cot(2\theta m)=(R_0+M-e)/(w\cdot\sin \eta)-\cot \eta \quad (38)$$

Together with this equation, equations (28), (30), (32), (35) and (37) are used so as to find the mirror rocking angle θm. Based upon factors such as the drum radius R, the eccentricity ε and the drum rotation angle (eccentric angle) θ, the exposing beam incident angle θm is controlled so that the exposing position to the drum is changed and the transfer position of the toner image is corrected. With respect to this θm, when R and the eccentric position (ε, θ) are found, calculations are preliminarily carried out on θ=0 to 2π by the CPU 15, the value is stored in the RAM 17, and this is inputted to a control circuit for the rocking mirror section, not shown, as a reference signal in response to θ.

In this case, the main-scanning image data is outputted in synchronism with a timing signal synchronizing to the movement of the belt. In the case of the system in which light scanning is made by driving the polygon mirror, the exposing beam scans on the drum in the main scanning direction at a constant velocity. This exposing beam in the main-scanning direction is allowed to have the same signal as in the case of the ideal drum. In other words, the image data is outputted independent of the eccentricities and deviations in the drum diameter. In this case, neither color offsets nor image distortion occur in an image formed on a sheet of paper.

Here, on the drum, the images in the sub-scanning direction do not have equal pitches. In other words, since the transferring position varies with ε cos θ, the exposing position is shifted so as to make the corresponding correction.

The image-data output means described above can be applied not only to the image formation apparatus 1 of the tandem type, but also to a conventional color copying machine or color printer of a single-drum type. In other words, although the single-drum type is less susceptible to color offsets, the above-mentioned image-data output means is effectively applied in order to improve the image quality by preventing degradation in the image quality such as distortion in an image due to eccentricities and deviations in the radius in the photosensitive drum.

5. Correction on Error $\epsilon_{bET0}x$ in Drum-to-Drum Distance $D_{bET}x$ from Ideal Drum-to-Drum Distance $D_{bET0}x$ Next, an explanation will be given of correction on errors in the drum-to-drum installation positions of the photosensitive drum in an image formation apparatus of the tandem type. Based upon this, a correction unit is realized.

$$D_{bET}x=D_{bET0}x+\epsilon_{bET0}x \quad (x: 0, 1, 2) \quad (39)$$

(Here, $D_{bET}0$ is a distance between the photosensitive drum corresponding to C and the photosensitive drum corresponding to M, in FIG. 1, $D_{bET}1$ is a distance between the photosensitive drum corresponding to C and the photosensitive drum corresponding to Y, and $D_{bET}2$ is a distance between the photosensitive drum corresponding to C and the photosensitive drum corresponding to BK).

With respect to the main-scanning image data to the drum corresponding to M, the main-scanning image data is outputted by providing a delay corresponding to $D_{bET}0/P$ sub-scanning lines from the drum corresponding to C; with respect to the main-scanning image data to the drum corresponding to Y, it is outputted by providing a delay corresponding to $D_{bET}1/P$ sub-scanning lines from the drum corresponding to C; and with respect to the main-scanning image data to the drum corresponding to BK, it is outputted by providing a delay corresponding to $D_{bET}2/P$ sub-scanning lines from the drum corresponding to C, in synchronism with the above-mentioned belt. However, if $D_{bET}x/P$ is not an integer, the corresponding correction has to be made.

Therefore, the drum ideal position $D_{bET0}x$ is set to an integral multiple of the sub-scanning pitch P. Then, supposing that the correction amount d to be made in response to the eccentricities and drum diameter of each drum is dx, the correction to the aforementioned d is made by adding the error $\epsilon_{bET0}x$ (the increasing direction from the ideal position is defined as positive) to dx, and the main-scanning image data is then outputted.

The driving operation of the entire tandem mechanism is carried out by either any one of the drums or any one of the belts. That is, the driving source is single.

6. Concerning the Transfer Start Position and Timing of a Toner Image to a Sheet of Paper Based upon this, a correction unit is realized.

In the case when a transferring process is started upon arrival of a sheet of paper to the drum ideal position x=0 corresponding to C, an exposing process needs to be started prior to this. In other words, when the sheet of paper has reached a position with a distance $\pi R_0$ from the ideal position x=0, the exposing process is started onto the drum corresponding to C. In this case also, the corrections of d corresponding to the eccentricities and drum diameter, and to deviations from the ideal position of the drum corresponding to C, are carried out.

As described above, it is possible to form high-quality images that is less susceptible to color offsets.

7. Concerning Measurements on Deviations from the Ideal Position of the Drum ($\epsilon_{bETO}x$ and Measurements on Deviations of the Drum Corresponding to C)

Based upon this, a correction unit is realized.

(1) Measurements During Manufacturing Processes

Measurements are carried out during the manufacturing processes, and the resulting information is recorded in the aforementioned flash memory, not shown, of the image formation apparatus 1 using the tandem system, and this is used upon directing the above-mentioned factor d, etc.

(2) Self-Measuring System

In the polygon system, in order to allow the main-scanning image data to be exposed onto the drum by a laser beam in synchronism with the main-scanning output timing synchronizing to the belt shift, the rotation phase of the polygon motor is corrected. In the same manner as the conventional technique, this is realized by a PLL circuit. As illustrated in FIG. 9, reference marks 23 are put on positions on the belt that are out of an area 7a through which a sheet of paper passes.

Figure 15:
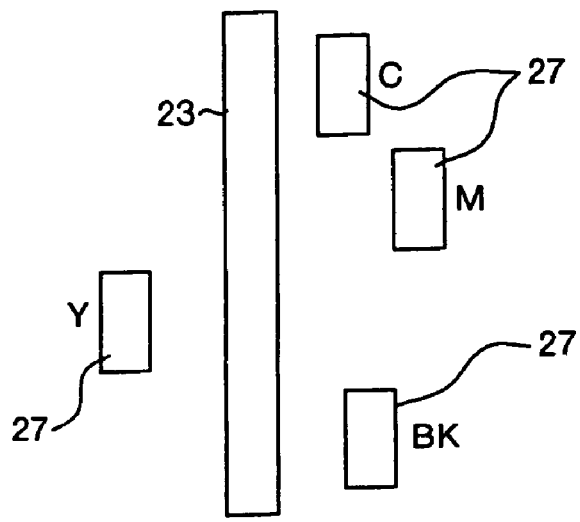
FIG. 15 is an explanatory drawing that shows the relationship between a test mark that is exposed by each photosensitive drum and formed on a belt and a reference mark formed on the belt.

In other words, in FIG. 9, each reference mark 23, which corresponds to the leading edge position of the sheet of paper, is put on a position on the belt that is out of an area through which a sheet of paper passes, and a leading-edge position detector (exposure start position detector) 24, placed $\pi D_0$ before the ideal position of the drum corresponding to C, shows an exposure start position based on a position at which the reference mark 23 passes through this detector. Moreover, when a toner image is actually transferred on a sheet of paper, the paper leading position passage detector 25, which is placed at a position in the main scanning direction through which a sheet of paper passes, shows the exposure start position. The main-scanning image data (without the correction of d at this time) is outputted so as to be transferred at the position of the reference mark 23 on the assumption that the drum is located at the ideal position, and as illustrated in FIG. 15, a test mark 27 actually exposed on each drum is transferred on the belt; thus, the difference from the reference mark 23 is measured so as to find a deviation from the ideal position. In other words, the timing at which the test mark 27 passes through the reference position error detector 26 is measured by the linear encoder 22 for detecting the shift of the belt, thereby making it possible to measure the deviation from the ideal position. In this case, a deviation d in the transferred mark position is generated due to eccentricities of the drum and deviations in the drum diameter; therefore, the positional deviation is calculated while correcting the deviation d (a delay of d exists depending on the definition of the sign of d). Here, the image data of the test mark 27 is not outputted at the timing in which the correction of d is first made; this is because proper timing has already passed due to the relationship of the eccentric position, resulting in cases in which no recording is available.

With respect to the reference mark 23, four of them, shifted in the sub-scanning direction, may be put so as to carry out the measurements. This system makes it possible to reduce the measuring elements. However, the output timing of the main scanning image data has to be shifted in the sub-scanning direction for the corresponding shift.

8. Concerning Examples of an Operation Sequence

Based upon this, a correction unit is realized.

In FIG. 9, in each of the drums corresponding to C, M, Y and BK, a detector for detecting a reference position in the rotation angle and a detector for detecting a dislocation of the drum surface and for detecting the subsequent eccentric position are installed, although not shown in the Figure. Moreover, although not shown, a motor for driving the belt is also installed.

For first example, an explanation will be given of a system in which a polygon mirror, which is driven by a polygon motor to rotate at a constant velocity and deflects a light beam released by a laser diode, carries out a main scanning process on the drum, and an exposing (optical writing) position is fixed.

First, when power is applied to an image formation apparatus 1, the belt is driven without supplying a sheet of paper. The drum is also moved, since it is designed to integrally move with the belt, without a slip. Then, one rotation of the drum is detected by a detector for detecting a reference position of the rotation angle, and the number of output pulses of the linear encoder 22 (depending on cases, the phase of pulse intervals is also measured to improve the precision) is detected to measure the drum diameter. Moreover, the eccentric position is measured based upon the output of the detector for detecting the reference position of the rotation angle of one rotation of the drum and the output of the linear encoder 22. Since the number of output pulses of the linear encoder 22 corresponding to the one rotation of the drum is known, the rotation angle is calculated. The eccentric amplitude is detected by detecting an ac amplitude in the output waveform of the detector of the eccentric position. The above-mentioned detections are carried out for each of the drums. Based upon the above-mentioned detection data, a correction value d ($d=(R_0-R)+R \sin^{-1}\{(\epsilon/R)\cos\theta\}$) is calculated for each of the drums with respect to one rotation ($\theta=0$ to $2\pi$), and the resulting data is preliminarily stored in the RAM 17 as a table so as to be utilized later.

Next, the leading end position detector 24 placed at the end of the belt is used to detect the reference mark 23, and on the assumption that each drum is at an ideal position and has an ideal shape, main-scanning image data, which is intended to transfer a test mark 27 onto the reference mark 23, is optically written on each drum.

In the above-mentioned example, it is supposed that the main-scanning timing phase of the polygon mirror is coincident with the sub-scanning timing phase that is outputted in response to the shift of the belt. In this example, an explanation will be given of a case in which this is not coincident. The main-scanning start timing is determined based upon a pulse signal derived from the timing mark 21 on the belt detected by the linear encoder 22; however, this is not necessarily coincident with the main-scanning timing of the polygon mirror. Therefore, when the output timing of the test mark 27 fails to provide the main-scanning timing of the polygon mirror, the main-scanning timing having a delay of kP of the polygon motor is used to record the test mark 27. After detecting an error from the reference mark 23, an amount d generated by eccentricities and deviations in the diameter and the amount kP are corrected so that the installation error of the drum can be corrected. In this manner, the installation position of the drum, etc., and the correction data d for eccentricities of the drum and deviations of the diameter are found; thus, this data is used so as to output an image that is free from color offsets and distortions.

For a second example, an explanation will be given of the exposing position variable system using the rocking mirror. This example also deals with a case in which the main scanning is carried out by a polygon mirror. Data for eccentricities and drum radius is obtained in the same manner as described in the above-mentioned example. Here, two systems are proposed upon recording the test mark 27. In the first system, with respect to the angle position of the rocking mirror, it is fixed so as to have the exposing position at the origin (x=0), and the same processes as described in the above-mentioned system are carried out. In the second system, only the correction (θm control) corresponding the eccentricities and deviations in the diameter is carried out, and the test mark is then recorded. Other problems raised by phase difference of the main-scanning timing due to the polygon mirror can be solved in the same as the first example.

Here, the following description will discuss the structure of the rocking mirror. The rocking mirror is provided with an angle detector for detecting the rotation of this mirror, and this angle is detected and fed back so that control is provided to obtain the target angle θm. The rocking mirror has a driving section in which a known voice coil motor is used as a driving source, and the mirror is supported by a cross-shaped spring structure.

9. Technical Features

Japanese Patent Application Laid-Open No. 10-246995 discloses a technique in which a peripheral dislocation due to eccentricities of the rotation axis of the photosensitive drum is detected, and based upon the detected dislocation, control is provided so that it becomes possible to solve the problem due to the eccentricities in the photosensitive drum.

In contrast, in the present image formation apparatus 1, with respect to the center point in a cross-sectional circle of the drum, the eccentric position and drum rotation angle are detected, and based upon the detected data, the absolute value of the amount of eccentricity, the eccentric rotation angle and the drum radius are detected; thus, control is provided so as to correct the transfer image onto the belt or a sheet of paper.

From equation (22), the amount of correction d is represented by $d=\pi(R_0-R)+R \sin^{-1}\{(\epsilon/R)\cos\theta\}$, and since the second term on the right side contains the radius R and has a relationship with the rotation angle θ, this is not a simple sinusoidal relationship. Therefore, as the demand for high resolution increases, more consideration needs to be given to influences of the radium deviations. The above-mentioned conventional technique fails to achieve this.

In the image formation apparatus of the tandem system, conventionally deviations in the drum diameter and drum position occur, and in the polygon system, conventionally, when there is a fluctuation in the belt velocity, the resulting problem is that a great color offset occurs. The amount of data correction d is also dependent on the disk radius R; therefore, it is clear that the conventional system for detecting the peripheral dislocation fails to achieve color adjustments with high precision because it cannot detect variations in the radius R.

With respect to the amount of detection in the eccentric dislocation, the conventional technique detects a value in proportion to e in equation (37), which is distinct from the correction method using equation (22). These equations are shown blow. It is understood that the peripheral dislocation detection system of the conventional technique causes errors in the correction process.

$$d=\pi(R_0-R)+R \sin^{-1}\{(\epsilon/R)\cos\theta\} \quad (22)$$

$$e=[R^2+\epsilon^2-2R^2\{g-(\epsilon/R)\sin\theta(1-g)^{1/2}\}]^{1/2} \quad (37)$$

where $$g=\{(\epsilon\cos\theta)/R\}^2 \quad (35)$$

Here, in the image formation apparatus 1, during the manufacturing processes, with respect to the relationship between the phase of the eccentric position of the drum and the position in the sub-scanning direction of the main-scanning line transferred from the drum to a sheet of paper, the phase-adjustment is made so as to coincide all the drum; thus, in the case of the laser scanning system using the polygon mirror with a fixed exposing position, since the variations in the sub-scanning pitch formed on the sheet of paper are made virtually the same, it becomes possible to further improve the image quality. However, when there are deviations in the drum diameter, the phase gradually comes to have deviations as the printing or copying process is repeated. These deviations can be corrected by periodical repairing maintenances. Moreover, for example, in the case when all the four drums are connected and driven by a single motor in order to allow them to make the same rotation, there is no deviation in phases between motors. However, in this case, all the drum diameters needs to be the same. When there are deviations in the diameter, frictional contact occurs between the belt and the drums, resulting in fog in the image.

As described above, in the explanation of the first embodiment, the explanation has been given of the image formation apparatus 1 provided with the photosensitive drums 6, 6, ... and the transfer belt 7. In other words, in this system, the toner image formed on the photosensitive drum 6 is directly transferred from the photosensitive drum 6 to a sheet of paper. With respect to another system to which the present invention is applied, an image formation apparatus of a system is proposed, in which toner images formed on respective photosensitive drum 6 are transferred on a belt (intermediate transfer belt) to form a color image, and the color image on this intermediate transfer belt is transferred on a sheet of paper by using a known means. In other words, in this case, the aforementioned direct transferring process from the photosensitive drum 6 onto a sheet of paper may be replaced by such a transfer process onto the intermediate transfer belt.

In the explanation of the first embodiment of the present invention, the exposing position on the photosensitive drum 6 is explained as point E in FIGS. 4 and 8, etc.; however, the above-mentioned explanation is also true even when this exposing position is altered. In this case, the amount of shift of a sheet of paper or the intermediate transfer belt, which is caused by the shift of the exposing position from point E, can be corrected. In other words, in FIG. 8, the exposing position is located at a position having an angle z in the reversed rotation direction of the photosensitive drum 6 from point E, a correction term, $z(R_0-R)$, is added to equation (22). In other words, the amount of shift of the sheet of paper or the intermediate transfer belt corresponding to the angle z can be corrected. In this case equation (22) is formed into the following equation (40):

$$d=(R_0-R)+R \sin^{-1}\{(\epsilon/R)\cos\}+z(R_0-R)=(\pi+z)(R_0-R)+R \sin^{-1}\{(\epsilon/R)\cos\theta\} \quad (40)$$

Of course, the above-mentioned description is not intended to limit the contents of the present invention. For example, the present invention is also applied to a system in which a high-speed image forming process is provided by simultaneously forming respective electrostatic latent images of respective colors by using a plurality of exposing beams.

The following description will discuss another embodiment of the present invention as a second embodiment.

Figure 16:
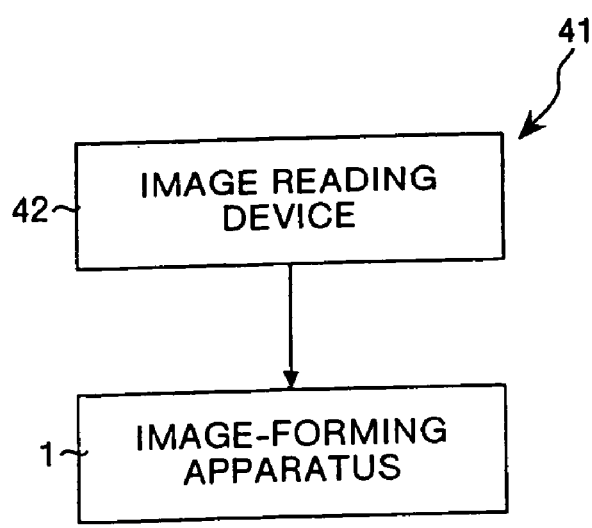
FIG. 16 is a block diagram that shows a schematic structure of the image formation apparatus in accordance with the present invention.

FIG. 16 is a block diagram that schematically shows the structure of a copying machine 41 in accordance with the second embodiment of the present invention. This copying machine 41, which is a practical embodiment of the image formation apparatus of the present invention, is constituted by a known image reading device 42 for reading a color image from a document and the image formation apparatus 1, and, based upon image data read by the image reading device 42, the image forming process is carried out by the image formation apparatus 1.

Therefore, in accordance with the copying machine 41, the same functions and effects as those of the image formation apparatus 1 of the first embodiment are obtained.

Next, an explanation will be given of a third embodiment. The image formation apparatus of the third embodiment is provided with a photosensitive drum that has a round cross-section and rotates on the axis orthogonal to the cross section, and a conveyor belt which allows a sheet of paper to contact the photosensitive drum to transfer a toner image formed on the surface of the photosensitive drum to this paper, and transports this paper. Here, provision is made so that the contact portion between the conveyor belt or the paper and the photosensitive drum forms an apex on the round cross section of the photosensitive drum in the conveyor belt direction.

In the embodiment of the present invention, the belt is designed as a conveyor belt for transporting paper toward the photosensitive drum. Here, with respect to the belt of the image formation apparatus of the present invention, another example is an intermediate transfer belt which allows a toner image formed on the photosensitive drum to be transferred on its surface and which also transfer this onto a sheet of paper.

Moreover, in the third embodiment, differences between the ideal state (designed state) of the image formation apparatus and the actual state (including eccentricities, etc. of the photosensitive drum) are detected, and in accordance with the differences, the image forming conditions are adjusted to provide an image with high quality. In the third embodiment, first, (1) the structure of the image formation apparatus of the third embodiment is discussed, and (2) the detection of the states of the image formation apparatus and (3) the adjustments of the image forming conditions in accordance with the states of the image formation apparatus are then discussed.

(1) Structure of the Image Formation apparatus

Figure 17:
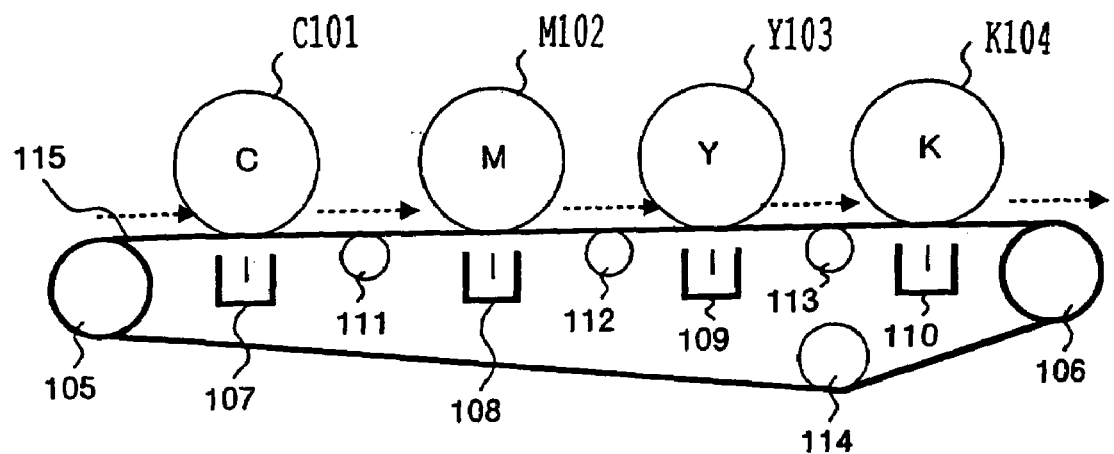
FIG. 17 is a drawing that explains an essential portion of the image formation apparatus in accordance with the present invention.

FIG. 17 is a drawing that explains an essential portion of the image formation apparatus of the third embodiment. The image formation apparatus shown in the Figure is a tandem-type image formation apparatus that is provided with a photosensitive drum C101, a photosensitive drum M102, a photosensitive drum Y103 and a photosensitive drum K104. Moreover, the image formation apparatus is also provided with a conveyor belt 115, a driving roller 106 on which the conveyor belt 115 is wrapped, a driven roller 105, a tension roller 114 and rollers 111, 112 and 113. Below the photosensitive drum C101, the photosensitive drum M102, the photosensitive drum Y103 and the photosensitive drum K104, transferring corona chargers 107, 108, 109 and 110, which transfer toner images formed on the surfaces of the photosensitive drums onto sheets of paper, are installed.

Moreover, in the image formation apparatus of the third embodiment is provided with an image-reading section such as a scanner, a paper-feeding section including paper-feeding cassettes, a fixing section for fixing a toner image on a sheet of paper and a paper-discharging section. The above-mentioned structure is a well-known structure; therefore, the description thereof is omitted.

Each of the photosensitive drum C101, the photosensitive drum M102, the photosensitive drum Y103 and photosensitive drum K104 has a writing unit for writing a latent image by scanning the surface with a laser light, a developing device for forming a toner image by supplying toner onto the latent image, a cleaner, a static charger, etc. These structures are also well-known structures; therefore, drawing indicating these and explanations thereof are omitted. Here, the developing device provided in the photosensitive drum C101 supplies cyan toner, the developing device provided in the photosensitive drum M102 supplies magenta toner, the developing device provided in the photosensitive drum Y103 supplies yellow toner and the developing device provided in the photosensitive drum K104 supplies black toner.

Each of the photosensitive drum C101, the photosensitive drum M102, the photosensitive drum Y103 and the photosensitive drum K104 is a photosensitive drum that has a round cross-section and rotates centered on the axis orthogonal to the cross section. The conveyor belt 115, which is an endless conveyor belt, allows a sheet of paper, not shown, to contact each photosensitive drum so as to transfer a toner image formed on the surface of each photosensitive drum onto the paper. The conveyor belt 115, shown in the Figure, is shifted at a constant velocity V in the direction of arrow.

Figure 18:
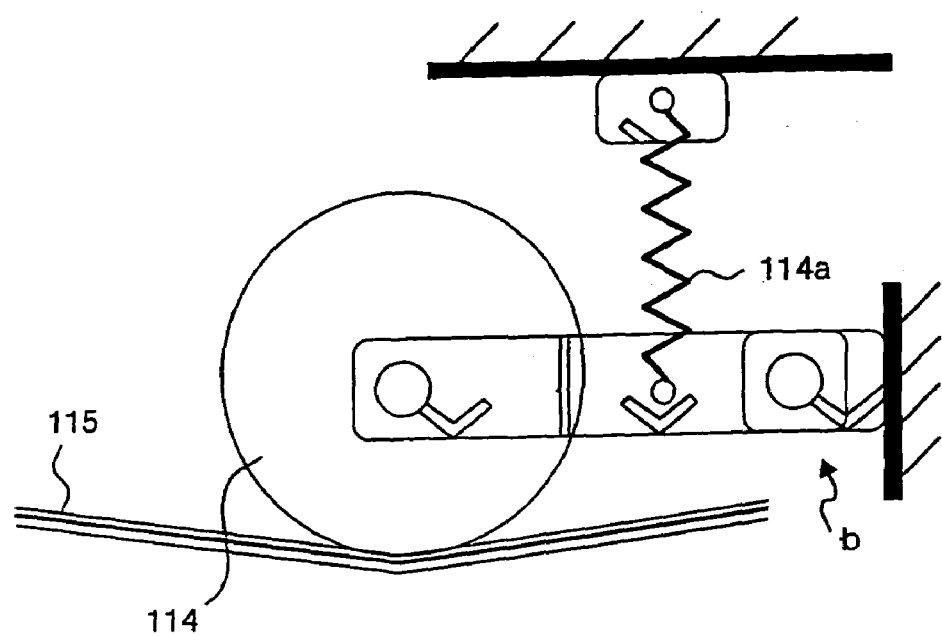
FIG. 18 is a drawing that explains the tension roller shown in FIG. 17.

The tension roller 114, which is designed so as to freely rotate, is pressed against the conveyor belt 115 by a spring rotate, as shown in FIG. 18. Thus, the spring pressure of the spring 114a allows the conveyor belt 115 to contact one portion of the photosensitive drum with a proper tension.

Moreover, the image formation apparatus shown in FIG. 17 is provided with rollers 111, 112 and 113, each of which is placed between the photosensitive drums, and no rollers for pressing the conveyor belt 115 onto the photosensitive drum C101, the photosensitive drum M102, the photosensitive drum Y103 and the photosensitive drum K104 are installed.

For this reason, positions at which the transferring processes are performed (transfer positions) are varied due to eccentricities of the photosensitive drums. In this case, the transfer position is varied in a manner so as to virtually coincide with an area that has the longest distance from the rotation axis in the direction orthogonal to the rotation axis within a range in which the photosensitive drum comes into contact with the belt or the paper, and the contact portion (transfer position) between the conveyor belt or the paper and the photosensitive drum virtually forms an apex on the round cross section of the photosensitive drum in the conveyor belt direction.

Moreover, since there is no roller contacting the photosensitive drum, the conveyor belt 115 located at the transfer position is free from influences from deviations in the press-contact position due to the press-contact roller; therefore, the rotation angular velocity of the photosensitive drum is free from variations.

Figure 19:
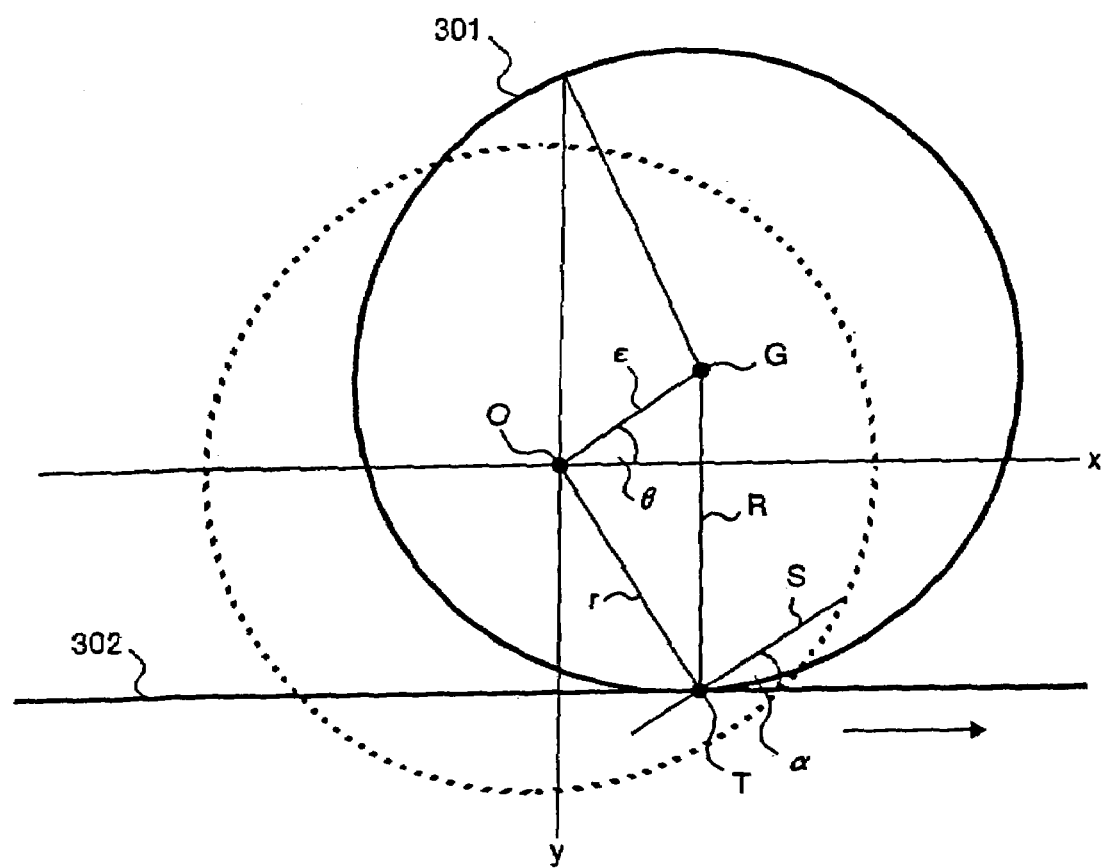
FIG. 19 is a drawing that shows the photosensitive drum of the present invention as a model.

FIG. 19 is a drawing that shows a model of the photosensitive drum of the third embodiment. Referring to FIG. 19, the following description will discuss the fact that the image formation apparatus of the third embodiment is free from variations in the angular velocity of the photosensitive drum even when the photosensitive drum has eccentricities.

As illustrated in FIG. 19, a photosensitive drum 301 having the radius R is allowed to rotate centered on point o with an eccentricity. In FIG. 19, x-axis and y-axis are given with point O serving as the origin. When the center of gravity of the photosensitive drum 301 is located at G, the eccentricity is represented by the factors such as the length ε of a straight line connecting point O and point G and the angle θ made by the straight line ε and the x-axis. Hereinafter, in the present specification, ε refers to "amount of eccentricity" and the position represented by (ε, θ) refers to "eccentric position".

The coordinates of the transfer position T between the photosensitive drum 301 and the conveyor belt 302 is represented by (ε cos θ, −R+sin θ) by using the eccentric position (ε, θ). For this reason, the shifting velocity VTx of T in the x-direction and the shifting velocity VTy in the y-direction are represented as follows:

$$VTx = -\epsilon \cdot \sin\theta \cdot \omega \quad (41)$$

$$VTy = \epsilon \cdot \cos\theta \cdot \omega \quad (42),$$

where ω=dθ/dt.

Moreover, by using equation (41) and equation (42), the velocity Vs in the rotation direction centered on point O (this direction is indicated by a straight line S) is represented by:

$$Vs = V \cdot \cos\alpha - \epsilon \cdot \sin\theta \cdot \omega \cdot \cos\alpha + \epsilon \cdot \cos\theta \cdot \omega \cdot \sin\alpha \quad (43)$$

Here, V represents the shifting velocity of the conveyor belt 302, and α represents an angle that is made by the straight line S and the conveyor belt 302, wherein the straight line S is orthogonal to a straight line r connecting the transfer position T and point O.

Therefore, the following equation holds:

$$\omega = Vs/r = (V \cdot \cos\alpha - \epsilon \cdot \sin\theta \cdot \omega \cdot \cos\alpha + \epsilon \cdot \cos\theta \cdot \omega \cdot \sin\alpha)/r \quad (44)$$

In this case, the following equations hold:

$$r^2 = R^2 + \varepsilon^2 - 2R\varepsilon\cos(\pi/2 - \theta) \quad (45)$$
$$= R^2 + \varepsilon^2 - 2 \cdot R \cdot \varepsilon \cdot \sin\theta$$

$$\varepsilon/\sin\alpha = r/\sin(\pi/2 - \theta) = r/\cos\theta. \quad (46)$$
Therefore, $$\sin\alpha = \varepsilon \cdot \cos\theta/r \quad (47)$$

$$\cos\alpha = (R - \varepsilon \cdot \sin\theta)/r \quad (48)$$

By substituting equation (44) with equations (45), (47) and (48), the following equation is obtained:

$$\omega = \{V \cdot R - (V + \omega \cdot R)\epsilon \cdot \sin\theta + \omega \cdot \epsilon^2\}/(R^2 + \epsilon^2 - 2R \cdot \epsilon \cdot \sin\theta) \quad (49).$$

This equation (49) is transformed to:

$$\omega(R^2 + \epsilon^2 - 2R \cdot \epsilon \cdot \sin\theta) = V \cdot R - (V + \omega \cdot R)\epsilon \cdot \sin\theta + \omega \cdot \epsilon^2 \quad (49).$$

Therefore, $$V = R \cdot \omega \quad (50).$$

That is, it is understood that the conveyor belt 302 is driven at the constant velocity V so that rotation angle velocity of the photosensitive drum 301 becomes constant without an eccentricity.

(2) Detection of States of the Image Formation Apparatus

An explanation will be given of detections of states of the image formation apparatus, such as deviations in the transfer position due to eccentricities of the photosensitive drum, the eccentricities of the photosensitive drum, the actual drum radius of the photosensitive drum and the operation of the writing unit.

Figure 20:
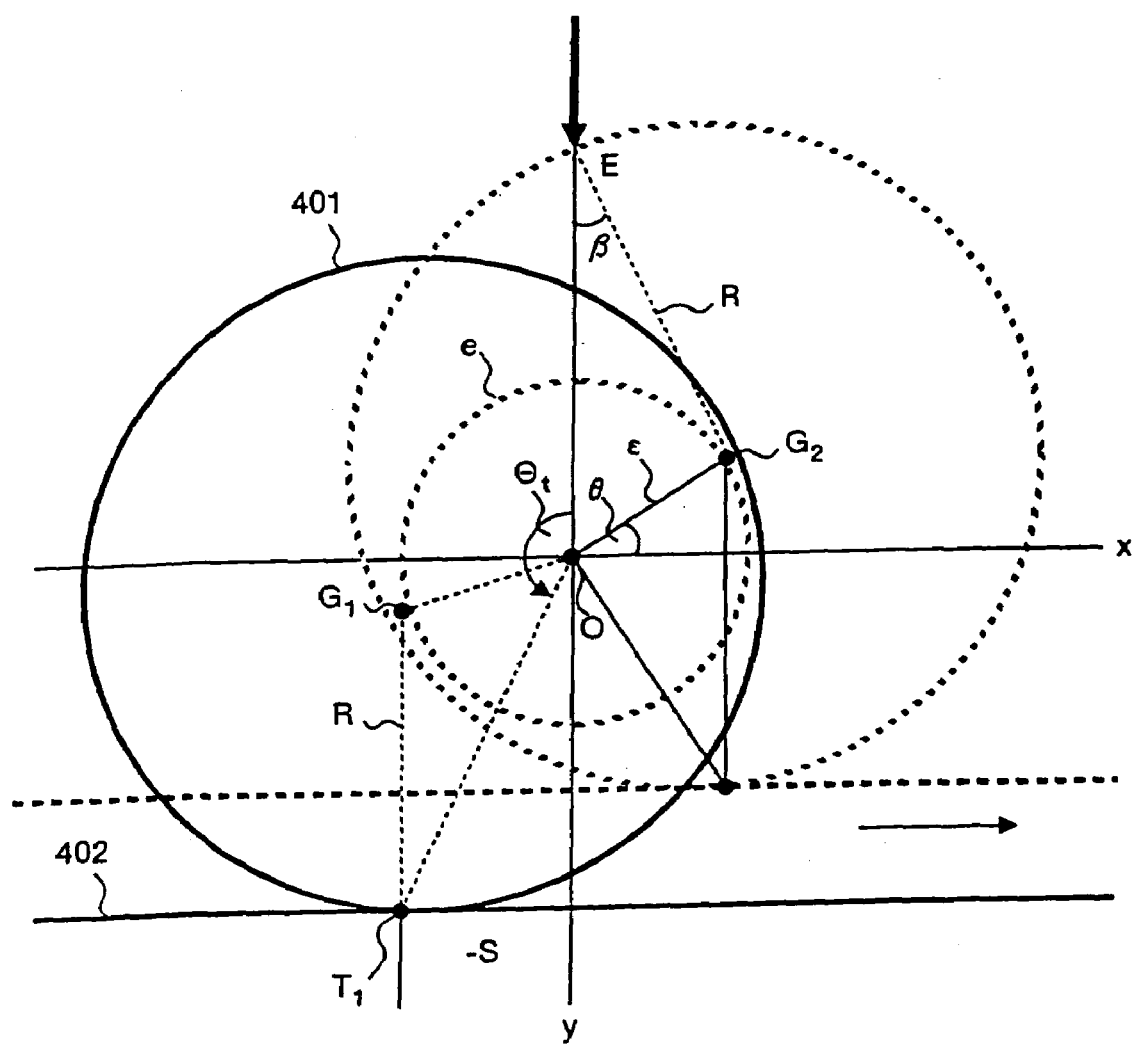
FIG. 20 is a drawing that explains a process in which the transferring position of a latent image written on a photosensitive drum having an eccentricity.

First, an explanation is given of the detection of the transfer position in the case when the photosensitive drum has an eccentricity. FIG. 20 is an explanatory drawing that shows a process in which the transfer position of a latent image written in the photosensitive drum 401 with an eccentricity is found. Here, in FIG. 20, the x-axis and y-axis are given with point O serving as the origin, which represents a cross-section perpendicular to the drawing paper of the rotation axis of the photosensitive drum 401, so that coordinates representing the photosensitive drum 401 are given.

The photosensitive drum, shown in FIG. 20, whose cross-section orthogonal to the rotation axis includes the radius R, is rotated centered on point O with an eccentricity represented by the eccentric position ε. Moreover, due to this eccentricity, the center of gravity of the photosensitive drum 401 is varied in a manner so as to shift on the circumference of the circle having the radius ε.

In the photosensitive drum 401, after a latent image has been written, the latent image, thus written, is formed into a toner image by the developing device, and this is transferred on a sheet of paper. In the case when the photosensitive drum 401 has no eccentricity, the latent image is written at upper point (0, R) that crosses the y-axis within the photosensitive drum 401. Then, after a lapse of a predetermined time, the photosensitive drum 401 has been π-rotated so that the toner image is transferred on a sheet of paper at lower point (0, −R) that crosses the y-axis.

However, when its center of gravity is located at $G_2$, the latent image is written at a portion represented by E in the photosensitive drum 401. The latent image, thus written, is developed by the developer to form a toner image. When the photosensitive drum 401 having the eccentricity is Θt-rotated to have its gravity at $G_1$, it is transferred onto a sheet of paper, not shown, at transfer position $T_1$. At this time, the transfer position $T_1$ has an offset corresponding to −s (s: referred to as "offset amount") in the x direction from the transfer position (0, −R) without any eccentricity in the photosensitive drum 401.

The offset amount s is found as follows:

The rotation angle Θt in which the photosensitive drum 401 is rotated from the latent-image writing position to the transfer position is represented as follows by using an angle β represented by the angle $G_2$EO:

$$\Theta t = \pi - \beta \quad (51).$$

Since the following equation holds:

$$\sin\beta = (\epsilon/R)\cos\theta \quad (52),$$

the following equation is given:

$$\Theta t = \pi - \sin^{-1}[(\epsilon/R)\cos\theta] \quad (53)$$

Since s=ε·cos(θ−β), the following equation is obtained:

$$s = \epsilon \cdot \cos\theta(\epsilon/R)[\{(R/\epsilon)^2 - \cos^2\theta\}^{1/2} + \sin\theta] \quad (54)$$

Therefore, even in the case when the photosensitive drum 401 has an eccentricity, if the greatest eccentric amount ε and the angle θ (FIG. 20) made by the greatest eccentricity at the moment (at which exposure is made) when the latent image is written are found, it is possible to judge the rotation angle Θt in which the photosensitive drum 401 is rotated from the latent-image writing position to the transfer position and the offset of the transfer position in the x-axis direction. As described above, when there is an offset in the transfer position, the transfer position of the toner image on the conveyor belt 402 is also subjected to an offset. The offset amount d of the positional offset of the toner image on the conveyor belt is found as follows:

The toner image, which has been formed based upon the latent image written on the photosensitive drum 401, is transferred after the photosensitive drum 401 has been rotated by Θt from the writing process of the latent image. For this reason, supposing that the angular velocity of the rotation of the photosensitive drum 401 is ω, the time τ taken from the writing process of the latent image to the transfer is represented as follows:

$$\Theta t/\omega = \tau \quad (55).$$

Moreover, in the case when a photosensitive drum (ideal drum) having the radius $R_0$ as designed is rotated at an angular velocity $\omega_0$, the time $\tau_0$ taken from the writing process of the latent image to the transfer is represented by:

$$\pi/\omega_0 = \tau_0 \quad (56)$$

In other words, between the photosensitive drum 401 having the eccentricity and the ideal drum, there is a time difference of $\tau_0-\tau$ from the writing process to the transfer. For this reason, with respect to the photosensitive drum 401 having deviations in the radius and eccentricities, the offset amount d between the transfer position on the transfer belt 402 thereof and the transfer position on the transfer belt 402 of the ideal drum is represented by:

$$\begin{aligned} d &= V(\tau_0 - \tau) \quad (57) \\ &= V(\pi/\omega_0 - \Theta t/\omega) \\ &= \pi(R_0 - R) + R\sin^{-1}\{(\varepsilon/R)\cos\theta\} \end{aligned}$$

The offset amount d indicates that, in the case when a latent image is formed by generating image data on the assumption of the ideal drum, if there are eccentricities or deviations in the radius, the image is transferred at position having an offset of d, resulting in a color offset. Therefore, an image that is to be transferred at the position having the offset of d is preliminarily generated and the corresponding latent image is formed, the image corresponding to the transfer position can be formed with the result that no color offset is generated.

As described above, by operating the writing unit while taking into consideration the offset amount d thus found, the image formation apparatus of the third embodiment makes it possible to transfer a toner image at the same position as the toner image transferred by the ideal drum, even when the photosensitive drum has eccentricities or when the photosensitive drum has a radius different from the radius of the ideal drum.

In order to obtain the offset amount d, it is necessary to detect the radius R of the actual photosensitive drum, (ε, θ) indicating the eccentric position and the drum rotation angle Θt. Next, an explanation will be given of the arrangement of an image formation apparatus for detecting the radius R, the eccentric position (ε, θ) and the rotation angle Θt.

Figure 21:
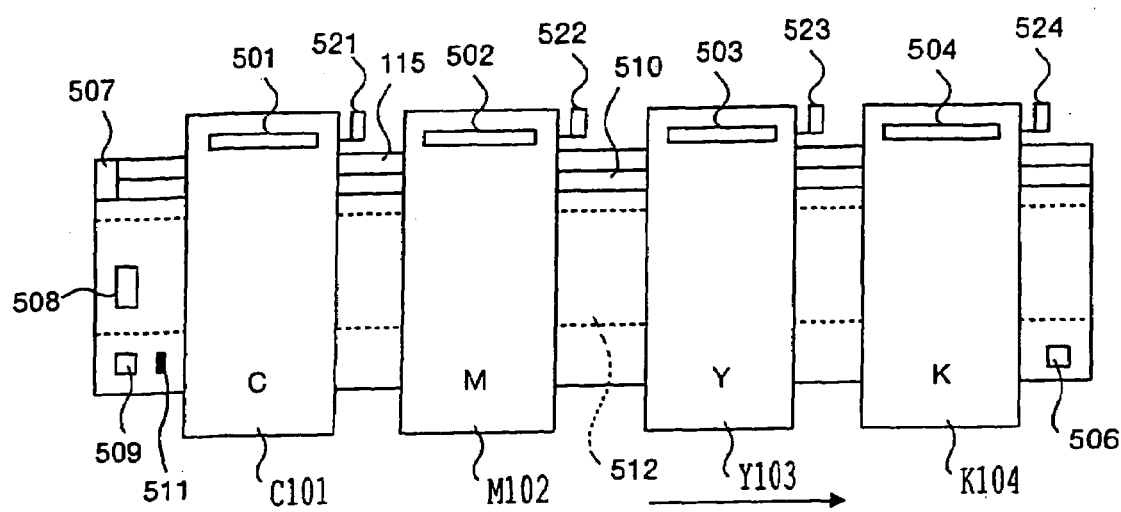
FIG. 21 is a drawing that explains a structure for detecting the radius, eccentric position and rotation angle of the photosensitive drum in the image formation apparatus of the present invention.

FIG. 21 is a drawing that explains an arrangement in which the image formation apparatus of the third embodiment detects the radius R of the photosensitive drum, the eccentric position (ε, θ) and the rotation angle Θt of its own apparatus. Here, in FIG. 21, those devices having the same functions as those shown in FIG. 17 are represented by the same reference numerals, and the description thereof is omitted.

The structure shown in the Figure is provided with a photosensitive drum C101, a photosensitive drum M102, a photosensitive drum Y103 and a photosensitive drum K104, and a conveyor belt 115. Moreover, the photosensitive drum C101, the photosensitive drum M102, the photosensitive drum Y103 and the photosensitive drum K104 are respectively provided with rotation angle detecting encoders 501, 502, 503 and 504 for detecting rotation angles, as well as eccentricity detectors 521, 522, 523 and 524 for detecting eccentricities.

Moreover, the conveyor belt 115 is provided with a paper-passage area 512 on which sheets of paper are transported to pass. Inside the paper-passage area 512, a paper-passage detector 508 for detecting passage of sheets of paper is installed. Outside the paper-passage area 512, a timing mark 510 for detecting the shift amount of the conveyor belt 115 and a reference mark 511 for indicating the leading edge of the conveyor belt 115 are formed. Furthermore, above the conveyor belt 115, a linear encoder 507 for detecting the timing mark 510 and for generating a pulse each time the timing mark is detected, a leading edge position detector 509 for detecting the reference mark and a reference position error detector 506 for detecting an offset amount between positions of the toner image and the reference mark, which will be described later, are installed.

The rotation angle detecting encoders 501, 502, 503 and 504 of the third embodiment are encoders that can detect an absolute value of the rotation angle of the photosensitive drum, and generates a pulse each time the photosensitive drum makes a rotation with a predetermined angle. The rotation angle detecting encoders 501, 502, 503 and 504 function as writing start position detecting means for detecting a position from which the writing operation is started to each of the photosensitive drums.

Moreover, each of the eccentricity detectors 521, 522, 523 and 524 of the third embodiment is provided with a light-emitting element for applying a light beam on the outer surface of each photosensitive drum, a light-receiving element for receiving the light beam reflected from the outer surface of the photosensitive drum, and an optical system for detecting a change in the quantity of received light of the light-receiving element (for example, two-division photodiode) when the outer surface of the photosensitive drum is dislocated due to eccentricities. For such an eccentricity detector, for example, a focus error detection system used in the field of optical disks can be adopted.

In the case when the focus error detection system is used as the eccentricity detector for detecting the eccentricity, a photocurrent, which corresponds to the variation in the distance between the eccentric detector and the photosensitive drum outer surface, is allowed to flow through the light-receiving element. By taking out the photocurrent from the light-receiving element as an electrical signal, it is possible to obtain a waveform curve that varies with a constant cycle and amplitude. Based upon the amplitude and cycle, the eccentric position (ε, θ) is obtained.

Figure 22:
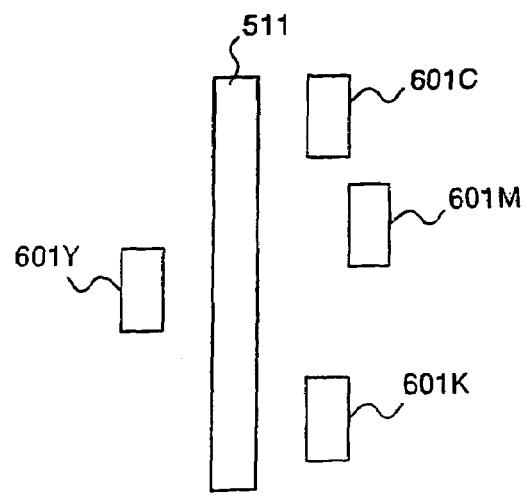
FIG. 22 is a drawing that shows a reference mark, and a toner image that is formed by each photosensitive drum based upon the reference mark.

FIG. 22 is a drawing that shows a reference mark 511 and toner images 601C, 601M, 601Y and 601K serving as reference toner images that the photosensitive drum C101, photosensitive drum M102, photosensitive drum Y103 and photosensitive drum K104 have formed on the conveyor belt 115 based on the reference mark 511. A writing unit, not shown, writes a latent image (reference latent image) on the photosensitive drum C101 on the assumption that the photosensitive drum C101 is an ideal drum. The reference latent image is developed by a developing device not shown, and transferred on the conveyor belt 115 as a toner image 601C.

The writing and transferring processes of the reference latent image are carried out in synchronized timing so that the toner image 601C is transferred while being coincident with the reference mark 511.

Moreover, in the same manner, the writing unit of the photosensitive drum M102, the writing unit of the photosensitive drum Y103 and the writing unit of the photosensitive drum K104 also transfer toner image 601M, toner image 601Y and toner image 601K on the transfer belt 115 in a manner so as to be coincident with the reference mark 511. As a result, as illustrated in FIG. 22, with respect to each of the photosensitive drums, patterns, which indicate differences between the ideal writing process and transfer timing and the actual writing-process and transfer timing, are formed. In this case, in the third embodiment, the pattern shown in FIG. 22 is directly formed on the conveyor belt 115 without transporting a sheet of paper.

Figure 23:
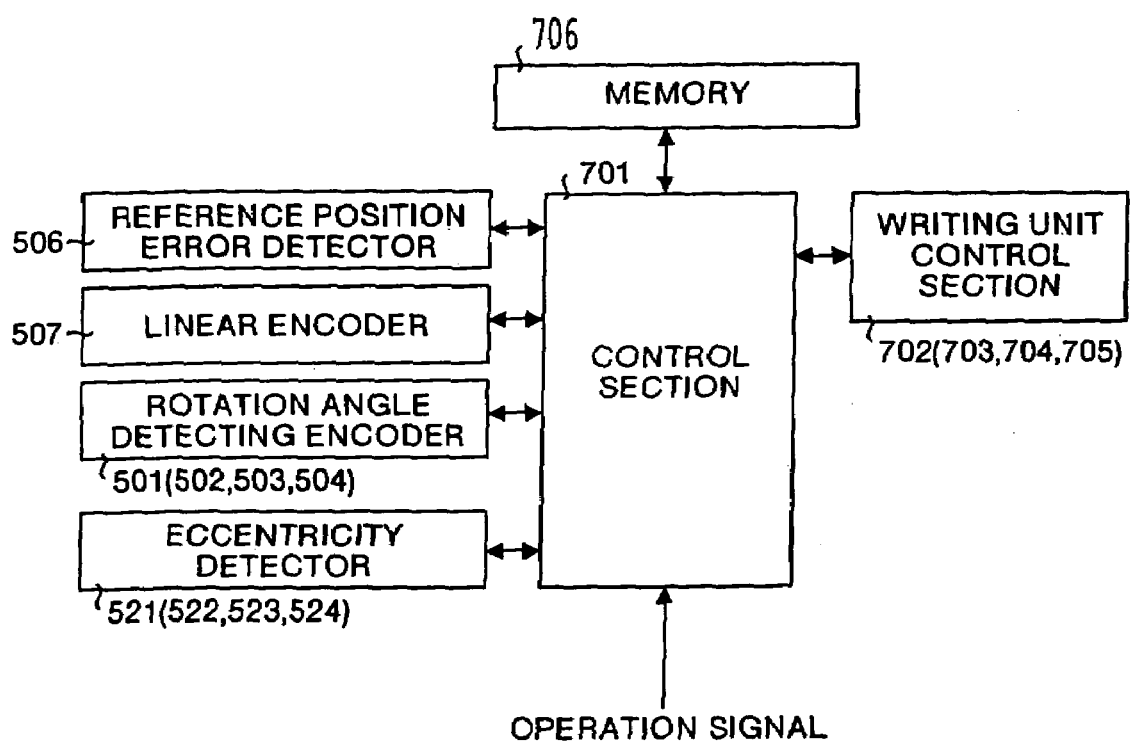
FIG. 23 is a block diagram that explains a structure for controlling the structure shown in FIG. 21.

FIG. 23 is a block diagram that explains the construction that controls the structure shown in FIG. 21. The construction shown in the Figure includes: a reference position error detector 506 described in FIG. 21, a linear encoder 507, rotation angle detecting encoders 501, 502, 503 and 504, eccentricity detectors 521, 522, 523 and 524, and a control section 701 to which information detected by the rotation angle detecting encoders 501, 502, 503 and 504 and the eccentricity detectors 521, 522, 523 and 524 is inputted, and which calculates the radius R and the eccentric position (ε, θ) based upon the information, and controls the writing unit control sections 702, 703, 704 and 705 based upon the calculated values.

In the construction shown in FIG. 23, the control section 701 functions as a timing adjusting means which adjusts generation timing of data to be written in each of the photosensitive drums, based upon actual measurement values of the eccentricity detectors 521, 522, 523 and 524, the reference position error detector 506, the linear encoder 507 and the rotation angle detecting encoders 501, 502, 503 and 504.

A memory 706 for storing the calculated values is connected to the control section 701. Moreover, operation signals for operating the image formation apparatus are inputted thereto. Four writing unit control sections 702, 703, 704 and 705 are installed in association with the respective writing units installed in the photosensitive drum C101, photosensitive drum M102, photosensitive drum Y103 and photosensitive drum K104.

The construction shown in FIGS. 21 and 23 detects the radius R, the eccentric position (ε, θ) and the rotation angle Θt through operations as described below. In other words, when an image forming process is started, the control device, not shown, which controls the entire image formation apparatus, drives the driving roller 106 so as to shift the conveyor belt 115. At this time, the linear encoder 507 detects the timing mark 510 of the conveyor belt 115. Based upon this signal, the control section 701 detects the shift amount of the conveyor belt 115, and thus detects that the conveyor belt 115 has been shifted the circumferential length L (2πR₀) of the ideal drum.

Here, the rotation angle detecting encoders 501, 502, 503 and 504 respectively input the rotation angles of the photosensitive drum C101, photosensitive drum M102, photosensitive drum Y103 and photosensitive drum K104 to the control section 701. Based upon the rotation angle θi of each photosensitive drum at which the conveyor belt 115 has been shifted length L, the control section 701 finds the actual radius R of each photosensitive drum from the following equation:

$$R = L/\theta i \quad (58).$$

Though the above-mentioned operations, the actual radiation R of each of the photosensitive drum C101, photosensitive drum M102, photosensitive drum Y103 and photosensitive drum K104 is calculated. The calculated radius R is outputted from the control section 701 to the memory 703, and stored therein. Moreover, the rotation detecting encoders 501, 502, 503 and 504 input the rotation angles of the photosensitive drum C101, photosensitive drum M102, photosensitive drum Y103 and photosensitive drum K104 to the control section 701. Then, the eccentricity detectors 521, 522, 523 and 524 input information related to eccentricities of the photosensitive drum C101, photosensitive drum M102, photosensitive drum Y103 and photosensitive drum K104 into the control section 701 as eccentricity signals. The control section 701 is allowed to obtain information related to the eccentric position (ε, θ) from the information related to the rotation angles of the photosensitive drums and the eccentricity signals.

(3) The Adjustments of the Image Forming Conditions in Accordance with the States of the Image Formation Apparatus Next, an explanation will be given of adjustments of the image forming conditions in the image formation apparatus in accordance with the calculated radium R (ε, θ). Here, in this case, θ is rotation angle information corresponding to the greatest eccentric amount ε at the instantaneous time of formation of the latent image. The control section 701 substitutes R and ε thus calculated into equation (57) so that the offset amount d during a period (θ=0 to 2π) of one rotation of each photosensitive drum. The offset amount d of the transfer positions on a sheet of paper, thus calculated, is stored as a reference table in the memory 703. Then, in accordance with the rotation angles inputted from the rotation angle detecting encoders 501, 502, 503 and 504, the control section 701 refers the offset amount d of the corresponding rotation angle so as to control the writing unit control sections 702, 703, 704 and 705.

In the control process, each of the writing unit control sections 702, 703, 704 and 705 adjusts the data writing timing of the latent image with respect to each of the photosensitive drums in response to the offset amount d so that the toner image is transferred onto a constant position on the conveyor belt 115 independent of the eccentricities of each photosensitive drum or the deviations in the radius of each photosensitive drum. Consequently, toner images of respective colors, cyan, magenta, yellow and black, transferred onto the respective photosensitive drums, are superposed on a sheet of paper without color offsets, and properly transferred, independent of the eccentricities of each photosensitive drum or the deviations in the radius of each photosensitive drum.

Moreover, in the construction shown in FIG. 23, the reference position error detector 506 detects the offset amount between the reference mark 511, shown in FIG. 22, and the toner image 601C, toner image 601M, toner image 601Y and toner image 601K. The offset amount, thus detected, is inputted to the control section 701. Upon formation of the toner image 601C (601M, 601Y, 601K), when this has been subjected to the correction of the offset amount d, the writing unit control sections 702, 703, 704 and 705 are controlled by the control section 701 so as to adjust the writing timing of the writing unit in response to the inputted offset amount.

Moreover, when the control section 701 forms the toner image 601C (601M, 601Y, 601K) without carrying out the correction of the offset amount d, calculation processes may be carried out based upon the offset amount detected by the reference position error detector 506 so as to correct the offset amount d; thus, control may be provided so as to correct deviations in the installation positions of the photosensitive drums. Through this control operation, the image formation apparatus of the third embodiment makes it possible to cancel offsets in the transfer positions even where there are deviations in the installation positions in the respective photosensitive drums.

Figure 24:
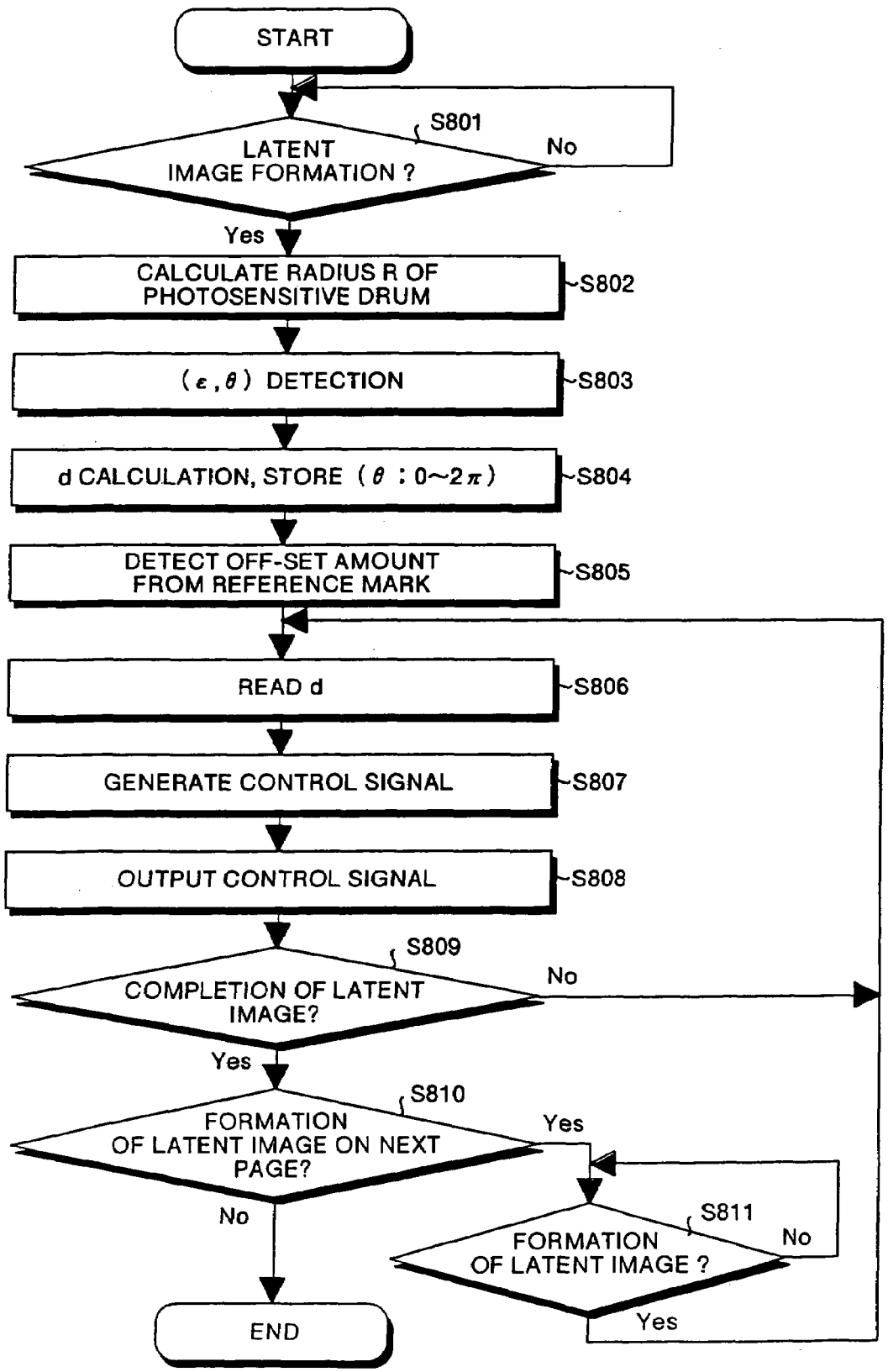
FIG. 24 is a flow chart that explains the detection of the state of the image formation apparatus and the adjustment on image forming conditions that are carried out in the image formation apparatus of the present invention.

FIG. 24, which explains the control method of the image formation apparatus carried out in the image formation apparatus of the third embodiment, is a flow chart that particularly shows the detection of the state of the image formation apparatus and the adjustments of the image forming conditions. A sequence of the processes shown in the flow chart of the Figure is started when the control section 701 receives an instruction for a latent image forming control by an operation signal (step S801), and until the instruction for the latent image forming control has been given (step 801: No), the sequence is in the stand-by state.

When the sequence is started, the control section 701 detects the shift amount of the conveyor belt 115 by the linear encoder 507 in a state where the conveyor belt is being driven by another control section not shown, thereby calculating the radius R of each photosensitive drum (step S802). Moreover, the eccentricity detectors 521, 522, 523 and 524 and the rotation angle detecting encoders 501, 502, 503 and 504 are used for detecting the eccentric position (ε, θ) (step S803) so that the offset amount d is calculated in combination with the radius R found in step S802. At this time, with respect to the offset amount d, all the values taken as θ varies from 0 to 2π in equation (57) are calculated. The offset amounts d thus calculated are stored in the memory 703 as a reference table (step S804).

Moreover, the control section 701 detects the offset amounts between the reference mark 509 and the toner images 601C, 601M, 601Y and 601K (step S805). Then, the offset amount d corresponding to the rotation angle of each photosensitive drum at the instantaneous time of the formation of the latent image is read out (step S806), and by taking into consideration both the offset amount d and the offset amount between the reference mark and the toner image, control signals for controlling the writing unit control sections 702, 703, 704 and 705 are generated (step S807). The control signals generated in step S807 are outputted to the writing unit control sections 702, 703, 704 and 705 (step S808).

Next, the control section 701 makes a judgment as to whether or not the latent image formation has been completed (step S809). When the judgment at step S809 shows that the latent image formation has not been completed (step S809: No), the sequence again returns to step S806 to read out the offset amount d, thereby generating a control signal to output to the writing unit control sections 702, 703, 704 and 705.

In contrast, when the judgment of step S809 shows that the image formation has been completed (step S809: Yes), a judgment is made as to whether or not a latent image formation for the next page is carried out (step S810). When this judgment shows that there is no latent image formation for the next page (step S810: No), the sequence of processes is completed. Here, the offset amount d is reset when the mechanical state of the image formation apparatus has been changed by, for example, maintenance of the image formation apparatus or a mechanical adjustment thereof, or it is reset periodically for every predetermined period. Moreover, the judgment at step S810 shows that there is a latent-image formation for the next page (step S810: Yes), the sequence proceeds to step S811.

Next, a judgment is made as to whether or not an instruction for a latent image formation is given (step S811) Then, upon receipt of the instruction for the latent-image formation (step S811: Yes), d is read from the memory 703 so that the writing unit control sections 702, 703, 704 and 705 are controlled. Moreover, during a period in which no instruction for the latent-image formation is given, the control section 701 is in the stand-by state to be ready for the instruction (step S811: No).

The above-mentioned controlling method of the image formation apparatus is realized by executing a preliminarily prepared program by using a controller, not shown. Alternatively, this program may be recorded on a recording medium that is read by a computer, such as a hard disk, a floppy disk, a CD-ROM, an MD and a DVD, and this is read by the computer, and transferred to the above-mentioned controller so as to be executed therein. Moreover, this program may be distributed through the recording medium or a network, such as the Internet, serving as a transmitting medium.

Here, the present invention is not intended to be limited by the third embodiment. For example, in the image formation apparatus in the present invention, in place of the rotation angle detecting encoder, a pulse generator for generating one pulse each time the photosensitive drum makes one rotation (reference position detection unit for detecting the reference position of the rotation angle of the photosensitive drum) may be used for detecting the rotation angle of the photosensitive drum. In the case when the pulse generator is used for detecting the rotation angle, in synchronism with the pulse generation cycle (period in which the photosensitive drum makes one rotation) of the pulse generator, a pulse generated by the linear encoder 507 is counted so that the rotation angle in which the photosensitive drum rotate while the linear encoder 507 generates one pulse is detected.

Moreover, in the case when the radius R of the photosensitive drum is found by using such a pulse generator, the shift amount (Lb) of the conveyor belt 115 while the photosensitive drum makes one rotation is detected by the linear encoder 507. Then, the radius R of the photosensitive drum is calculated by the following equation:

$$R = Lb/2\pi \quad (59).$$

Moreover, the control section 701 in the image formation apparatus of the present invention may have an arrangement in which a rotation angle detecting encoder is placed at any one portion of the photosensitive drum or the roller axis supporting the conveyor belt of the photosensitive drum, with the other photosensitive drums having no rotation angle detecting encoder being provided with the above-mentioned pulse generators; thus, it becomes possible to detect (introduce) the offset amount d in the transfer position on a sheet of paper on the conveyor belt 115 of the photosensitive drum.

Moreover, the radius R and the eccentric position (ε, θ) may be measured on the factory side prior to the shipment of the image formation apparatus, and these data may be stored in a flash memory installed inside the image formation apparatus.

Next, an explanation will be given of a fourth embodiment of an image formation apparatus in accordance with the present invention. The image formation apparatus of the fourth embodiment of the present invention has an arrangement in which the image formation apparatus described in the third embodiment is further provided with a motor which rotates the photosensitive drum K in synchronism with a pulse generated by the rotation angle detecting encoder every time the photosensitive drum rotates with a predetermined rotation angle, in order to reduce a slip between the photosensitive drum and the conveyor belt.

Figure 25:
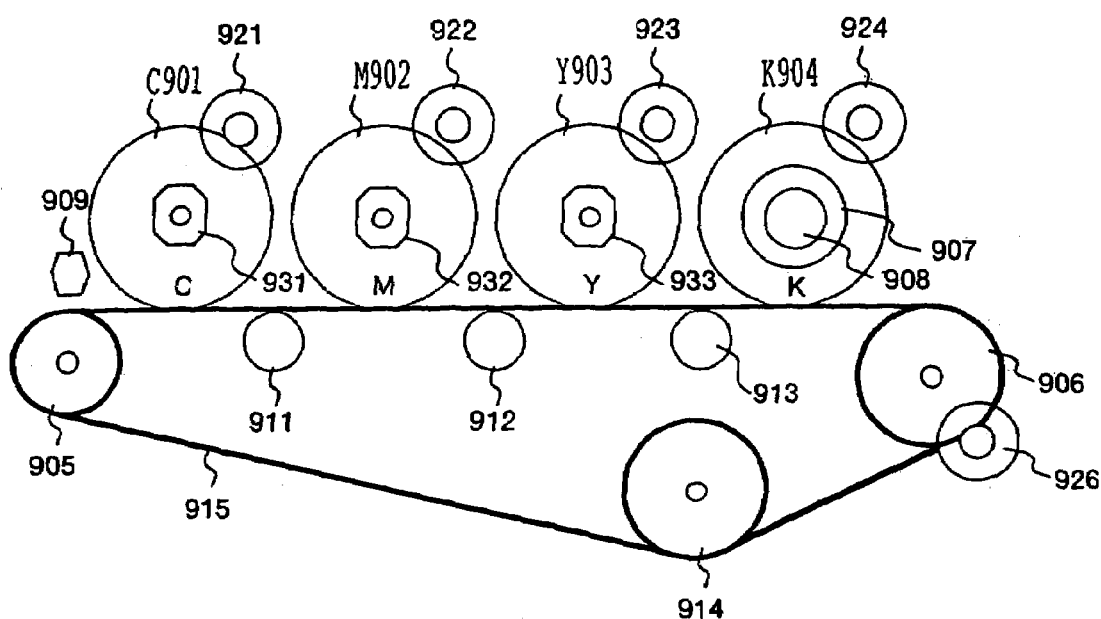
FIG. 25 is a drawing that explains an essential portion of the image formation apparatus of the present invention.

FIG. 25 is a drawing that explains an essential portion of the image formation apparatus of the fourth embodiment. In the same manner as the image formation apparatus of the third embodiment, the image formation apparatus shown in the Figure is a tandem-type image formation apparatus that is provided with a photosensitive drum C901, a photosensitive drum M902, a photosensitive drum Y903 and a photosensitive drum K904. Moreover, the image formation apparatus is provided with a conveyor belt 915, a roller 905 on which the conveyor belt 915 is passed, a roller 906, a tension roller 914, rollers 911, 912 and 913. Above the conveyor belt 915, a leading position detector 909 for detecting the leading edge of the conveyor belt 915 is installed so as to detect a reference mark, not shown, formed on the conveyor belt 915.

Here, the image formation apparatus of the fourth embodiment is also provided with an image-reading section such as a scanner, a paper-feeding section including paper-feeding cassettes, a fixing section for fixing a toner image on a sheet of paper, a paper-discharging section and a corona charger. Moreover, each of the photosensitive drum C901, the photosensitive drum M902, the photosensitive drum Y903 and photosensitive drum K904 has a writing unit for writing a latent image by scanning the surface with a laser light, a developing device for forming a toner image by supplying toner onto the latent image, a cleaner, a static charger, etc. These structures are also well-known structures; therefore, drawing indicating these and explanations thereof are omitted.

Here, the developing device provided in the photosensitive drum C901 supplies cyan toner, the developing device provided in the photosensitive drum M902 supplies magenta toner, the developing device provided in the photosensitive drum Y903 supplies yellow toner and the developing device provided in the photosensitive drum K904 supplies black toner.

In the image formation apparatus shown in FIG. 25, the photosensitive drum C901, the photosensitive drum M902 and the photosensitive drum Y903 are respectively provided with rotation angle reference position detectors 931, 932 and 933. Moreover, the photosensitive drum K904 is provided with a rotation angle detecting encoder 908. The rotation angle reference position detectors 931, 932 and 933 are provided with pulse detectors each of which generates a pulse each time the photosensitive drum rotates once, and an encoder for detecting the rotation angle of the photosensitive drum as an absolute value is used as the rotation angle detecting encoder 908.

Moreover, the photosensitive drum C901, the photosensitive drum M902, the photosensitive drum Y903, the photosensitive drum K904 and the roller 906 are respectively provided with load variation correcting motors 921, 922, 923, 924 and 926, and the photosensitive drum K904 has a motor 907 that is directly connected to the rotary axis.

The motor 907 is a motor that drives the conveyor belt 915 to rotate. In other words, the motor 907 rotates to allow the photosensitive drum K904 to rotate so that the conveyor belt 915 contacting the photosensitive drum K904 is shifted. In association with the rotation of the conveyor belt 915, the rollers 905, 906, 911, 912, 913 and the tension roller 914 are allowed to rotate. Moreover, the load variation correcting motors 921, 922, 923, 924 and 926 detect variations in the loads imposed on the photosensitive drum C901, the photosensitive drum M902, the photosensitive drum Y903, the photosensitive drum K904 and the roller 906, and the detected variations are subjected to the motor torque so as to reduce the load variations.

Between the photosensitive drum and the conveyor belt (or an intermediate transfer belt), between the photosensitive drum and paper, as well as between the paper and the conveyor belt, if a force in the belt shifting direction that is greater than a frictional force is applied to the place where the frictional force is generated, slipping occurs. The same is true for the contact portion between the belt and the belt driving roller. Thus, the load variation correcting control system is installed so as to prevent the force greater than the frictional force from being generated.

Here, the loads variations which are suppressed by the load variation correcting motors 921, 922, 923, 924 and 926 are loads generated by a cleaner, etc., located on the outer surface of the photosensitive drum or loads generated by a cleaner, etc., located on the periphery of the conveyor belt. These loads tend to vary periodically. Here, with respect to the control of the image formation apparatus by the rotation angle detecting encoder 908 and the motor 907 and the operations of the load variation correcting motors 921, 922, 923, 924 and 926, the description thereof will be given later.

Figure 26:
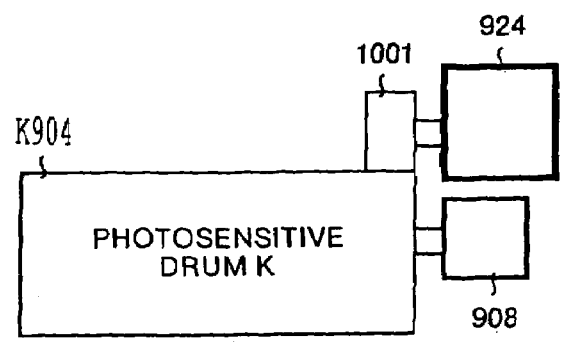
FIG. 26 is a drawing that explains a load variation correcting motor shown in FIG. 25.

As illustrated in FIG. 26, each load variation correcting motor (the load variation correcting motor 924, in the Figure) can be attached to the photosensitive drum (the photosensitive drum K904, in the Figure) at a portion outside an area in which a writing operation is performed through a comparatively small motor 1001. Thus, the application of the load variation correcting motor 924 makes it possible to increase the motor efficiency and to reduce power consumption, in comparison with the direct connection of the motor to the photosensitive drum, so that it is possible to use a smaller motor, and consequently to reduce the size of the image formation apparatus described in the fourth embodiment.

Moreover, in the image formation apparatus in the fourth embodiment, pulses generated by the rotation angle detecting encoder 908 are detected, and the measured values of the pulses are compared with the shift amount of the conveyor belt 915 detected by the leading position detector 909. Based upon these comparisons, it is possible to detect the shift amount of the conveyor belt 915 that is made while the photosensitive drum rotates once in the image formation apparatus of the fourth embodiment. Alternatively, it is possible to detect the number of pulses generated by the rotation angle detecting encoder 908 while the conveyor belt 915 rotates once.

Furthermore, in the image formation apparatus of the fourth embodiment, which relates to the image formation apparatus of the third embodiment that uses a driving roller to shift the conveyor belt, the shift amount of the conveyor belt that is made while the photosensitive drum rotates once is preliminarily stored. Alternatively, the number of pulses generated by the rotation angle detecting encoder 908 while the conveyor belt 915 rotates once is preliminarily stored. Then, the shift amount thus stored is compared with the detected shift amount of the conveyor belt 915, and if the difference exceeds a permissible range, makes a judgment that the image formation apparatus is in an abnormal state.

Figure 27:
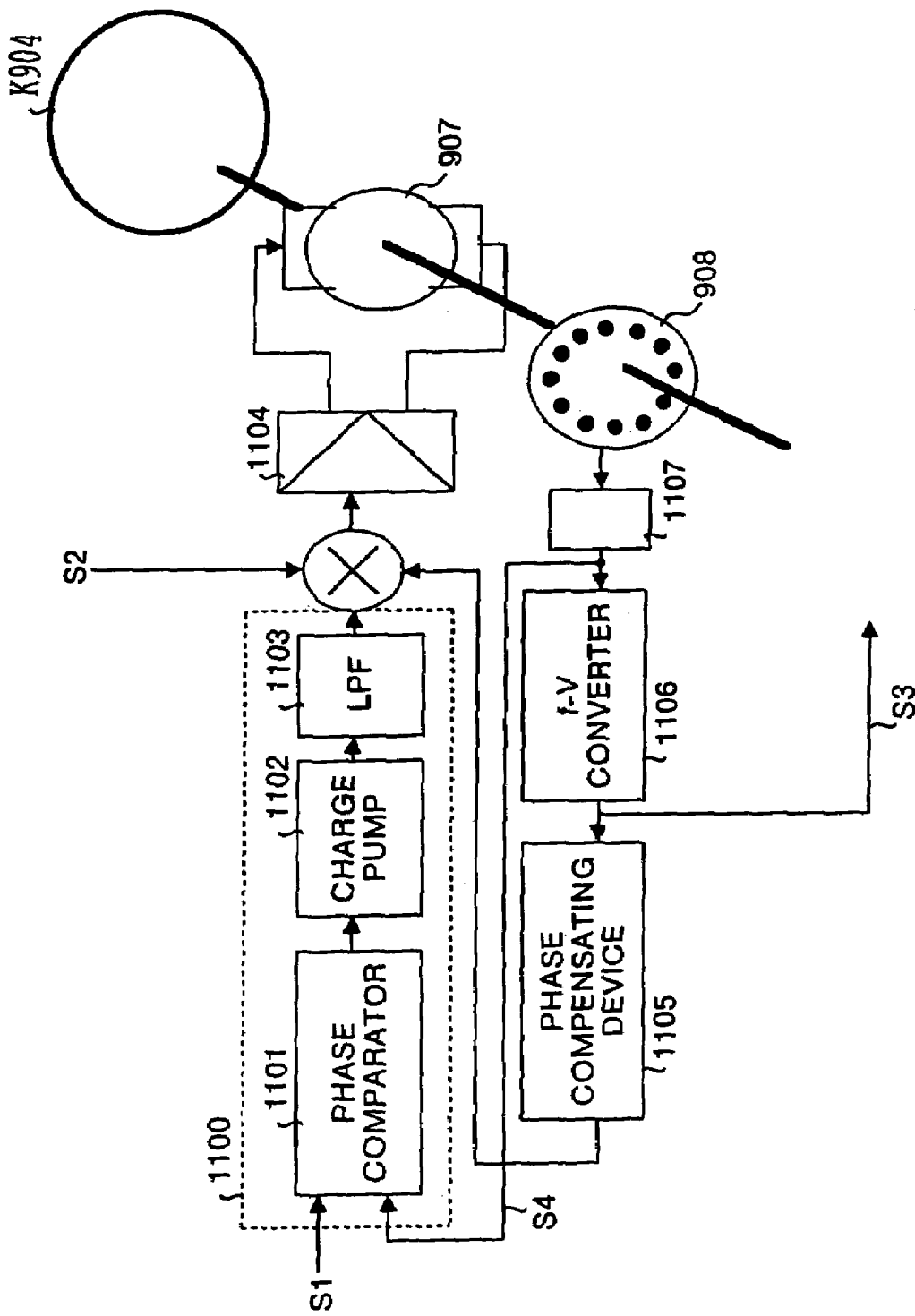
FIG. 27 is a block diagram that explains the control of the image formation apparatus executed by a rotation angle detecting encoder and a motor 907.

FIG. 27 is a block diagram that explains the controlling operation of the image formation apparatus carried out by the rotation angle detecting encoder 908 and the motor 907.

The construction, shown in FIG. 27, is provided with: a photosensitive drum K904, a motor 907 for rotating the photosensitive drum K904, the rotation angle detecting encoder 908 for detecting the rotation angle of the photosensitive drum 904, a control circuit 1100 for controlling the motor 907 based upon a signal detected by the rotation angle detecting encoder 908, a power amplifier 1104, a phase compensating device 1105, an f-V converter 1106 and an encoder pulse detector 1107.

Moreover, the control circuit 1100 is provided with a phase comparator 1101, a charge pump 1102, and LPF (Low Pass Filter) 1103.

For example, the control section of the motor 907, not shown, prepares a pulse that is equal in frequency to a pulse that has been outputted by the rotation angle detecting encoder 908 when the photosensitive drum K904 has reached a target rotation velocity ω, and outputs this pulse to the phase comparator 1101 as a reference pulse S1. The phase comparator 1101 receives a pulse signal S4 formed based upon a pulse that the rotation angle detecting encoder 908 has actually outputted, and compares this with the reference pulse S1 to calculate a phase difference between them. The calculated value is converted into a voltage signal that is represented in an analog format after passing through the charge pump 1102 and the LPF 1103, and further inputted to the power amplifier 1104. The above-mentioned process is a well-known process, that is, a so-called PLL (Phase Locked Loop) process.

Here, the pulse, generated by the rotation angle detecting encoder 908, is outputted to the f-V converter 1106 through the encoder pulse detector 1107. The f-V converter 1106 converts the pulse to a voltage signal to generate a voltage signal S3 that is proportional to the angular velocity of the photosensitive drum K904. This voltage signal S3 is fed back to the power amplifier 1104 through the phase compensating device 1105 so that the velocity controlling characteristic of the photosensitive drum is improved.

Moreover, since the voltage signal S3 is directly proportional to the angular velocity of the photosensitive drum K904, this is outputted to other constructions as the signal indicating the rotation velocity of the photosensitive drum K904 so as to be used for velocity control in other systems constituted by the photosensitive drum and the conveyor belt.

Moreover, in the case when the photosensitive drum K904 is not provided with the load variation correcting motor 924, variations in the load (magnitude, timing) imposed on the photosensitive drum K904 are preliminarily found, and these variations in the load are applied thereto from the external device as a feed forward signal S2. Such a feed forward control makes it possible to improve the velocity control characteristic of the photosensitive drum even when no load variation correcting motor 924 is installed.

Here, the timing and magnitude of load variations imposed on the photosensitive drum in an apparatus forming electronic photographs (a printer or a copying machine) are preliminarily known. Thus, the above-mentioned feed forward control is available.

Figure 28:
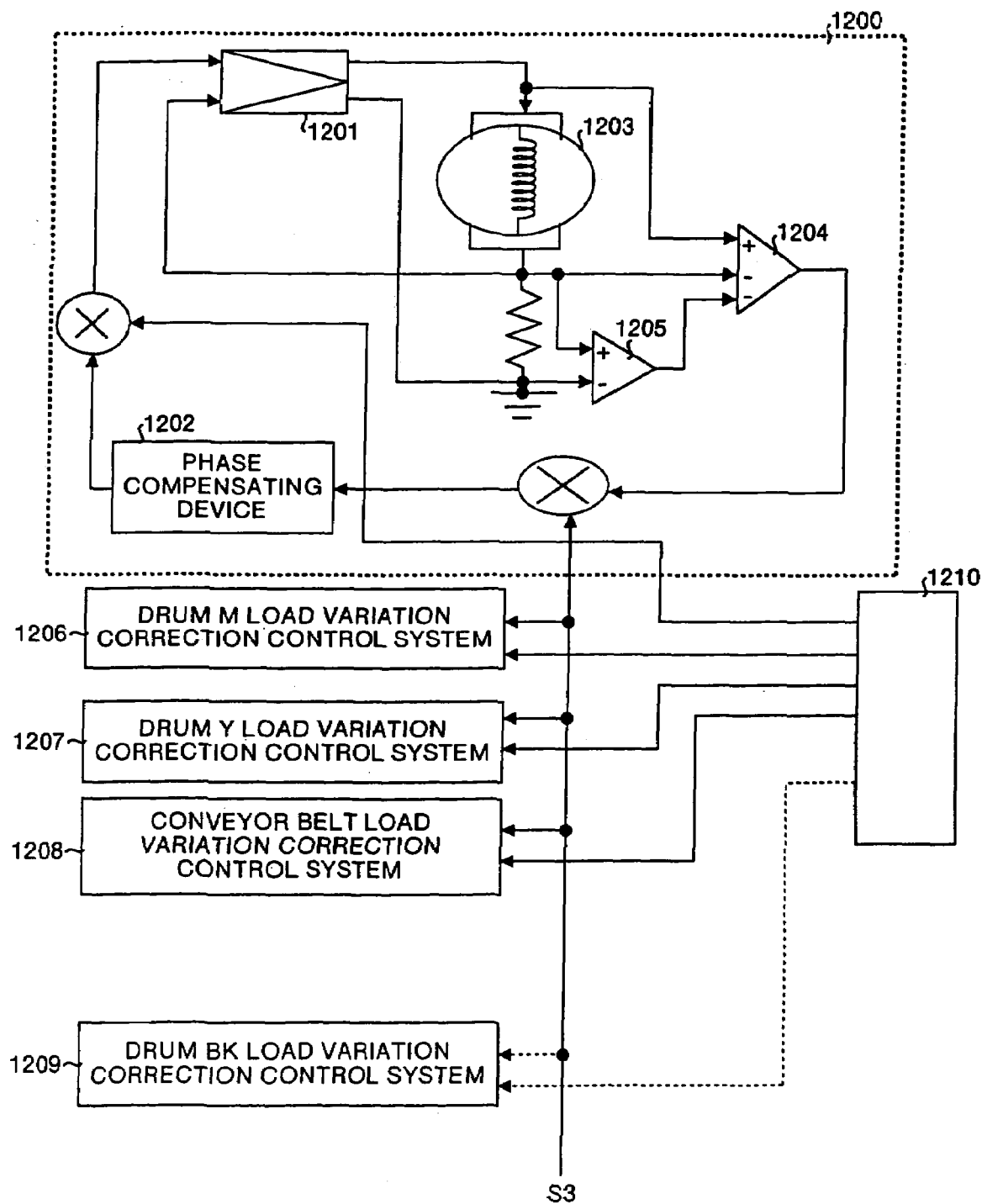
FIG. 28 is a block diagram that explains a structure for controlling the load variation correcting motor.

FIG. 28 is a block diagram that explains the construction for controlling the load variation correcting motor. The construction, shown in the Figure, is provided with a drum-C load variation correcting control system 1200, for correcting the load variations in the photosensitive drum C901, a feed forward signal generator 1210, a drum-M load variation correcting control system 1206 for correcting the load variations in the photosensitive drum M902, a drum-Y load variation correcting control system 1207 for correcting the load variations in the photosensitive drum Y903, a drum-BK load variation correcting control system 1209 for correcting the load variations in the photosensitive drum K904 and a conveyor belt load variation correcting control system 1208 for correcting the load variations in the conveyor belt 915.

Moreover, the drum-C load variation correcting control system 1200 is provided with a current supply type power amplifier 1201, a phase compensating device 1202, a load variation correcting motor 921, a rotation motor reverse electromotive force detector 1204 and a comparator 1205 for use in the rotation motor reverse electromotive force detection.

The above-mentioned construction makes it possible to cancel the load variations in the photosensitive drum by using the torque of the load variation correcting motor 921, so as to minimize the influences that are given by the load variations in the photosensitive drum to the other photosensitive drums through the conveyor belt.

The feed forward signal generator 1210 inputs signals for generating torques for canceling the known load variations (magnitude, timing) improved on the photosensitive drum C901, photosensitive drum M902, photosensitive drum Y903, photosensitive drum K904 and the conveyer belt 915, that is, feed forward signals, into the corresponding control systems, that is, the drum-C load variation correcting control system 1200, the drum-M load variation correcting control system 1206, the drum-Y load variation correcting control system 1207, the drum-BK load variation correcting control system 1209 and the conveyor belt load variation correcting control system 1208.

Moreover, the voltage signal S3 is respectively inputted to the drum-C load variation correcting control system 1200, the drum-M load variation correcting control system 1206, the drum-Y load variation correcting control system 1207, the drum-BK load variation correcting control system 1209 and the conveyor belt load variation correcting control system 1208. The signal S3 is a signal for determining the rotation velocity of the load variation correcting motor. In this case, with respect to the conveyor belt load variation correcting control system, the signal S3 is converted to a value so as to allow the conveyor belt 915 and the photosensitive drum to rotate integrally, thereby forming a reference signal that determines the rotation of the motor, and this signal is inputted thereto.

Moreover, the reference signal for each of the photosensitive drums, inputted to the load variation correcting control system, may be formed into a reference signal for determining the rotation of the motor, which is obtained by taking into consideration the deviations in the radius of the photosensitive drum to make a correction. Furthermore, the drum-C load variation correcting control system 1200 of FIG. 28 detects a reverse electromotive force generated in proportion to the rotation velocity of the load variation correcting motor 921, and compares this with the voltage signal S3 so as to control the velocity. In the fourth embodiment, the other load variation correcting control systems also have the same circuit construction. The load variation correcting control system provides control so that even when there is a load variation in the speed determined by the reference signal for determining the rotation of the load variation correcting motor, the rotation is maintained. In other words, consequently, the amount of the load variations that is transmitted to the other driving systems is reduced, with the result that it is possible to reduce slipping that occurs between the photosensitive drum and the conveyor belt or a sheet of paper.

In accordance with the above-mentioned operations, the load variation correcting motors 921, 922, 923, 924 and 926 are controlled in response to the rotation angular velocity of the motor 907 for driving the photosensitive drum 904. For this reason, the image formation apparatus of the third embodiment is provided with a construction in which even at the time of activation, the photosensitive drum and the conveyor belt 915 are less susceptible to slipping (in which only either of the photosensitive drum and the conveyor belt 915 is shifted). Here, the reverse electromotive force generated in the load variation correcting motor 921 can be detected by subtracting an inner resistance value from the voltage applied to the terminal. Moreover, in order to improve the controlling characteristics of the construction shown in FIG. 28, the current supply type power amplifier 1201 is used as the power amplifier and the phase compensating device 1202 is installed.

For another construction example, the signal for determining the rotation angular velocity of the load variation correcting motor may be generated by a controller, not shown. Although other control modes such as starting and stopping modes are not described in the third embodiment, these can be achieved by using the conventional technique.

As described above, in accordance with the image formation apparatus of the third embodiment, the driving system including the photosensitive drum and the conveyor belt 915 is velocity-controlled by the motor 907, and the load variations imposed on the other photosensitive drums and the conveyor belt 915 that are driven in accordance with the photosensitive drum K904 rotated by the motor 907 are corrected by the individual control systems.

Figure 29:
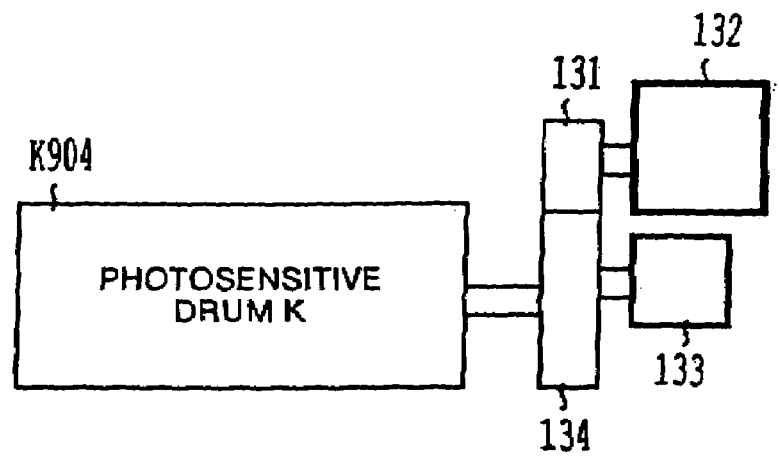
FIG. 29 is a drawing that shows another structural example of the load variation correcting motor.

Next, an explanation will be given of another structural example of the load variation correcting motor of the fourth embodiment. FIG. 29 is a drawing that shows an example of the load variation correcting motor in which: a roller 134 is installed on the rotary axis of the photosensitive drum K904, and the roller 131, which is directly rotated by the load variation correcting motor 132, is allowed to contact the roller 134 so as to drive this. Here, reference number 133 represents an encoder. In the construction shown in FIG. 29, it is possible to improve the degree of freedom for the structure for transmitting the driving force of the load variation correcting motor 132 to the photosensitive drum K904.

Figure 30:
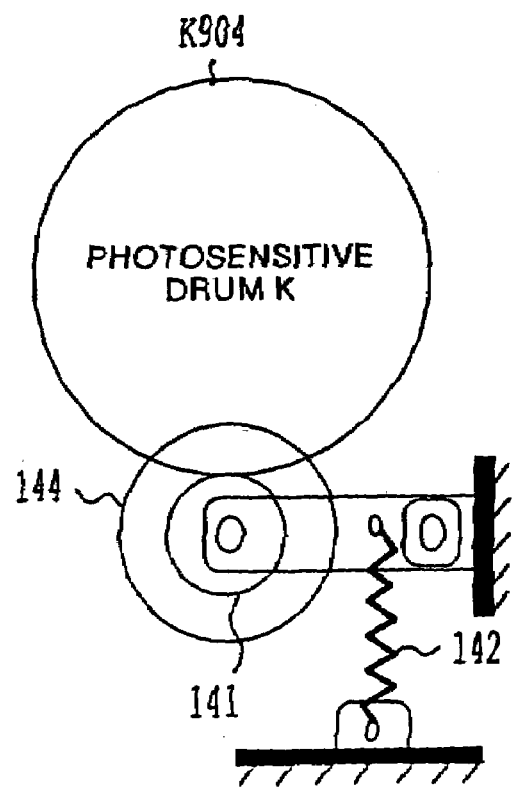
FIG. 30 is a drawing that shows still another structural example of the load variation correcting motor.

FIG. 30 is a drawing that shows an example of the load variation correcting motor that supports a roller 141 rotated a the load variation correcting motor 144 by using a spring 142. In accordance with the construction shown in FIG. 30, it is possible to sufficiently transmit the driving force of the load variation correcting motor 144 to the photosensitive drum K904.

Figure 31:
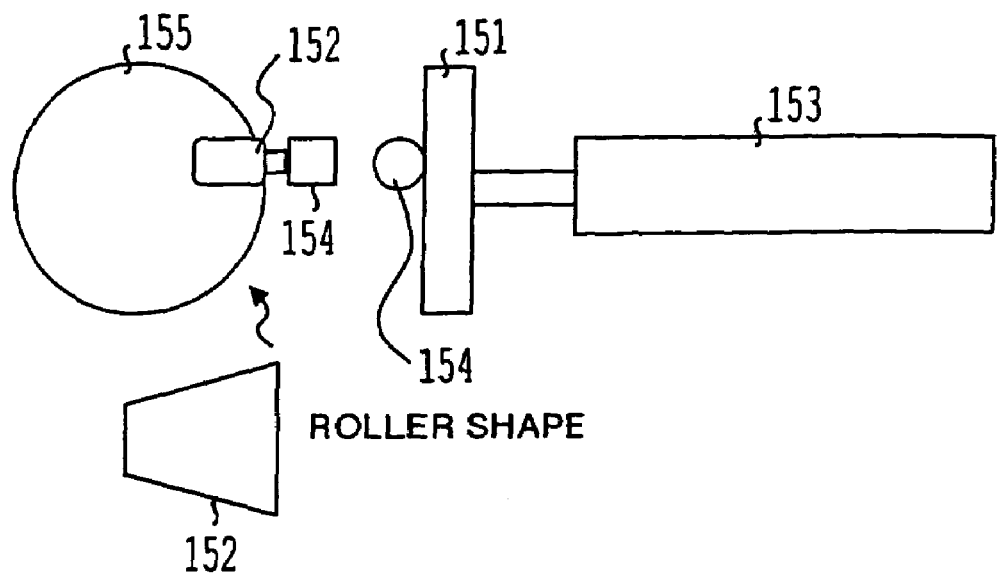
FIG. 31 is a drawing that shows the other structural example of the load variation correcting motor.

FIG. 31 is a structural example of the load variation correcting motor in which a disc-shaped transmitting member 151 directly connected to a photosensitive drum 153 and a roller 152 for stably transmitting the driving force of a driving source 154 are used. In the contact portion of the transmitting member 151 and the roller 152, the transmitting member 151 side has a flat face and the roller 152 has a tapered shape so as to increase the contact portion, thereby providing a stable transmitting characteristic (characteristic for preventing slipping). The rotary axis of the driving source 154 is not in parallel with the surface orthogonal to the rotary axis of the transmitting member 151.

Moreover, in the image formation apparatus of the fourth embodiment, the rotary axis of the photosensitive drum or the driving roller (roller 906 in the fourth embodiment) may be provided with an inertia load unit such as a flywheel. By installing the inertia load unit such as the flywheel, it is possible to reduce load variations in the high-frequency area in the photosensitive drum or the conveyor belt, and consequently to provide a stable load variation correcting control operation or entire driving. controlling operation; thus, it becomes possible to easily prevent slipping. Here, in the case when the flywheel is attached to the rotary axis of the photosensitive drum or the driving roller, if this is attached directly to the rotary axis of the photosensitive drum, the resulting defect is that the image formation apparatus becomes heavier.

Figure 32:
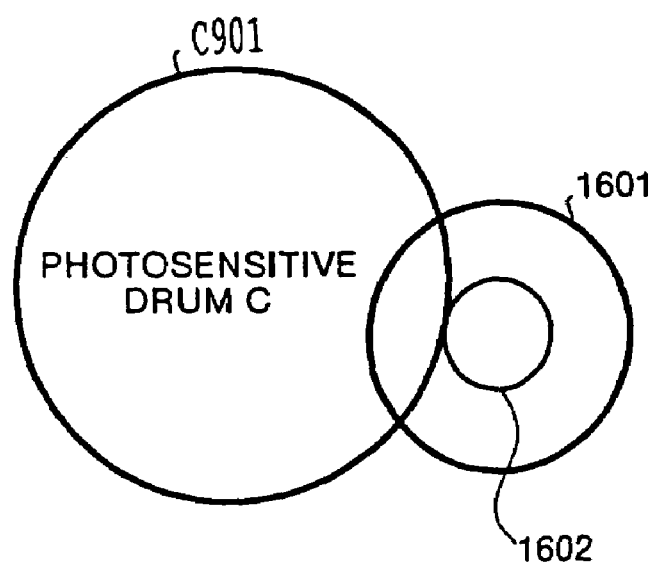
FIG. 32 is a drawing that shows a structural example of a flywheel.

In order to eliminate this defect, for example, as illustrated in FIG. 32, a flywheel 1601 is indirectly attached to the photosensitive drum (photosensitive drum C901, in the Figure) through a torque transmitting roller 1602. In the structure shown in FIG. 32, as compared with a case in which the inertia load is attached to the same axis of the photosensitive drum, the inertia moment of the flywheel 1601 viewed from the driving axis of the driving axis of the photosensitive drum is represented by a square of the radii of the photosensitive drum C901 and the transmitting roller 1602. Therefore, a comparatively light weight flywheel can be used so as to obtain a required inertia moment so that it is possible to achieve a light-weight image formation apparatus.

Moreover, with respect to the structure of the flywheel, the heavier the outer circumferential portion, the greater the inertia to be given to the photosensitive drum. For this reason, the outer circumferential portion of the flywheel is made thicker than the inner circumferential portion thereof so that it is possible to obtain a lightweight apparatus while obtaining an inertia required.

Moreover, in the image formation apparatus of the fourth embodiment, the rotation angle detecting encoder for detecting the rotation angle as an absolute value may be installed in the photosensitive drum. Alternatively, in the image formation apparatus of the present invention, an encoder (belt shift amount detecting encoder), which generates a pulse each time the conveyor belt 915 shifts a predetermined length by detecting the reference mark put on the conveyor belt 915 using the leading position detector 909, may be installed.

Figure 33:
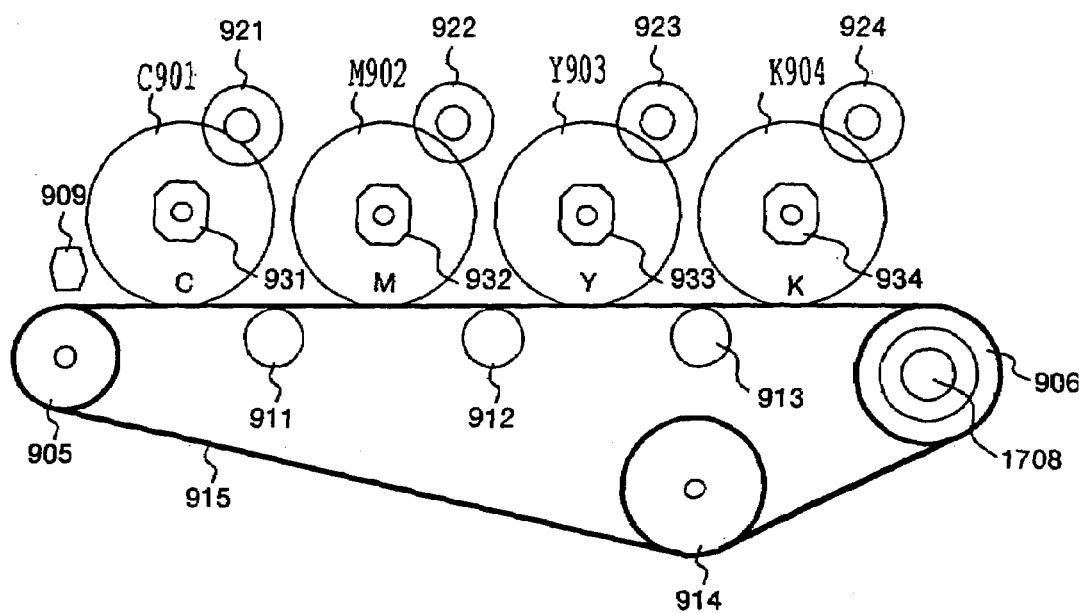
FIG. 33 is a drawing that shows another structural example of an image formation apparatus in accordance with the present invention.

Furthermore, a motor which is operated based upon a signal generated by the rotation angle detecting encoder or the conveyor belt shift-amount detecting encoder may be installed on the conveyor belt side. FIG. 33 shows a construction in which, in place of the motor 907, a motor 1708 that is a driving source for driving the conveyor belt is installed. Here, since the construction shown in FIG. 33 is virtually the same as the construction shown in FIG. 25, those members that have the same structures and functions as those of FIG. 25 are indicated by the same reference numbers, and the description thereof is omitted.

In the construction shown in FIG. 33, the motor 1708 is directly connected to the conveyor belt, with the result that the contact area between the conveyor belt 915 and the roller 906 becomes larger. For this reason, the permissible amount of the load variations imposed on the conveyor belt is made greater. Moreover, in the image formation apparatus of the fourth embodiment, the roller 906 and the motor 1708 may be indirectly connected through a gear.

Moreover, in the fourth embodiment, the load variation correcting motors are placed on both of the photosensitive drum side and the conveyor belt side. However, the image formation apparatus of the present invention is not limited to such a construction, and like the construction shown in FIG. 33, the load variation correcting motor may be placed only on the photosensitive drum. In other words, the load variation correcting motor is installed on the side that has no motor driving the entire system between the photosensitive drum and the conveyor belt so that while reducing an increase in the number of members to be added to the image formation apparatus, the driving property of the conveyor belt can be improved.

Here, in FIG. 25 or FIG. 33, the rotation angle detecting encoder is connected to the photosensitive drum K904 or the belt driving roller 906 that is driven by the motor 907, 1708 that drives the entire system. In other words, the construction carries out the controlling operation by feeding back a detector in the vicinity of the driving source. This construction makes it possible to reduce the possibility of any unstable mechanical factors (resonance or mechanical deviations) occurring between the driving source and the detector.

Moreover, the image formation apparatus of the fourth embodiment may be applied to an image formation apparatus of a multiple-writing system for simultaneously writing respective latent images on the respective photosensitive drums using a plurality of beams.

In accordance with the fourth embodiment as described above, it is possible to provide an image formation apparatus which is less susceptible to slipping between the photosensitive drum and the conveyor belt and can stably form images that are free from color offsets. In other words, it becomes possible to provide an image formation apparatus which can provide image with high-quality that are free from color offsets and image distortion, even when there are load variations imposed on the photosensitive drum and the conveyor belt due to a cleaner, etc., and variations in the transfer position due to eccentricities in the photosensitive drum and deviations in the radius thereof.

Here, when there is an eccentricity in the photosensitive drum, at laser exposing position E on the photosensitive member in FIG. 20 at which a latent image is formed through exposure made by a laser beam, etc., the linear velocity is varied due to the eccentricity. The main scanning (which is a scanning method in a direction orthogonal to the sub-scanning method carried out in the rotation direction of the photosensitive member) beam, which is applied onto the photosensitive drum by the known polygon mirror, is applied out in a constant time interval.

This results in variations in the scanning pitch in the sub-scanning direction formed on the photosensitive member due to the eccentricity. The above descriptions have discussed systems for reducing color offsets and image distortion in an image. In other words, although the line density of the image formed by each photosensitive drum has deviations, the positional variations of the image thus formed are reduced.

In other words, although the above descriptions have provided means for eliminating the positional deviations in an image transferred from each photosensitive drum to a sheet of paper, no descriptions have been given of the variations in the scanning pitch generated due to eccentricities in the photosensitive drum, that is, the deviations in the line density. In exposure position E in FIG. 20, the linear velocity (peripheral velocity) LE in the tangential direction of the photosensitive drum of the photosensitive drum is virtually represented as follows:

$$LE = e\omega \cos \beta \tag{60}$$

In the case when a latent image formed at this point E is developed and transferred at transfer position $T_1$, with respect to the linear velocity LT in the tangential direction of the photosensitive drum, the relationship, LT=LE, holds. In other words, when the linear velocity is LE, the resulting transferring process is carried out on the belt without slipping, no irregularities occur in the density in the transferred image that has been exposed at exposure point E, and formed. That is, by providing a construction in which the contact portion between the photosensitive drum and the belt or a sheet of paper forms an apex in the belt direction on the circle cross-section of the photosensitive drum and the exposure is carried out at point E, the deviations in the density in the image are automatically corrected.

Since no other conditions provide the relationship LT=LE, it is not possible to correct the deviations in the density in an image in any other conditions. In the case when an exposing process is made at an exposure position other than point E, that is, at a position on an extended line from the rotary axis of the photosensitive drum that is shifted with an angle z from point E clockwise around the rotary axis thereof, the shift amount d(z) is represented by the following equation:

$$d(z) = (\pi+z)(R_0 - R) + R\sin^{-1}[(\epsilon/R)\cos\theta] \tag{61}$$

When image data is generated in accordance with this data, it is possible to correct color offsets and image distortion; however, it is not possible to correct the line density. When provision is made so that the deviations in the line density, that is, the phases of variations, are made coincident with each other in transferred images on a sheet of paper that are formed by the respective photosensitive drums, the respective superposed colors are improved on a line basis, thereby providing an image with high quality.

This is achieved by controlling the relationship of the eccentric positions ($\epsilon$, $\theta$) among the photosensitive drums so that the respective phases are made coincident with each other so as to allow the line velocities on the exposure surfaces of the respective photosensitive drums to be as close as possible, upon formation of the respective latent images (upon laser exposure on to the photosensitive drum) that are to be superposed on a sheet of paper to form color images formed by the respective photosensitive drums. In FIGS. 25 and 33, either the load variation correcting motor or the motor for driving the entire system is installed in each photosensitive drum. Moreover, as described earlier, the means for measuring the eccentric position is also provided therein.

Figure 34:
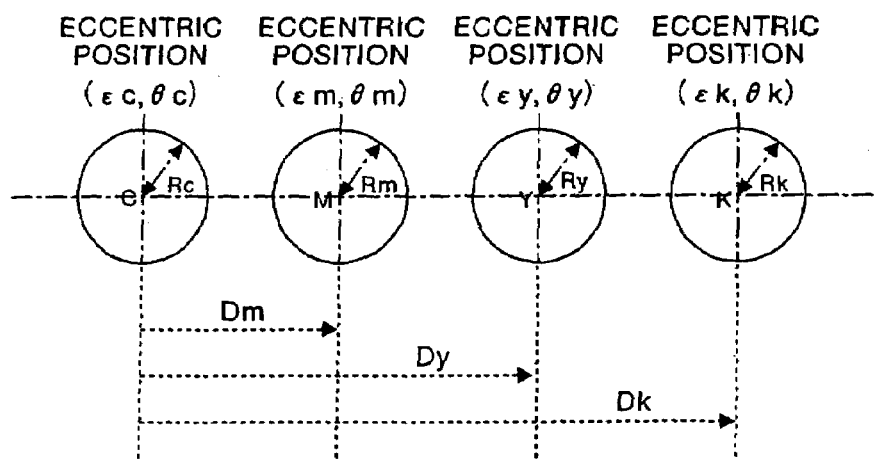
FIG. 34 is a drawing that explains a step of adjusting a line density variation position of a latent image formed on each photosensitive drum.

In the construction shown in FIG. 25 or FIG. 33, although its entire system is not shown, the conveyor belt system including the rollers 906, 905, 911, 912, 913 and the tension roller 914 is shifted downward, and the contact between the conveyor belt and each photosensitive drum is eliminated so that the respective photosensitive drums are allowed to move independently. Here, in order to allow the varied phases in the line density in latent images formed on the respective photosensitive drums due to eccentricities in the photosensitive drums to coincide with one another on transferred images on a sheet of paper, the respective photosensitive drums are rotated and adjusted. Referring to FIG. 34, the following description will discuss these operations.

In FIG. 34, on the assumption that the distance between the photosensitive drum C and the photosensitive drum M is Dm, the distance between the photosensitive drum C and the photosensitive drum Y is Dy, the distance between the photosensitive drum C and the photosensitive drum M is Dk, the radius of the photosensitive drum C is Rc, the eccentric position is ($\epsilon_c$, $\theta_c$), the radius of the photosensitive drum M is Rm, the eccentric position is ($\epsilon_m$, $\theta_m$), the radius of the photosensitive drum Y is Ry, the eccentric position is ($\epsilon_y$, θy), the radius of the photosensitive drum K is Rk and the eccentric position is (εk, θk), in order to superpose an image formed by the photosensitive drum M on an image on a sheet of paper formed by the photosensitive drum C, provision is made so that, after the image on the sheet of paper formed by the photosensitive drum C has moved the distance Dm, the image formed by the photosensitive drum M is superposed thereon; and in this case, with respect to the phase difference θcm in the exposure timing between the photosensitive drum C and the photosensitive drum M, θcm=Dm/Rm holds.

In this case, when the phase difference in the eccentric positions is set to θcm, the linear velocities at the time of exposure on the exposing surfaces of the two photosensitive drums for forming images to be superposed are made as close to each other as possible. Since there are deviations in the respective drum diameters, it is impossible to make the images formed by the two photosensitive drums completely coincident with each other, and the deviations become greater as the position in question proceeds from the leading end toward the rear end. In order to reduce the offset that occurs due to the deviations in the photosensitive drum diameters, it is preferable to slightly correct θcm so as to have the minimum offset virtually in the center of the sheet of paper.

In the same manner, the phase difference θcy in the eccentric position of the photosensitive drum Y is set to θcy=Dy/Ry, and the phase difference θck in the eccentric position of the photosensitive drum K is set to θck=Dk/Rk. In other words, on the assumption that the measured value of the angle position (eccentric angle) at the time of the greatest eccentricity of the photosensitive drum C is θc, with respect to the photosensitive drums M, Y and K, the rotation angle position control is carried out so as to set as follows: the eccentric angle θm of the photosensitive drum M is set to θm=θc−θcm, the eccentric angle θy of the photosensitive drum Y is set to θy=θc−θcy, and the eccentric angle θk of the photosensitive drum K is set to θk=θc−θck.

Upon completion of these operations, the entire conveyor belt system is returned to the original position to allow the photosensitive drums and the conveyor belt to contact each other. In this case, when a rotation angle encoder for measuring the absolute value of the rotation angle is attached to all the photosensitive drums, the phases in eccentricities can be made coincident with each other by using the conventional rotation angle positional control for driving the rotary motor while detecting the encoder output.

In another structural example in which, in place of the rotation angle encoder, a pulse generator (reference angular position detector) for generating one pulse each time the photosensitive drum rotates once is used, it is not possible to determine the angular position while feeding the angular position back. In this case, in accordance with the rotation angle required for making a correction, a driving current as shown in FIG. 35 is supplied to the rotation motor so as to carry out this operation. 117.

Figure 35:
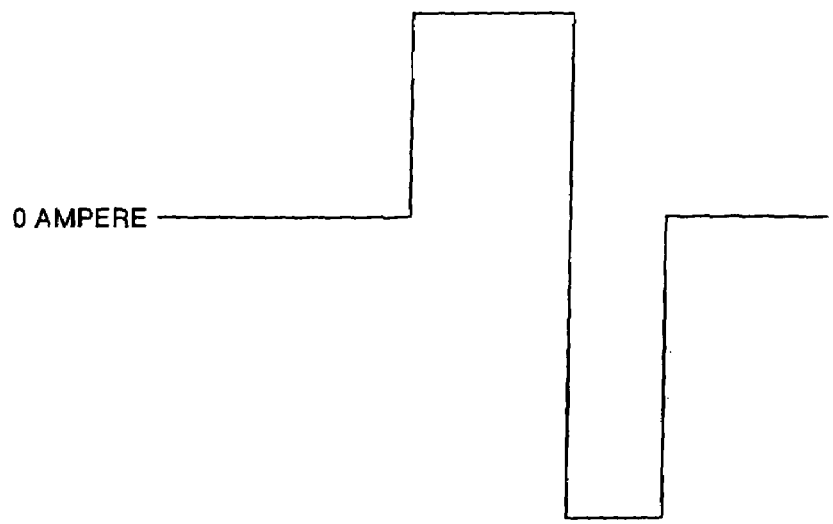
FIG. 35 is a drawing that explains a method for detecting the rotation angle of the photosensitive drum.

The rotation angle shift amount is determined by changing the pulse width or the amplitude in FIG. 35. This method has been known as the Bang-Bang control. After correction has been made using this method, the entire conveyor belt system is returned to the original position to allow the photosensitive drums and the conveyor belt to contact each other, and the eccentric position is confirmed by using the above-mentioned method, and when it is not within a target angular position, the entire conveyor belt system is shifted downward, and the angular position correction is carried out by carrying out the same operations. By repeating these operations, the precision is improved. Thus, it is possible to reduce degradation in the image due to eccentricities in the respective photosensitive drums.

However, when there are deviations in the drum diameter, the phase gradually comes to have deviations as the printing or copying process is repeated. These deviations can be corrected by carrying out the above-mentioned operations so as to adjust the phases in the eccentric positions of the respective photosensitive drums upon activation or shut down of the printer or the copying machine, or upon completion of a predetermined number of prints or copies.

In the above-mentioned embodiments, explanations have been given of constrictions in which the photosensitive drums and the conveyor belt for carrying out sheets of paper are provided. In other words, the explanations have dealt with the system in which a toner image formed on a photosensitive drum is directly transferred from the photosensitive drum to a sheet of paper. With respect to other structural examples, the same descriptions are, of course, applied to a system in which toner images formed on respective photosensitive drums are transferred on a belt (intermediate transfer belt) to form a color image thereon without using a sheet of paper, and this color image on the intermediate transfer belt is transferred onto a sheet of paper by using the known method. In this case, the same descriptions related to the transferring process on to paper can be applied to the transferring process onto the intermediate transfer belt. In other words, the same descriptions related to the method for reducing color offsets or image distortion on the belt and to the system for making the phases in the line density coincident with each other to properly superpose the respective colors are applicable in the same manner.

Next, the following description will discuss fifth, sixth and seventh embodiments of an image formation apparatus in accordance with the present invention. In the image formation apparatus of the fifth, sixth and seventh embodiments, in addition to the image formation apparatus described in the third embodiment, in order to reduce slipping between the photosensitive drum and the conveyor belt, a motor, which drives to rotate the conveyor belt driving motor in synchronism with a pulse generated by the rotation angle detecting encoder attached to the driving roller supporting the conveyor belt each time the conveyor belt has moved a predetermined distance, is attached thereto. The third embodiment is applicable when no slipping exists between the photosensitive drum and the belt or between the photosensitive drum and paper.

The fifth, sixth and seventh embodiments have been devised based upon the following ideas. In other words, what is taken into consideration is that when a frictional force between the photosensitive drum and the belt, between the photosensitive drum and paper, or between the paper and the conveyor belt, is small, slipping tends to occur. In other words, provision needs to be made so as to reduce control errors of the load variation correcting control system that provides control to cancel the above-mentioned load variations by generating a force opposing to the load variations imposed on the respective photosensitive drums. In other words, the force in the belt shifting direction, imposed on the conveyor belt or a sheet of paper, that is generated due to control errors becomes greater than the frictional force, slipping occurs. The fifth, sixth and seventh embodiments have been devised to deal with these cases.

The fifth embodiment is provided with a load variation correcting control system which detects a reverse electromotive force that is in direct proportion to the rotation velocity of the load variation correcting motor, compares this with a reference velocity signal for determining an appropriate rotation speed so as to provide controlling operations. The sixth embodiment is provided with a load variation correcting control system which compares a phase difference between a pulse that is generated once for each rotation of the photosensitive drum with a reference pulse that has an appropriate pulse interval for determining a proper rotation velocity so as to provide controlling operations in order to further improve the precision of the load variation correcting system as compared with the fifth embodiment. Moreover, the seventh embodiment provides a more stable load variation correcting control system with higher precision in combining the fifth embodiment or the sixth embodiment based upon the following principles.

An error in the load variation correcting control system forms a load to the conveyor belt. Therefore, the current waveform flowing through the conveyor belt driving motor is monitored, and a judgment is made as to whether the correction of the load variation motor is excessive, insufficient, or proper; thus, a correction is made on the reference signal (amplitude, pulse frequency, etc.) of the load correcting driving motor control system.

In other words, control errors to various load variations on a photosensitive drum are transmitted as load variations in the conveyor belt driving motor. In response to these load variations, the conveyor belt driving motor is controlled to have constant rotations so that the corresponding driving current flows through the conveyor belt driving motor. Therefore, when this is detected and fed back to the load variation correcting motor control system, it is possible to further reduce the load variations with respect to the entire driving control.

If the correction is not carried out successfully to cause a load greater than a frictional force between the photosensitive drum and the conveyor belt, slipping occurs. Therefore, the load variation correcting motor control system controls in such a manner that among current components of the conveyor belt driving motor, a current to be applied to its own system is not made greater than a predetermined value. However, with respect to the driving current flowing through the conveyor belt driving motor, it is not possible to tell which load variation correcting control system causes an error that corresponds to the driving current in question. For this reason, an identifying sine wave (identifying multiplex sine wave) is multiplexed on the driving current of the load variation correcting motor. That is, the load variation correcting current is modulated.

In the case when this frequency is located on a band area higher than the controlling band area of the entire system driving motor, since the entire system driving motor is not controlled properly, the velocity of the conveyor belt is automatically varied by this frequency. When this is within the controlling band area, the control system operates so as to correct the variation of this frequency, thereby allowing a current to flow through the entire system driving motor. If there is a sufficient gain in the entire system driving motor control system, it is possible to ignore the influences to an image due to variations in the conveyor belt caused by this error. When the preliminarily determined frequency component of the current flowing through the entire system driving motor is detected, it is possible to detect the situation in which the load variation correcting motor is being controlled.

The current signal of the identifying multiplex sine wave must not cause the velocity of the photosensitive drum to vary and consequently to give adverse effects on the image formation. It is preferable to make the driving frequency of the identifying multiplex sine wave greater to a degree not to cause influences to the velocity variations in the photosensitive drum; however, normally, this is very difficult. In other words, the frequency of the identifying multiplex sine wave has to be selected within the above-mentioned control band area of the entire-system driving motor. Therefore, the degree of modulation of the driving current needs to be determined to be located within the level not to allow the velocity variations in the photosensitive drum caused by the current to give adverse effects on the image. In other words, the degree of modulation is selected in such a manner that even if worst comes worst, the velocity variations in the photosensitive drum are limited to a level not to give adverse effects on the image. When the degree of modulation has been determined, it is possible to measure what loads are imposed on the entire system motor driving control system as a whole.

If the current frequency of the identifying multiplex sine wave in each photosensitive drum can be changed, it is possible to simultaneously detect what loads are imposed on the entire system motor driving control system as a whole. In this case, it is necessary to have a sufficiently wide controlling band area in the entire driving system. Therefore, when such a band area is not available, the detection is carried out in a time-divided system. Moreover, the application of an arrangement in which the feedback is not always made and the detection is carried out in timing other than image forming operations is effective when the friction between the photosensitive drum and the conveyer belt is not so great, that is, when the permissible control error is small. For example, this is executed prior to image formation or upon activation of the apparatus. When such timing other than the image forming mode is selected, the rotation velocity of the photosensitive drum may be varied.

Moreover, in order to positively execute the above-mentioned processes prior to image formation, the amplitude of the reference signal of the load variation correcting control system (or the gain for allowing the amplitude to have an appropriate size), or the reference pulse frequency, needs to be set to have high precision. In other words, provision needs to be made so as not to cause slipping at the time of an image formation. Therefore, first, the reference signal for the load variation correcting system is fixed, and the driving operation including the entire system driving motor is carried out. The reference input of the load variation correcting system (reference velocity signal in the load variation correcting system) has great errors since it has not been corrected. For this reason, the gain of the load variation correcting system is preliminarily made smaller. At this time, the load on the periphery of the photosensitive drum is small since the image forming process is not operated; therefore, conditions that would provide sufficient driving operations can be selected. Then, in order to successively obtain the amplitude of the reference signal input (or the gain for allowing the amplitude to have an appropriate size) of each load variation correcting system, or the reference pulse frequency, the identifying multiplex sine wave current is applied as described above so as to carry out an appropriate correction on the reference input. Upon completion of this correction on the four load variation correcting systems, the apparatus is in a state ready for the image formation.

Figure 36:
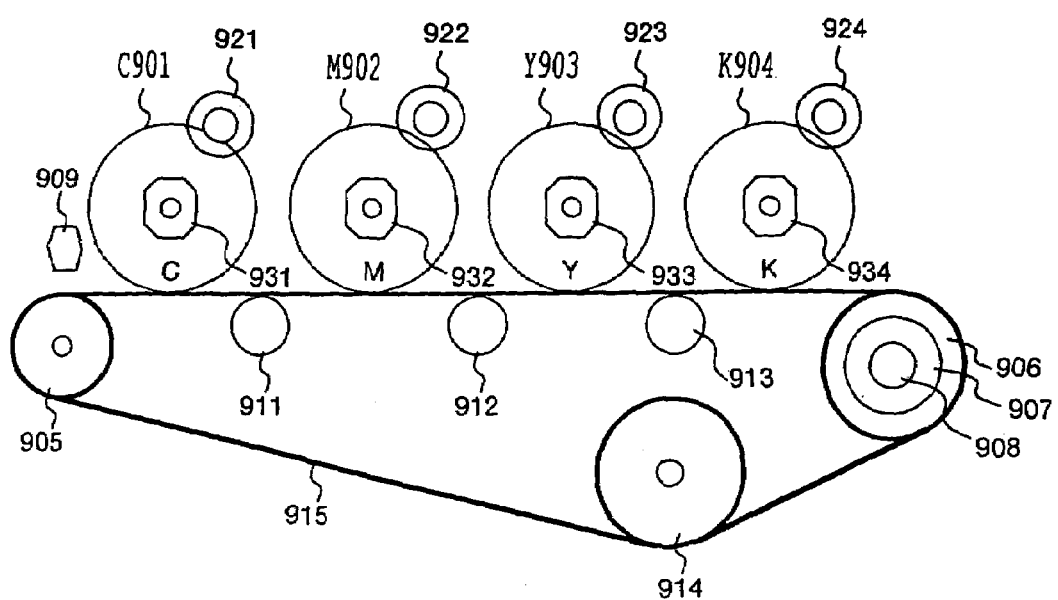
FIG. 36 is a drawing that explains an essential portion of the image formation apparatus of the present invention.

FIG. 36, etc. show a construction that realizes the above-mentioned ideas. FIG. 36 is a drawing that explains an essential part of an image-forming apparatus of the fifth, sixth and seventh embodiments. In the same manner as the third embodiment, the image formation apparatus in the Figure, which is a tandem type image formation apparatus, is provided with: a photosensitive drum C901, a photosensitive drum M902, a photosensitive drum Y903 and a photosensitive drum K904. Moreover, the image formation apparatus is provided with a conveyor belt 915, a roller 905, a conveyor belt driving roller 906 for driving the conveyor belt 915, a tension roller 914, rollers 911, 912 and 913. Above the conveyor belt 915, a leading position detector 909 for detecting a reference mark, not shown, formed on the conveyor belt 915. As described earlier by reference to FIG. 22, this mark is detected so as to form a reference latent image.

Here, the image formation apparatus of the fifth, sixth and seventh embodiments is also provided with an image-reading section such as a scanner, a paper-feeding section including paper-feeding cassettes, a fixing section for fixing a toner image on a sheet of paper, a paper-discharging section and a corona charger. Moreover, each of the photosensitive drum C901, the photosensitive drum M902, the photosensitive drum Y903 and photosensitive drum K904 has a writing unit for writing a latent image by scanning the surface with a laser light, a developing device for forming a toner image by supplying toner onto the latent image, a cleaner, a static charger, etc. These structures are also well-known structures; therefore, drawing indicating these and explanations thereof are omitted.

Here, the developing device provided in the photosensitive drum C901 supplies cyan toner, the developing device provided in the photosensitive drum M902 supplies magenta toner, the developing device provided in the photosensitive drum Y903 supplies yellow toner and the developing device provided in the photosensitive drum K904 supplies black toner.

In the image formation apparatus shown in FIG. 36, the photosensitive drum C901, the photosensitive drum M902, the photosensitive drum Y903 and the photosensitive drum K904 are respectively provided with rotation angle reference position detectors 931, 932, 933 and 934. Moreover, the conveyor belt driving roller 906 for driving the conveyor belt is provided with a rotation angle detecting encoder 908. The rotation angle reference position detectors 931, 932, 933 and 934 are provided with, for example, pulse detectors each of which generates a pulse each time the photosensitive drum rotates once, and an encoder for generating pulses the number of which corresponds to the shift amount of the conveyor belt is used as the rotation angle detecting encoder 908.

Moreover, the photosensitive drum C901, the photosensitive drum M902, the photosensitive drum Y903 and the photosensitive drum K904 are respectively provided with load variation correcting motors 921, 922, 923 and 924, and the conveyor belt driving roller 906 has a motor 907 that is directly connected to the rotary axis.

The motor 907 is a motor that drives the conveyor belt 915 to rotate. In other words, the motor 907 rotates to allow the conveyor belt driving roller 906 to rotate so that the conveyor belt 915 contacting the conveyor belt driving roller 906 is shifted. In association with the rotation of the conveyor belt 915, the rollers 905, 911, 912, 913 and the tension roller 914 are allowed to rotate. Moreover, the load variation correcting motors 921, 922, 923 and 924 detect variations in the loads imposed on the photosensitive drum C901, the photosensitive drum M902, the photosensitive drum Y903 and the photosensitive drum K904, and the detected variations are subjected to the motor torque so as to reduce the load variations.

Here, the loads variations which are suppressed by the load variation correcting motors 921, 922, 923 and 924 are loads generated by a cleaner, etc., located on the outer surface of the photosensitive drum. These loads tend to vary periodically. Here, with respect to the control of the image formation apparatus by the rotation angle detecting encoder 908 and the motor 907 and the operations of the load variation correcting motors 921, 922, 923 and 924, the description thereof will be given later.

As illustrated in FIG. 26, each load variation correcting motor (the load variation correcting motor 924, in the Figure) can be attached to the photosensitive drum (the photosensitive drum K904, in the Figure) at a portion outside an area in which a writing operation is performed through a comparatively small motor 1001. Thus, the application of the load variation correcting motor 924 makes it possible to increase the motor efficiency and to reduce power consumption, in comparison with the direct connection of the motor to the photosensitive drum, so that it is possible to use a smaller motor, and consequently to reduce the size of the image formation apparatus described in the fifth, sixth and seventh embodiments.

Moreover, in the image formation apparatus in the fifth, sixth and seventh embodiments, pulses generated by the rotation angle detecting encoder 908 are detected, and the measured values of the pulses are compared with the rotation amounts of the photosensitive drums 901, 902, 903 and 904 detected by the rotation angle reference position detectors 931, 932, 933 and 934. Based upon these comparisons, it is possible to detect the rotation angle of each photosensitive drum that is made while the conveyor belt driving roller 906 rotates once in the image formation apparatus of the fifth, sixth and seventh embodiments. Alternatively, it is possible to detect the number of pulses generated by the rotation angle detecting encoder 908 while the photosensitive drum rotates once.

Furthermore, in the image formation apparatus of the fifth, sixth and seventh embodiments, which relates to the image formation apparatus that uses a driving roller to shift the conveyor belt, the rotation amount of the conveyor belt driving roller 906 that is made while the photosensitive drum rotates once is preliminarily stored. Then, the rotation amount of the conveyor belt driving roller 906 thus stored is compared with the detected rotation amount of the conveyor belt driving roller 906, and when the difference of the two exceeds a permissible range, it is judged that the image formation apparatus is in an abnormal state.

FIG. 27 is a block diagram that explains the controlling operation of the image formation apparatus carried out by the rotation angle detecting encoder 908 and the motor 907. The construction, shown in FIG. 27, is provided with: the conveyor belt driving roller 906, the motor 907 for rotating the conveyor belt driving roller 906, the rotation angle detecting encoder 908 for detecting the rotation angle of the conveyor belt driving roller 906, a control circuit 1100 for controlling the motor 907 based upon a signal detected by the rotation angle detecting encoder 908, a power amplifier 1104, a phase compensating device 1105, an f-V converter 1106 and an encoder pulse detector 1107. Moreover, the control circuit 1100 is provided with a phase comparator 1101, a charge pump 1102, and LPF (Low Pass Filter) 1103.

When the velocity of the conveyor belt has reached a target velocity V, the rotation angle detecting encoder 908 outputs a pulse having a frequency of fr based upon the following equation. In other words, supposing that the target velocity of the conveyor belt is V and the radius of the conveyor belt driving roller 906 is Rr, the rotation velocity $\omega_r$ of the entire-system driving motor is represented as follows:

$$\omega_r = V/Rr \quad (62)$$

Moreover, supposing that the number of pulses that the encoder outputs while the conveyor belt driving roller 906 rotates once is Nr, the frequency fr of the pulse that the encoder outputs is represented as follows:

$$fr = Nr \cdot \omega_r/(2\pi) = Nr \cdot V/(2\pi Rr) \quad (63)$$

The control section generates a signal S1 equal to this frequency fr, and inputs this to the phase comparator 1101.

The phase comparator 1101 receives a pulse signal S4 formed based upon a pulse that the rotation angle detecting encoder 908 has actually outputted, and compares this with the reference pulse S1 to calculate a phase difference between them. The calculated value is converted into a voltage signal that is represented in an analog format after passing through the charge pump 1102 and the LPF 1103, and further inputted to the power amplifier 1104. Based upon the phase difference between inputted signal S1 and signal S4, the power amplifier 1104 outputs a control signal to the motor 907, thereby controlling the motor 907 so as to allow the conveyor belt 915 to shift at the target velocity V. Consequently, the motor 907 is allowed to rotate constantly with an angular velocity that is obtained when the conveyor belt 915 shifts at the target velocity V. The above-mentioned process is a well-known process, that is, a so-called PLL (Phase Locked Loop) process.

Here, the pulse, generated by the rotation angle detecting encoder 908, is outputted to the f-V converter 1106 through the encoder pulse detector 1107. The f-V converter 1106 converts the pulse to a voltage signal to generate a voltage signal S3 that is proportional to the angular velocity of the conveyor belt driving roller 906. This voltage signal S3 is fed back to the power amplifier 1104 through the phase compensating device 1105 so that the velocity controlling characteristic of the conveyor belt driving roller 906 is improved.

Moreover, since the voltage signal S3 is directly proportional to the angular velocity of the conveyor belt driving roller 906, this is outputted to other constructions as the signal indicating the rotation velocity of the conveyor belt driving roller 906 so as to be used for velocity control in other systems constituted by the photosensitive drums.

Moreover, variations in the load (magnitude, timing) imposed on the conveyor belt driving roller 906 or the conveyor belt 915 are preliminarily found, and these variations in the load are applied thereto from the external device as a feed forward signal S2. Such a feed forward control makes it possible to improve the velocity control characteristic of the photosensitive drum even when no load variation correcting motor 924 is installed.

Here, the timing and magnitude of load variations imposed on the photosensitive drum, the conveyor belt driving roller, or the conveyor belt in an apparatus forming electronic photographs (a printer or a copying machine) are preliminarily known. Thus, the above-mentioned feed forward control is available. In the embodiments of FIG. 36, the rotation angle detecting encoder 908 and the motor 907, directly connected to the axis of the conveyor belt driving roller 906, are used; however, these encoder and motor may be connected thereto through gears.

Figure 37:
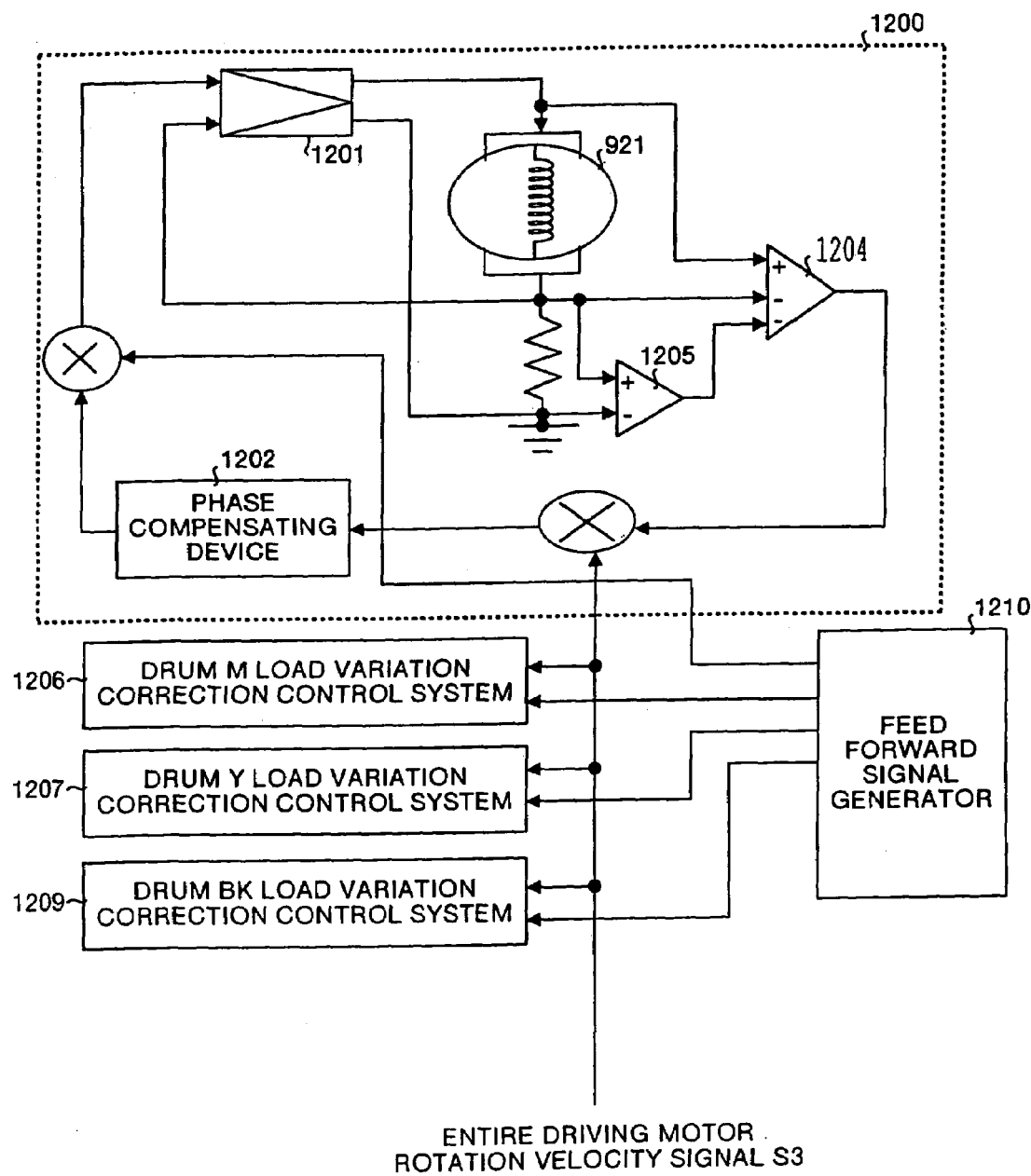
FIG. 37 is a block diagram that explains the structure of a drum load variation correcting control section that controls the load variation of the photosensitive drum.

Next, an explanation will be given of the fifth embodiment of the image formation apparatus. FIG. 37 is a block diagram that explains the construction for controlling the load variation correcting motor. The construction, shown in the Figure, is provided with a drum-C load variation correcting control system 1200 for correcting the load variations in the photosensitive drum C901, a feed forward signal generator 1210, a drum-M load variation correcting control system 1206 for correcting the load variations in the photosensitive drum M902, a drum-Y load variation correcting control system 1207 for correcting the load variations in the photosensitive drum Y903 and a drum-BK load variation correcting control system 1209 for correcting the load variations in the photosensitive drum K904.

Moreover, the drum-C load variation correcting control system 1200 is provided with a current supply type power amplifier 1201, a phase compensating device 1202, a load variation correcting motor 921, a reverse electromotive force detector 1204 and a comparator 1205 for use in the reverse electromotive force detection.

The above-mentioned construction makes it possible to cancel the load variations in the photosensitive drum by using the torque of the load variation correcting motor 921, so as to minimize the influences that are given by the load variations in the photosensitive drum to the other photosensitive drums through the conveyor belt.

The feed forward signal generator 1210 inputs signals for generating torques for canceling the known load variations (magnitude, timing) improved on the photosensitive drum C901, photosensitive drum M902, photosensitive drum Y903, photosensitive drum K904, that is, feed forward signals, into the corresponding control systems, that is, the drum-C load variation correcting control system 1200, the drum-M load variation correcting control system 1206, the drum-Y load variation correcting control system 1207 and the drum-BK load variation correcting control system 1209.

Moreover, the voltage signal S3 is respectively inputted to the drum-C load variation correcting control system 1200, the drum-M load variation correcting control system 1206, the drum-Y load variation correcting control system 1207 and the drum-BK load variation correcting control system 1209. The signal S3 is a signal for determining the rotation velocity of the load variation correcting motor. In this case, with respect to the convey or belt load variation correcting control system, the signal S3 is converted to a value so as to allow the conveyor belt 915 and the photosensitive drum to rotate integrally, thereby forming a reference signal that determines the rotation of the motor.

Moreover, the reference signal for each of the photosensitive drums, inputted to the load variation correcting control system, may be formed into a reference signal for determining the rotation of the motor, which is obtained by taking into consideration the deviations in the radius of the photosensitive drum to make a correction. Furthermore, the drum-C load variation correcting control system 1200 of FIG. 37 detects a reverse electromotive force generated in proportion to the rotation velocity of the load variation correcting motor 921, and compares this with the voltage signal S3 so as to control the velocity. In the fifth embodiment, the other load variation correcting control systems also have the same circuit construction. The load variation correcting control system provides control so that even when there is a load variation in the speed determined by the reference signal for determining the rotation of the load variation correcting motor, the rotation is maintained. In other words, consequently, the amount of the load variations that is transmitted to the other driving systems is reduced, with the result that it is possible to reduce slipping that occurs between the photosensitive drum and the conveyor belt or a sheet of paper.

In accordance with the above-mentioned operations, the load variation correcting motors 921, 922, 923 and 924 are controlled in response to the rotation angular velocity of the motor 907 for driving the conveyor belt 915. For this reason, the image formation apparatus of the fifth embodiment is provided with a construction in which even at the time of activation, the photosensitive drum is less susceptible to slipping (in which only either of the photosensitive drum and the conveyor belt 915 is shifted) Here, the reverse electromotive force generated in the load variation correcting motor 921 can be detected by subtracting an inner resistance value from the voltage applied to the terminal. Moreover, in order to improve the controlling characteristics of the construction shown in FIG. 37, the current supply type power amplifier 1201 is used as the power amplifier and the phase compensating device 1202 is installed.

For another construction example, the signal for determining the rotation angular velocity of the load variation correcting motor may be generated by a controller, not shown. Although other control modes such as starting and stopping modes are not described in the fifth embodiment, these can be achieved by using the conventional technique.

As described above, in accordance with the image formation apparatus of the fifth embodiment, the driving system including the photosensitive drum and the conveyor belt 915 is velocity-controlled by the motor 907, and the load variations imposed on the other photosensitive drums and the conveyor belt 915 that are driven in accordance with the conveyor belt driving roller 906 rotated by the motor 907 are corrected by the individual control systems.

Figure 38:
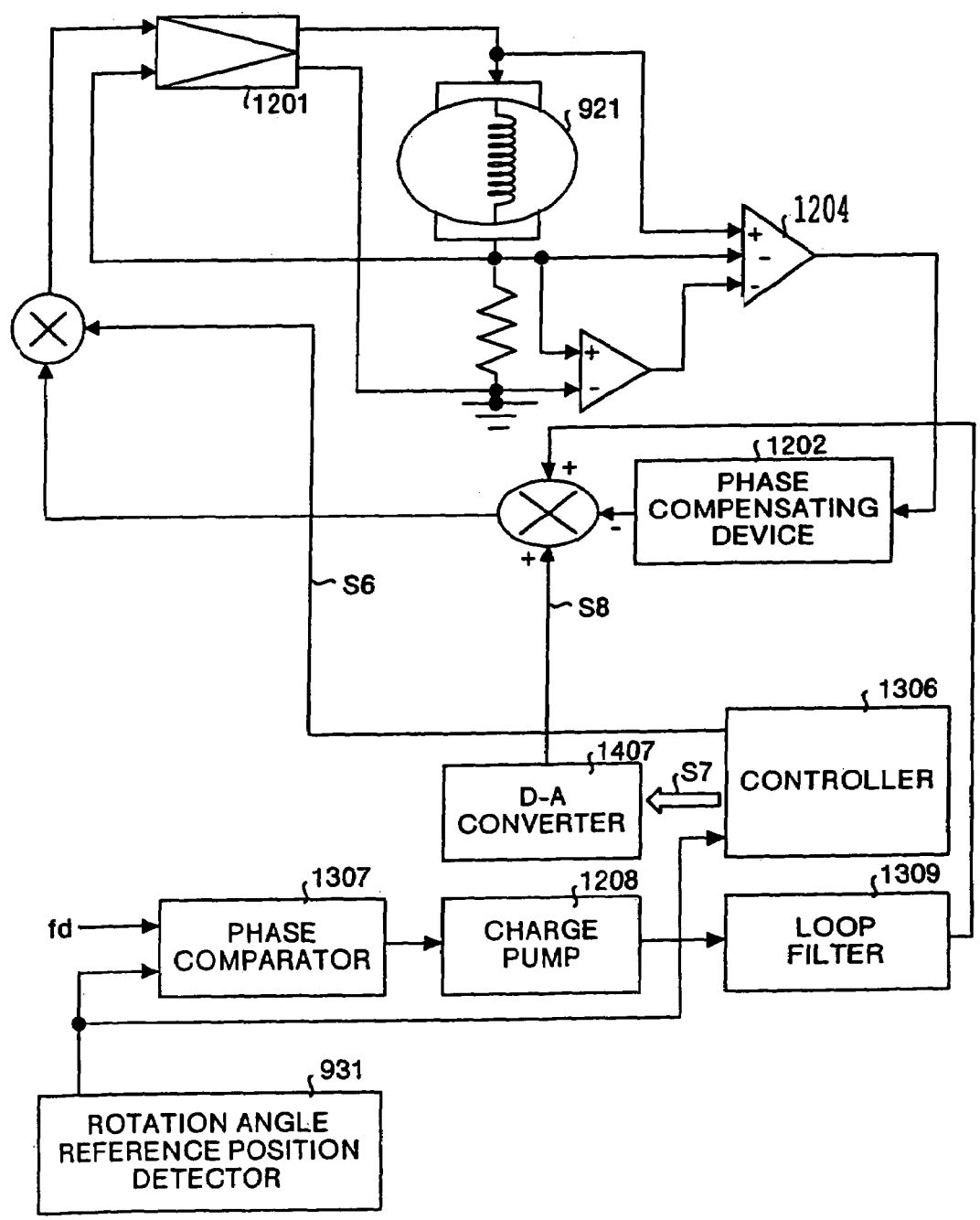
FIG. 38 is a block diagram that explains the structure of an improved drum load variation correcting control section that controls the load variation of the photosensitive drum;.
Figure 39:
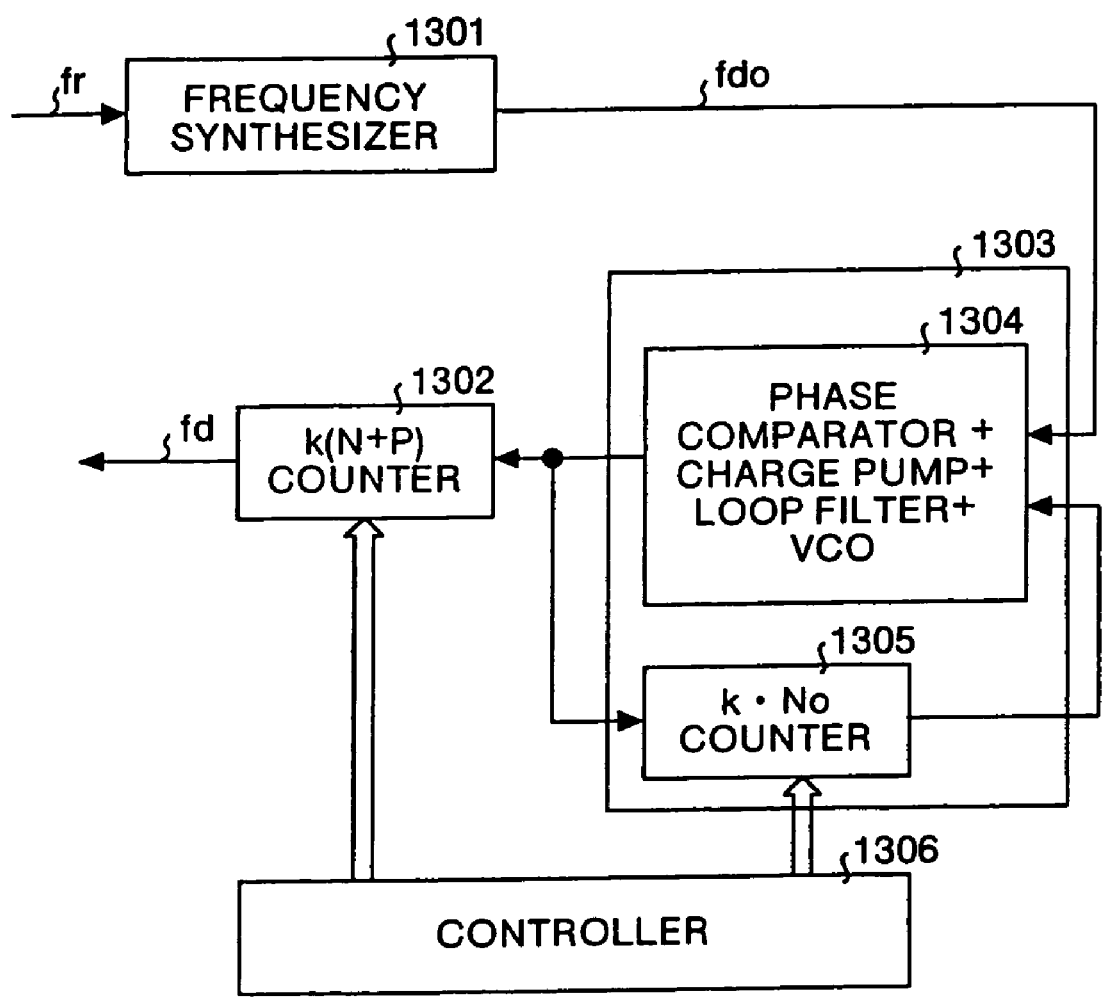
FIG. 39 is a block diagram that explains an fd generation section for generating a clock frequency fd shown in FIG. 38.

Next, an explanation will be given of the sixth embodiment of the image formation apparatus. In the sixth embodiment, the apparatus in the fifth embodiment is further improved. In other words, this embodiment provides a method for setting the rotation velocity of the photosensitive drum more accurately so as to prevent slipping from occurring between the photosensitive drum and the conveyer belt or a sheet of paper by utilizing the fact that if the conveyor belt moves at a constant velocity, the photosensitive drum also moves at a constant angular velocity. FIGS. 38 and 39 are block diagrams that explain the construction for controlling the load variation correcting motors 921, 922, 923 and 924. The construction shown FIG. 38 includes a drum load variation correcting control section that detects the rotation state of the photosensitive drum, and allows the photosensitive drum to overcome load variations imposed thereon in accordance with the state, thereby controlling the photosensitive drum to have a constant angular velocity. The drum load variation correcting control section controls the load variation correcting motor to have a constant velocity, so as to allow the torque of the load variation correcting motor to cancel the load variations imposed on the photosensitive drum. Since this arrangement regulates influences of the load variations to other photosensitive drums, etc., and also reduces the load variations imposed on the conveyor belt or a sheet of paper, it becomes possible to prevent slipping. Moreover, the construction shown in FIG. 39 is a fd generation section for generates a clock frequency fd that serves as a reference based on which the processes of the construction shown in FIG. 38 are carried out.

The fd generation section, shown in FIG. 39, is provided with a frequency synthesizer 1301, a k(N+P) counter 1302, a PLL processing section 1303 (constituted by k·No counter 1305 and a signal processing section 1304 consisting of a phase comparator, a charge pump, a loop filter and a VCO), and a controller 1306 for controlling the above-mentioned construction.

The frequency synthesizer 1301 receives a pulse signal from an oscillator, not shown, that oscillates with a pulse oscillating frequency equal to the frequency fr of a pulse outputted from the rotation angle detecting encoder 908 while the conveyor belt 915 is shifting at a velocity V. Then, based upon the frequency fr, it generates a pulse frequency fdo on the assumption that the rotation reference position detector of an ideal photosensitive drum outputs this. Then, the PLL processing section 1303 and k(N+P) counter 1302 generate a reference clock frequency fd for use in the load variation correcting control system of FIG. 38. The frequencies fdo and fd are pulse frequencies formed in accordance with the following relational expression.

When the motor 907 is driven to move the conveyor belt at a shifting velocity V, the photosensitive drum is allowed to rotate. At this time, the rotation angular velocity ω of the photosensitive drum is represented as follows:

$$\omega = V/R.$$

When the respective photosensitive drums are rotated at the angular velocity ω in accordance with this expression, it is supposed that no slipping occurs in any of the photosensitive drums. When the ideal photosensitive drum diameter is Ro, the number of output pulses No of the encoder at the time of one rotation of this photosensitive drum is represented by:

$$No = Ro \cdot Nr/Rr \quad (64).$$

From the mechanical point of view, when Ro/Rr is set to a natural number, a controlling operation with higher precision is obtained.

Upon measuring the actual radius of the photosensitive drum, in the present-embodiment, the pulses outputted by the rotation angle detecting encoder 908 at the time of one rotation of the photosensitive drum are counted. Supposing that the number of pulses outputted at the time of one rotation of the photosensitive drum is N and the phase indicating the distance between pulses is 2πP (where 0<P<1), the rotation angle detecting encoder 908 outputs pulses of N+P at the time of one rotation of the photosensitive drum. Therefore, the actual radius R of the photosensitive drum is represented by:

$$R = Rr(N+P)/Nr \quad (65).$$

In order to allow the photosensitive drum to move integrally with the conveyor belt having the velocity V, the rotation angular velocity ω is set as follow:

$$\omega = V/R = V \cdot Nr / \{Rr(N+P)\} \quad (66).$$

Here, the rotation velocity $\omega_0$ of the photosensitive drum having an ideal shape is $\omega_0 = V/R_0$ holds. Therefore, the following equation holds:

$$\omega = \{No/(N+P)\}\omega_0 \quad (66)'.$$

At this time, the output pulse frequency fd of the rotation angle reference position detector 931 is represented by fd=ω/(2π), and the output pulse frequency fdo of the rotation angle reference position detector of the ideal-shape photosensitive drum is represented by:

$$fdo = \omega_0/(2\pi),$$

Therefore, $fd = \{No/(N+P)\}fdo$ \quad (67)

The relationship between fr and fdo is represented by:

$$fr = Nr \cdot V/(2\pi Rr) = (Nr \cdot Ro/Rr)fdo \quad (68)$$

$$fdo = \{Rr/(Nr \cdot Ro)\}fr \quad (69)$$

The frequency fdo, outputted by carrying out a frequency conversion corresponding to equation (69) by using the frequency synthesizer 1301, is inputted to the k(N+P)

counter 1302 through the PLL processing section 1303. The controller 1306 calculates the frequency fd from the frequency fdo corresponding to equation (67) by controlling the PLL processing section 1303 and the k(N+P) counter 1302. Here, k, shown in the Figure, is a natural number, and is determined in accordance with the detection precision of the rotation angular detecting encoder 908. For example, when the phase detecting resolution of the rotation angle detecting encoder 908 is 0.2×2π (⅕ cycle of pulse cycle), an appropriate figure not less than 5 is selected as k.

The PLL processing section 1303 is a construction in which fdo is subjected to a multiplying process of k·No·fdo. The k(N+P) counter 1302 is a pre-settable counter in which a count value can be set; thus, fd is found by dividing k·No·fdo. Here, with respect to kP, a figure that is rounded off to a natural number is used. The frequency fd, calculated as described above, is outputted to the drum load variation correcting control section shown in FIG. 38.

The drum load variation correcting control section, shown in FIG. 38, is provided with: a phase comparator 1307, a charge pump 1208, a loop filter 1309, a controller 1306, a D-A converter 1407, a phase compensating device 1204, a current supply type power amplifier 1201 and a load variation correcting motor 921. Here, the drum load variation correcting control section is installed in each of a plurality of photosensitive drums, and the construction shown in FIG. 38 belongs to the photosensitive drum C901 of these.

The frequency fd, generated in the fd generation section, is inputted to the phase comparator 1307 of the drum load variation correcting section. Moreover, a pulse signal, which is released from the rotation angle reference position detector 931 of the photosensitive drum corresponding to the drum load variation correcting control section, is inputted to the phase comparator 1307. The drum load variation correcting control section compares the frequency of the inputted pulse signal and its phase with the frequency fd and its phase, and controls the load variation correcting motor so as to make them coincident with each other so that the respective photosensitive drums are rotated at a constant angular velocity.

The drum load variation correcting control section installed in each photosensitive drum allows the photosensitive drum to rotate at a constant angular velocity ω, with the result that the photosensitive drums installed in an image formation apparatus are controlled to have a proper velocity without causing slipping even when there are eccentricities and deviations in the radius.

Moreover, in the case when the amount and timing of load variations imposed on the photosensitive drum or the conveyor belt 915 are known, the drum load variation correcting control section outputs a feed forward signal S6 in accordance with the amount and timing of the load variations from the controller 1306. Since this reduces the gain required for the feedback control system (so-called PLL control system) using the phase comparator 1307 of FIG. 38, it is possible to provide a more stable control system with higher precision.

Moreover, the drum load variation correcting control section detects a signal that is in proportion to the rotation velocity of the photosensitive drum from the load variation correcting motor 921 by using the reverse electromotive detector 1203, and this is fed back. This construction is designed to add a velocity feedback system by detecting the signal in proportion to the rotation velocity of the photosensitive drum from the load variation correcting motor so as to provide a more stable controlling operation. Here, in the PLL system in FIG. 38, the controlling operation is made with respect to the pulse outputted once for each rotation of the photosensitive drum; therefore, in an attempt to correct variations occurring within this pulse interval, this velocity feedback system is added so that a more stable controlling operation with higher precision is obtained.

Moreover, the controller generates a signal S7 based upon the velocity ω calculated from equation (24), and inputs this to the D-A converter 1407. The resulting signal S8 that has been D-A converted in the D-A converter 1407 is compared with the reverse electromotive force detected by the reverse electromotive force detector 1203, which is compensated for its phase in the phase compensating device 1204. Here, the reverse electromotive force is detected by subtracting the inner resistance value r from the voltage at the terminal of the load variation correcting motor 921. In this case, the current supply type power amplifier 1201 is used so as to improve the controlling property, and the phase compensating device 1204 is interpolated so as to compensate for the stability of the system.

The drum load variation correcting control section cancels the load variations imposed on the photosensitive drum based upon the results of the comparison, and controls the load variation correcting motor so as to allow the photosensitive drum to rotate at the angular velocity ω. Through the above-mentioned processes, the image formation apparatus of the present embodiment allows the motors 907 to control the entire system including the photosensitive drums and the conveyor belt, and also allows the load variation correcting motors 921 respectively installed the drums to correct the load variations in the photosensitive drums.

Next, an explanation will be given of the seventh embodiment of the image formation apparatus. The seventh embodiment makes it possible to further improve the fifth and sixth embodiments. This embodiment is effectively used in a system which, upon application of the fifth or sixth embodiment, is susceptible to slipping due to the resulting control errors. In other words, in the case of a weak frictional force between the photosensitive drum and the conveyor belt, between the photosensitive drum and a sheet of paper, or between the sheet of paper and the conveyor belt, only slight control errors cause slipping. Therefore, the seventh embodiment provides a system having better control precision.

Figure 40:
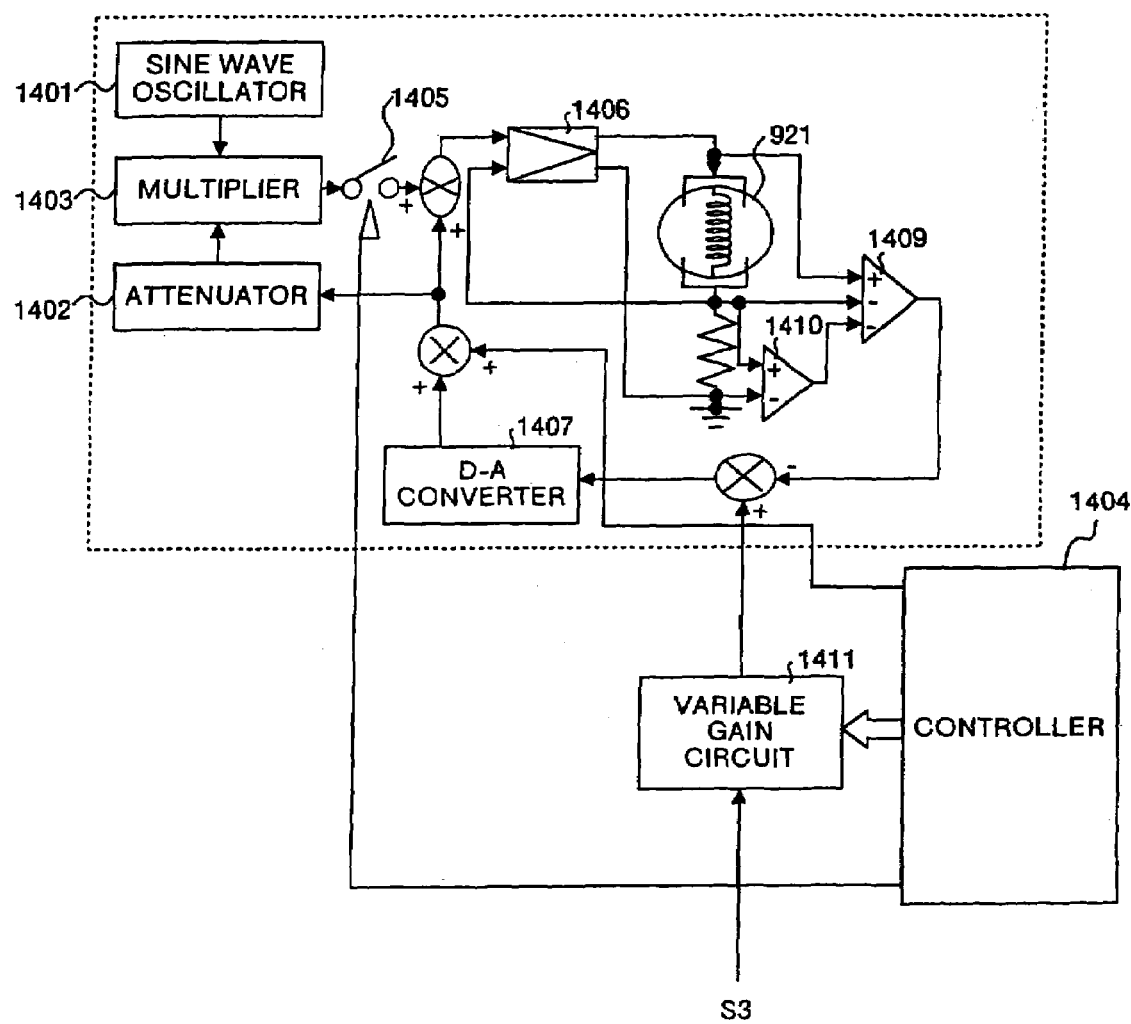
FIG. 40 is a block diagram that explains a structure for controlling a motor of the image formation apparatus of the present invention.

Referring to FIG. 40 and thereafter, the following description will discuss a construction that realizes the above-mentioned ideas. FIG. 40 is a block diagram that explains the construction for controlling motors in the seventh embodiment. Here, the mechanical structure of the image formation apparatus of the seventh embodiment is the same as that of the fifth or sixth embodiment explained by reference to FIG. 36; therefore, those members of the seventh embodiment that correspond to those shown in the image formation apparatus of FIG. 36 are indicated by the same reference numbers, and the description thereof is omitted.

The construction shown in FIG. 40 indicates a drum C load variation correcting control system for correcting load variations in the photosensitive drum C901. This control system is provided with: a sine wave oscillator 1401 for generating an identifying multiplex sine wave, an attenuator 1402 for attenuating an input signal, a multiplier 1403 for multiplying signals outputted from the sine wave oscillator 1401 and the attenuator 1402, a switch 1405 for switching on and off based upon a signal from a controller 1404, a current supply type power amplifier 1406, a D-A converter 1407, a load variation correcting motor 921, a rotation motor reverse electromotive force detector 1409, a comparator 1410 and a variable gain circuit 1411.

Figure 41:
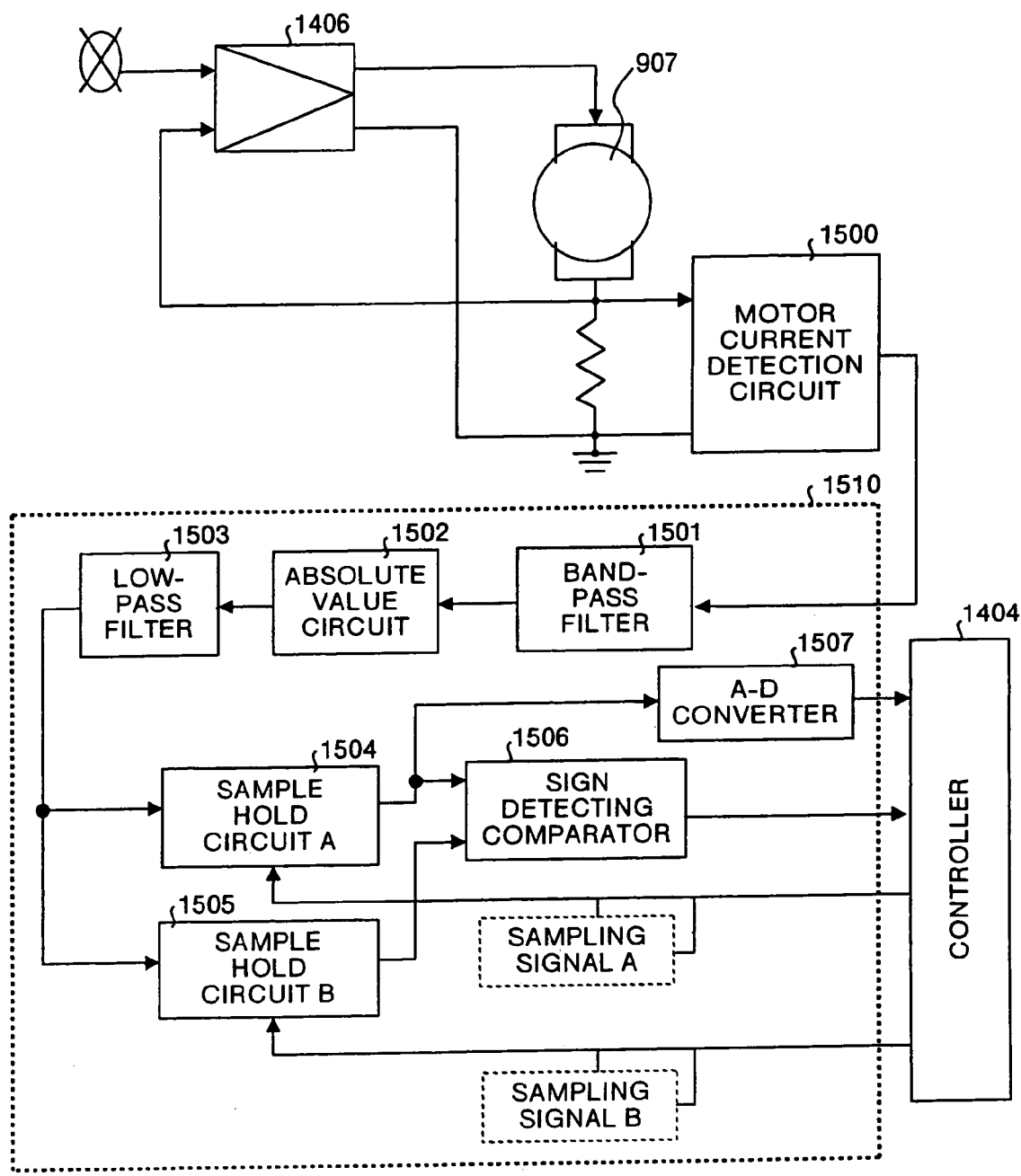
FIG. 41 is a block diagram that explains a circuit for detecting a waveform that is generated in a driving-roller driving motor current in accordance with a controlling error in a load variation correcting system shown in FIG. 40.

FIG. 41 is a block diagram of a system 1510 for detecting a current waveform flowing through a motor for driving a conveyor belt driving roller 906 in the control circuit of FIG. 27. A motor current detection circuit 1500 is a circuit for detecting a current flowing through the motor 907 for driving the conveyor belt driving roller 906. Moreover, this circuit is provided with: a band pass filter 1501 for allowing only signals having a predetermined band width of the system 1510 for detecting the current waveform flowing through the motor, an absolute value circuit 1502, a low-pass filter 1503 for allowing only signals in the low frequency band width to pass, a sample hold circuit A1504, a sample hold circuit B1505, a sign detecting comparator 1506, and an A-D converter 1507.

Figure 42:
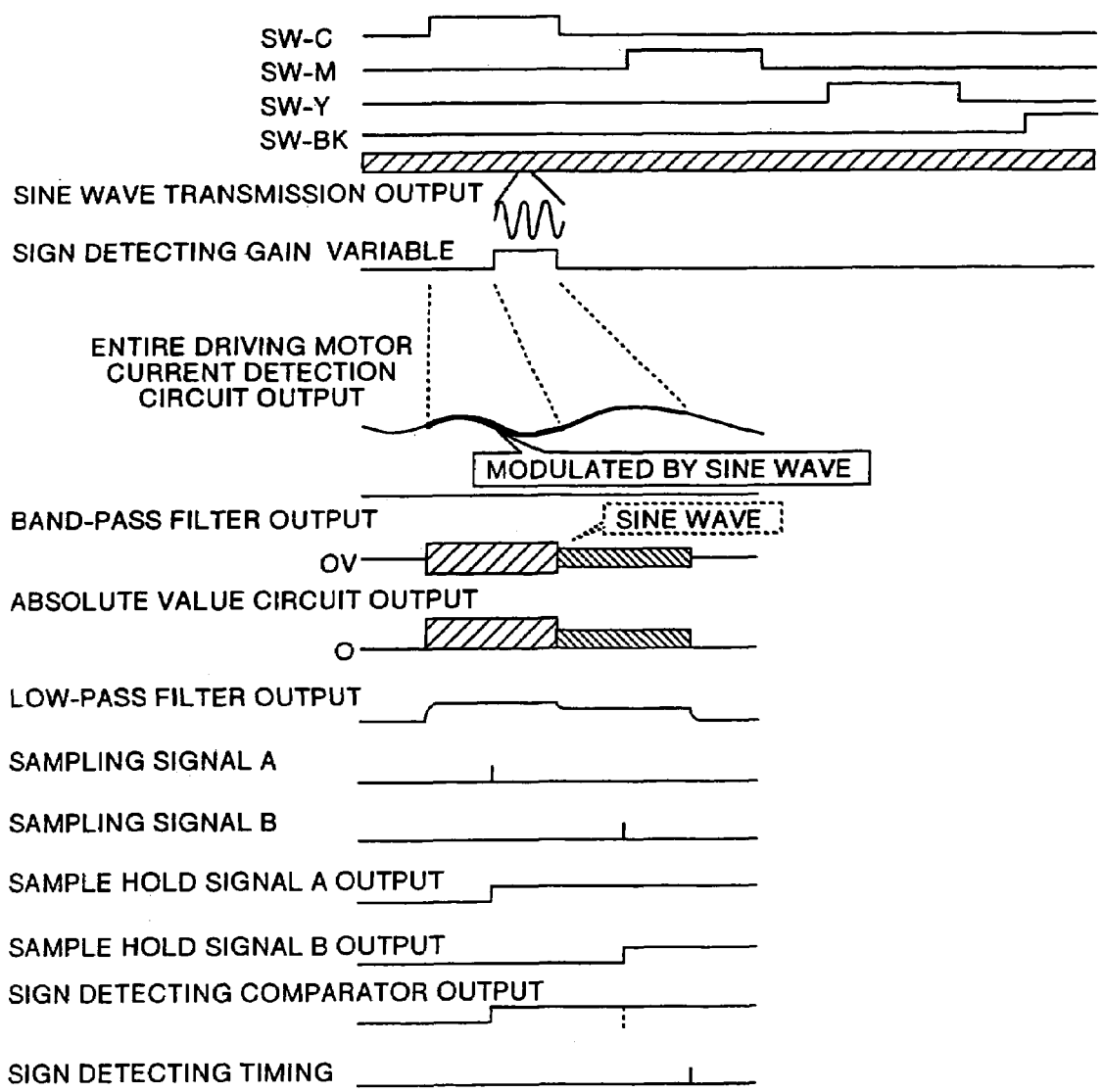
FIG. 42 is a timing chart of the block diagram shown in FIG. 40 and FIG. 41.
Figure 43:
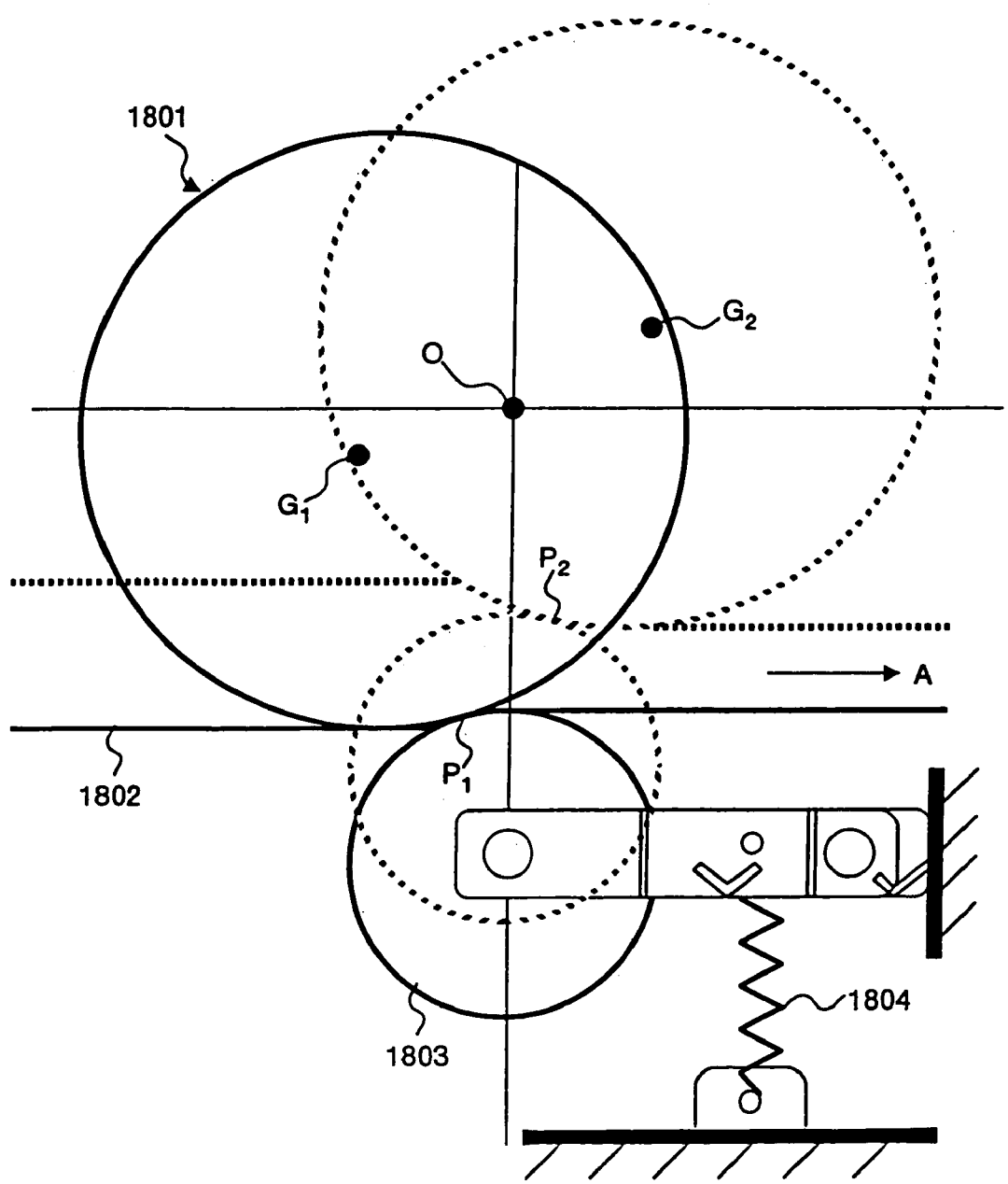
FIG. 43 is a drawing that explains a transferring position in a conventional image formation apparatus.

FIGS. 41 and 40 show circuits to which the above-mentioned contents are added to FIGS. 27 and 37 as specific embodiment. FIG. 40 shows a load variation correcting control system that relates to the photosensitive drum, and FIG. 41 shows a current supply type power amplifier which is provided in place of the power amplifier 1104 in FIG. 27 so as to detect a current that is proportional to the motor propelling force. FIG. 42 is a timing chart that explains these operations. Here, FIG. 38, which shows another embodiment of FIG. 37, does not include the sine wave oscillator 1401, the attenuator 1402, the multiplier 1403, the switch 1405, etc. shown in FIG. 40; however, as in the case of FIG. 37 to which these circuits are added to form FIG. 40, these circuits maybe added thereto to obtain the same functions.

In the following embodiment, an explanation will be given of a case in which the operation for detecting the control errors of the respective load variation correcting control system is carried out in a time-divided system. When the entire control system is in operation, in an attempt to reduce transmission of the load variations to the entire driving motor system of FIG. 27 caused by errors of the load variation correcting control system related to the photosensitive drums of FIG. 40, the controller 1404 turns the switch 1405 on in FIG. 40, so as to provide correction of the reference signal of the load variation correcting control system with high precision. In other words, to the input of the current supply type power amplifier 1406 is inputted, together with a signal that has been inputted thereto before this control mode started, another signal formed by multiplying the resulting signal derived from this signal attenuated by the attenuator 1402 by a detecting sine wave signal having a predetermined frequency generated by the sine wave oscillator 1401. In other words, the signal, which is to be transmitted to the entire driving motor side of FIG. 27 so as to measure the load variations, is modulated. Consequently, since the corresponding current is allowed to flow through the load variation correcting motor 921, the corresponding sinusoidal propelling force variations occur therein.

In FIG. 41, the sine wave having the size corresponding to the transmitted load variations is detected from the output of the motor current detection circuit 1500 of the entire driving motor system. A signal other than this sine wave, which gradually changes and contains DC, also contains the load variations transmitted from the other photosensitive drum systems; therefore, this is not used as controlling information. Moreover, the load variations caused by errors in the load variation correcting control systems attached to the respective photosensitive drums and the load variations imposed on the conveyor belt are mainly composed of mechanical variations, and consequently, components on the high band area are small; therefore, by selecting the frequency of the detecting sine wave is selectively set to the high band area side within the control band area of the entire driving motor system, the errors that are carried on the load variation detection signal in the above-mentioned frequency components detected by the motor current detection circuit 1500 are small. The sin wave signal component specified by the band-pass filter 1501 is detected so that it is possible to detect the high precision control error of the load variation correcting control system. After the control signal that is the input of the current supply type power amplifier 1406 have been multiplied by a given rate (constantly attenuated), this is further multiplied by the sine wave; therefore, by detecting the amplitude of the output of this band-pass filter output, it is possible to estimate the transmitted variation amount. This is based upon the fact that the input voltage of the current supply type power amplifier 1406 is virtually in proportion to the current flowing through the load variation correcting motor 921. In the case when the control errors in the load variation control systems become greater, the load in the entire driving system of FIG. 27 becomes greater so that the amplitude of the output of the band-pass filter 1501 becomes greater. Therefore, the amplitude is detected through the absolute value circuit 1502. Then, the signal detection is stabilized through the low-pass filter 1503.

However, at this time, even if the transmitted load amount is found, the direction of the transmitted load is not known. In other words, it is not known whether the errors in the load variation correcting systems are exerted in the pulling direction with respect to the belt shifting direction or in the reversed direction. Therefore, in the timing in the sign detecting variable gain in FIG. 42, the gain of the variable gain circuit 1411 for changing the reference signal to the control system in FIG. 40 is slightly changed by gain data from the controller 1404 so that the reference signal is slightly changed, or the proper reference signal frequency fd in the load variation correcting system and the reference velocity data S7 in FIG. 38 are slightly shifted, so as to detect the direction. For example, in the case when the shift is made in the direction for reducing the velocity of the photosensitive drum, if the detected sine wave output becomes smaller in the entire driving motor current detection circuit outputs, it is found that the load variation control system is working in the pulling direction of the belt. In other words, when it is working so as to pull the belt, the pulling force becomes weaker. Here, the output amplitude of the sine wave detection is within the predetermined range, it is not necessary to carry out this operation. In other words, the apparatus is less susceptible to slipping in this case. In contrast, the application of the operation might cause problems such as misjudgment in the sign.

The sample hold circuit A1504 in FIG. 41 detects the gain of the variable gain circuit 1411 of each of the load variation correcting systems, or the output of the low-pass filter 1503 that is the amplitude of the sine wave prior to the change in the reference signal frequency fd or the reference velocity data, and the sample hold B1505 detects the gain of the variable gain circuit 1411, or the amplitude of the sine wave signal obtained after the reference signal frequency fd or the reference signal data has been changed. Then, the sign detecting comparator 1506 is used so as to find the difference between the sample hold circuits so that the direction of the transmitted load is found. In the present embodiment, the transmitted load amount from the output of the sample hold circuit A1504 is estimated; however, the output of the sample hold circuit B1505 may be used. In the case of the output of the sample hold circuit A1504, since the information is obtained prior to the change in the reference signal frequency fd or the reference velocity data, a slight correction is required. The load variation transmitted amount and its direction are measured in this manner; therefore, based upon these measured values, the controller 1404 sets the gain of the variable gain circuit 1411 in FIG. 39 or the reference velocity data S7 in FIG. 38, as well as setting the count values of the k(N+P) counter 1302 and k·No counter 1305 in FIG. 39, thereby determining the reference signal frequency fd. In this case, the k·No counter 1305 is provided as a pre-settable counter so that the frequency of the reference signal frequency fd is freely set in the increasing and reducing directions.

As described above, the load that is transmitted to the entire driving motor due to errors in the load variation correcting control system can be reduced. With respect to the other load variation correcting systems, the same controlling operation can be carried out at different time. When the force transmitted to the conveyor belt due to the errors in the load variation correcting control is reduced, it is possible to eliminate slipping between the photosensitive drum and the conveyor belt, between the photosensitive drum and a sheet of paper, or between the sheet of paper and the conveyor belt.

Next, an explanation will be given of another structural example of the load variation correcting motor of the fifth, sixth and seventh embodiments. FIG. 29 is a drawing that shows an example of the load variation correcting motor in which: a roller 1304 is installed on the rotary axis of the photosensitive drum K904, and the roller 1301, which is directly rotated by the load variation correcting motor 1302, is allowed to contact the roller 1304 so as to drive this. Here, reference number 1303 represents an encoder. In the construction shown in FIG. 29, it is possible to improve the degree of freedom for the structure for transmitting the driving force of the load variation correcting motor 1302 to the photosensitive drum K904.

FIG. 30 is a drawing that shows an example of the load variation correcting motor that supports a roller 1401 rotated a the load variation correcting motor 1404 by using a spring 1402. In accordance with the construction shown in FIG. 30, it is possible to sufficiently transmit the driving force of the load variation correcting motor 1404 to the photosensitive drum K904.

FIG. 31 is a structural example of the load variation correcting motor in which a disc-shaped transmitting member 1501 directly connected to a photosensitive drum 1503 and a roller 1502 for stably transmitting the driving force of a driving source 1504 are used. In the contact portion of the transmitting member 1501 and the roller 1502, the transmitting member 1501 side has a flat face and the roller 1502 has a tapered shape so as to increase the contact portion, thereby providing a stable transmitting characteristic (characteristic for preventing slipping). The rotary axis of the driving source 1504 is not in parallel with the surface orthogonal to the rotary axis of the transmitting member 1501.

Moreover, the present invention is not intended to be limited by the above-mentioned embodiments. In other words, in the image formation apparatus of the fifth, sixth and seventh embodiments, the rotary axis of the photosensitive drums 901, 902, 903 and 904, or the rotary axis of the conveyor belt driving roller 906 may be provided with a flywheel; thus, it is possible to reduce load variations in the high-frequency area in the photosensitive drums or the conveyor belt, and consequently to provide a stable load variation correcting control operation or entire driving controlling operation. Consequently, it becomes possible to easily prevent slipping. Here, in the case when the flywheel is attached to the rotary axis of the photosensitive drum or the driving roller, if this is attached directly to the rotary axis of the photosensitive drum, the resulting defect is that the image formation apparatus becomes heavier.

In order to eliminate this defect, for example, as illustrated in FIG. 32, a flywheel 1601 is indirectly attached to the photosensitive drum (photosensitive drum C901, in the Figure) through a torque transmitting roller 1602. In the structure shown in FIG. 32, as compared with a case in which the inertia load is attached to the same axis of the photosensitive drum, the inertia moment of the flywheel 1601 viewed from the driving axis of the driving axis of the photosensitive drum is represented by a square of the radii of the photosensitive drum C901 and the transmitting roller 1602. Therefore, a comparatively light weight flywheel can be used so as to obtain a required inertia moment so that it is possible to achieve a light-weight image formation apparatus.

Moreover, with respect to the structure of the flywheel, the heavier the outer circumferential portion, the greater the inertia to be given to the photosensitive drum. For this reason, the outer circumferential portion of the flywheel is made thicker than the inner circumferential portion thereof so that it is possible to obtain a lightweight apparatus while obtaining an inertia required.

Moreover, in the image formation apparatus of the fifth, sixth and seventh embodiments, the rotation angle detecting encoder 908 for detecting the rotation angle as an absolute value may be installed in the conveyor belt driving roller 906. Alternatively, in the image formation apparatus of the present invention, an encoder (belt shift amount detecting encoder), which generates a pulse each time the conveyor belt 915 shifts a predetermined length by detecting the reference mark put on the conveyor belt 915 using the leading position detector 909, may be installed.

Moreover, in the fifth, sixth and seventh embodiments, the rotation angle detecting encoder 908 is attached to the conveyor belt driving roller 906, and based upon the rotation angle detected by the rotation angle detecting encoder 908, the shifting velocity of the conveyor belt is controlled; however, for example, a rotation reference position detecting means or an encoder attached to the photosensitive drum detects a velocity signal, and the shifting velocity of the conveyor belt may be controlled by this signal.

Moreover, in the fifth, sixth and seventh embodiments, rollers are used as the photosensitive drums, and an endless belt is used as the conveyor belt; however, the present invention is not intended to be limited by these; and the present invention may be applied to any system in which: at least one rotary member and a belt that is pressed onto the rotary member and shifted are provided, and provision is made so as to operate these integrally in a stable manner.

Moreover, the present invention may be applied to, for example, an image formation apparatus of the multi-writing system in which a plurality of beams are used to write latent images onto respective photosensitive drums.

In accordance with the fifth, sixth and seventh embodiments, it is possible to provide an image formation apparatus which is less susceptible to slipping between the photosensitive drum and the conveyor belt, and can provide an image that is free from color offsets in a stable manner. This is because the present invention makes it possible to provide a controlling method and a device thereof for accurately canceling loads imposed on the photosensitive drum and the conveyor belt without causing slipping.

As described above, in the present invention, based upon the amount of eccentricity of the photosensitive drum, the eccentric rotation angle and the radius of the photosensitive drum, the distortion and color offset in the toner image that has been transferred are corrected so that, even when high resolution is required for forming an image, it is possible to sufficiently prevent the distortion and color offset in the sub-scanning direction of the image.

Moreover, the present invention makes it possible to precisely find an error in transfer positions of toner images between the cases of the ideal-shaped photosensitive drum and the actual photosensitive drum; therefore, even when high resolution is required for forming an image, it is possible to sufficiently prevent the distortion and color offset in the sub-scanning direction of the image.

Moreover, the present invention makes it possible to precisely find an error in transfer positions of toner images between the cases of the ideal-shaped photosensitive drum and the actual photosensitive drum; therefore, even when high resolution is required for forming an image, it is possible to sufficiently prevent the distortion and color offset in the sub-scanning direction of the image.

The present invention makes it possible to absorb errors in the assembling positions of the photosensitive drums, etc., therefore, even when high resolution is required for forming an image, it is possible to sufficiently prevent the distortion and color offset in the sub-scanning direction of the image.

Moreover, even when high resolution is required for forming an image, the present invention makes it possible to sufficiently prevent the distortion and color offset in the sub-scanning direction of the image, by using an optical writing device having the same hardware structure as a conventional apparatus.

Furthermore, even when high resolution is required for forming an image, the present invention makes it possible to sufficiently prevent the distortion and color offset in the sub-scanning direction of the image, by correcting image data using an optical writing device having the same hardware structure as a conventional apparatus.

Moreover, since main-scanning images that are scanned by a polygon mirror are stably outputted without interruption, it is possible to obtain an image with high quality.

Furthermore, it is possible to make deviations in the sub-scanning pitch due to eccentricities in the photosensitive drum less conspicuous.

Moreover, main-scanning image data can be outputted in the same manner as in the case when there are neither eccentricities in the photosensitive drum nor deviations in the radius of the drum diameter.

Even when there are eccentricities in the photosensitive drum, if the transporting member is shifted at a constant velocity, the rotation angle of the photosensitive drum is made constant; therefore, the shifting operations of the photosensitive drum and the transporting member can be detected by a single sensor so that it is possible to cut production costs, and also to make correction data for correcting distortion and color offsets in the sub-scanning direction of an image with high precision.

Moreover, it is possible to reduce degradation in an image due to variations in the sub-scanning pitch of an electrostatic latent image, caused by variations in the linear velocity at the exposure position of each of the photosensitive drums due to eccentricities thereof.

Furthermore, the angular velocity of the rotary member such as a photosensitive drum is maintained constant more positively. Since load variations transmitted to the belt are reduced, it is possible to prevent slipping that might occur between the rotary member such as a photosensitive drum and a sheet of paper or the belt. Therefore, when this device is applied to an image formation apparatus, it becomes possible to form an image free from offsets with higher image quality.

Moreover, it is possible to prevent an increase in the number of parts, and consequently to prevent the image formation apparatus, etc. becoming bulky.

It is possible to miniaturize the load correcting means for the rotary member such as a photosensitive drum or the belt load correcting means.

Moreover, the load variations imposed on the rotary member such as a photosensitive drum can be corrected for each of the rotary members such as photosensitive drums; therefore, it is possible to reduce the dislocation of the rotary member such as a photosensitive drum with high precision, and also to prevent slipping that might occur between the rotary member such as a photosensitive drum and a sheet of paper or the belt. Therefore, when this device is applied to an image formation apparatus, it becomes possible to form an image free from offsets with higher image quality.

Moreover, it is possible to control the driving process of an image formation apparatus more stably. For this reason, when this device is applied to an image formation apparatus, it becomes possible to form an image free from offsets with higher image quality.

Furthermore, since the high-frequency components of the load variations can be reduced, it is possible to improve the controlling property. Therefore, when this device is applied to an image formation apparatus, it becomes possible to form an image with higher image quality.

Since the high-frequency components of the load variations can be eliminated with a small inertia load, it is possible to prevent the image formation apparatus from becoming bulky.

Moreover, even when there are eccentricities in the rotary member, if the belt is shifted at a constant velocity, the rotation angular velocity of the rotary member such as a photosensitive drum is made constant. Therefore, in the case when a plurality of rotary members are installed, the rotation angle detection of the rotary members or the belt shift detection can be carried out at only any one portion that is allowed to have a detecting function, and the rotation angle of the rotary member or the belt or the shift position of the other members can be estimated.

Moreover, it is possible to prevent slipping that might occur between the photosensitive drum and the belt or a sheet of paper, and even when there are eccentricities in the photosensitive drum or deviations in the radius thereof, if the transporting member is shifted at a constant velocity, the rotation angle of the photosensitive drum is made constant; therefore, it is possible to easily form an image that is free from image distortion or color offsets.

Moreover, based upon information related to eccentricities, information related to the radius of the photosensitive drum or information related to the distance between the respective photosensitive drums, a plurality of photosensitive drums can be positioned independently; therefore, the varied phases in the line density of latent images that occur upon application of an exposing beam on the photosensitive drum with a constant interval due to the eccentricities in the photosensitive drums can be made coincident with each other when colors are superposed, thereby making it possible to improve the quality of a color image.

Moreover, material for preventing slipping between the photosensitive drum and the belt, the photosensitive drum and a sheet of paper, or the sheet of paper and the conveyor belt, and means for solving the problem of irregularities in density in an image are used in a shared manner; therefore, it is possible to achieve high-quality images without causing high costs.

Furthermore, simply by selecting the exposure position, the irregularities in density in an image can be automatically corrected; thus, since no additional mechanisms are needed, it is possible to achieve high-quality images without causing high costs.

It is possible to provide means which, even when at least one rotary member and a belt is provided and there are load variations in them, allows these members to move smoothly in an integral manner, and which, even when there are eccentricities in the rotary member, allows the belt to move stably at a constant speed, and when this means is applied to an image formation apparatus, it is possible to provide an improved image formation apparatus and a controlling method for an image formation apparatus in which, independent of the states of respective image formation apparatuses, such as eccentricities due to deviations in the photosensitive drum at the time of assembling and deviations in the radius of the photosensitive drum, respective toner images are transferred on a sheet of paper without causing positional offsets to form an image with high quality.

Moreover, since the control unit controls the operations of the driving-roller drive unit and the rotary member driving unit in accordance with load variations in the belt, the rotary member and the belt are respectively controlled and driven based upon the load transmitted from the rotary member to the belt; therefore, it is possible to eliminate slipping of the belt. The resulting image formation apparatus is readily applied to a printing process with high image quality.

Moreover, since the detection is carried out without the necessity of any special devices, the load imposed on the belt can be detected by using simple devices.

Furthermore, simply by detecting the current supplied to the driving-roller drive unit, the load imposed on the belt can be detected; therefore, the load of the belt can be detected by using simple devices.

Since the identifying signal generation unit for generating an identifying signal that makes it easier to detect the load variations in the belt, it is possible to easily detect which rotary member generates the load variations in question simply by using a simple structure.

Moreover, since a sine wave is used as the identifying signal, it is possible to easily detect which rotary member generates the load variations in question simply by using a simple structure.

Furthermore, since the identifying signal is applied in different timing to each of the rotary members, it is possible to easily identify the load variations for each rotary member.

Moreover, since the sine wave has a different frequency for each of the rotary members, it is possible to easily identify the load variations in the respective rotary members.

Furthermore, an inertial applying unit which applies inertia load to either of the driving-roller drive unit and the rotary member driving unit is installed; therefore, it is possible to lower the frequency band in the velocity variations in the belt caused by the load variations, and consequently to provide a stable controlling operation for further reducing slipping on the belt.

Moreover, even when there are deviations in the shape of each rotary member, it is possible to prevent the occurrence of slipping between the rotary member and the belt, between the rotary member and a sheet of paper, or between the sheet of paper and the belt.

Moreover, even when there are deviations in the radius of each rotary member, it is possible to prevent the occurrence of slipping between the rotary member and the belt, between the rotary member and a sheet of paper, or between the sheet of paper and the belt.

Furthermore, without the necessity of installing a new radius measuring unit for the rotary member, the existing means for detecting the rotation angle and the velocity and information from the means for measuring the distance of the shift of the belt and for detecting the belt shifting velocity are used for generating a velocity controlling reference signal; therefore, it is possible to provide a simpler image formation apparatus, etc.

Furthermore, even when the number of pulses from the velocity detector is one for each rotation upon detection by the rotation angle, the rotary member velocity reference signal, which is compared with an analog signal successively outputted from the velocity detection unit of the rotary member, is generated so as to provide a controlling operation. In other words, the influences due to the deviations in the radium of the rotary member can be reduced by comparing the pulse signals, and a stable controlling operation can be achieved by comparing the analog signals; therefore, it is possible to provide a stable rotary member velocity controlling operation for preventing slipping on the belt.

Moreover, since the control errors of the rotary member is detected as a load directly imposed on the belt, the correction can be carried out with higher precision; thus, it is possible to provide an apparatus that is less susceptible to slipping.

Furthermore, even when there are eccentricities of the rotary member or deviations in the diameter, the above-mentioned controlling operation is achieved with high precision; therefore, it is possible to achieve a stable apparatus that is free from slipping.

Thus, it is possible to form an image that is free from image distortion or color offsets stably.

Since the operations of the driving roller and the rotary member are controlled in response to the load variations in the belt, the rotary member and the belt are driven and controlled based upon the load transmitted from the rotary member to the belt, it is possible to eliminate slipping on the belt. In the image formation method, it is readily applied to a printing process with high image quality.

Furthermore, simply by detecting the current supplied to the driving-roller drive stage, the load imposed on the belt can be detected; therefore, the load of the belt can be detected by using simple devices.

Since the identifying signal that makes it easier to detect the load variations in the belt is generated, it is possible to easily detect which rotary member generates the load variations in question simply by using a simple structure.

Moreover, since a sine wave is used as the identifying signal, it is possible to easily detect which rotary member generates the load variations in question simply by using a simple structure.

Furthermore, since the identifying signal is applied in different timing to each of the rotary members, it is possible to easily identify the load variations for each rotary member.

Moreover, since the sine wave has a different frequency for each of the rotary members, it is possible to easily identify the load variations in the respective rotary members.

Furthermore, a stage for applying an inertia load to either of the driving-roller drive unit and the rotary member driving unit is provided; therefore, it is possible to lower the frequency band in the velocity variations in the belt caused by the load variations, and consequently to provide a stable controlling operation for further reducing slipping on the belt.

Moreover, even when there are deviations in the shape of each rotary member, it is possible to prevent the occurrence of slipping between the rotary member and the belt, between the rotary member and a sheet of paper, or between the sheet of paper and the belt.

Moreover, even when there are deviations in the radius of each rotary member, it is possible to prevent the occurrence of slipping between the rotary member and the belt, between the rotary member and a sheet of paper, or between the sheet of paper and the belt.

Furthermore, without the necessity of installing a new radius measuring unit for the rotary member, the existing means for detecting the rotation angle and the velocity and information from the means for measuring the distance of the shift of the belt and for detecting the belt shifting velocity are used for generating a velocity controlling reference signal; therefore, it is possible to provide a simpler image formation method.

Furthermore, even when the number of pulses from the velocity detector is one for each rotation upon detection by the rotation angle, the rotary member velocity reference signal, which is compared with an analog signal successively outputted from the velocity detection stage of the rotary member, is generated so as to provide a controlling operation. In other words, the influences due to the deviations in the radium of the rotary member can be reduced by comparing the pulse signals, and a stable controlling operation can be achieved by comparing the analog signals; therefore, it is possible to provide a stable rotary member velocity controlling operation for preventing slipping on the belt.

Moreover, since the control errors of the rotary member is detected as a load directly imposed on the belt, the correction can be carried out with higher precision; thus, it is possible to provide a stage that is less susceptible to slipping.

The present document incorporates by reference the entire contents of Japanese priority document, 2000-86014 filed in Japan on Mar. 27, 2000, 2000-156933 filed in Japan on May 26, 2000, 2000-169516 filed in Japan on Jun. 6, 2000, and 2000-204531 filed in Japan on Jul. 6, 2000.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image formation apparatus comprising:
at least one photosensitive drum;
an optical writing device which carries out an optical writing process in a main-scanning direction on the outer surface of the at least one photosensitive drum at least line by line;
a developing device which develops an electrostatic latent image optically written on the at least one photosensitive drum into a toner image by using toner;
a paper conveyor belt which transfers a sheet to receive the toner image located on the at least one photosensitive drum, that is shifted in synchronism with the at least one photosensitive drum while being pressed onto the at least one photosensitive drum;
a rotation angle detection unit which detects a rotation angle of the at least one photosensitive drum directly or indirectly;
an eccentricity detection unit which detects an eccentric position from the rotary axis of the at least one photosensitive drum located in the center of a circle cross-section of the at least one photosensitive drum; and
a correction unit which, based upon results of detection by the rotation angle detection unit and the eccentricity detection unit, finds an amount of eccentricity of the at least one photosensitive drum, an eccentric rotation angle and a radius of the at least one photosensitive drum, and based upon resulting values, compensates for a distortion and a color offset of a toner image before the transfer to a sheet.

2. The image formation apparatus according to claim 1, wherein the correction unit finds an error between toner images at transfer positions of the sheet on the paper conveyor belt after a transferring process, the toner images being respectively derived from the at least one photosensitive drum in an ideal shape and the at least one photosensitive drum in an actual shape, and based upon the error, compensates for a distortion and a color offset of a toner image before the transfer to the sheet.

3. The image formation apparatus according to claim 2, wherein supposing that a shift amount of an exposed image from an ideal state thereof is d, the eccentric amount is $\epsilon$, the eccentric rotation angle is $\theta$, the radius of the at least one photosensitive drum is R and a radius of the at least one photosensitive drum at the time when the at least one photosensitive drum has an ideal shape is $R_0$, an exposure position on the at least one photosensitive drum having the ideal shape is located with an angle $(\pi-z)$ in the drum rotation direction of the at least one photosensitive drum from the transfer position of the at least one photosensitive drum of the ideal shape, with respect to the exposure position on the at least one photosensitive drum by the optical writing device, said shift amount d is found based upon the following equation:

$$d=\pi(R_0-R)+R\sin^{-1}\{(\epsilon/R)\cos\theta\}+z(R_0-R).$$

4. The image formation apparatus according to claim 1, wherein the correction unit detects an error between installation positions of the at least one photosensitive drum and at least one of the optical writing device, developing device and paper conveyor belt, and based upon the error, corrects a distortion and a color offset in the toner image.

5. The image formation apparatus according to claim 1, wherein the correction unit selects appropriate data from image data that modulates an exposing light beam outputted from the optical writing device and controls the data so as to correct a distortion and a color offset in the toner image.

6. The image formation apparatus according to claim 5, wherein an optical writing position on the at least one photosensitive drum in a sub-scanning direction is fixed, and among interpolation image data that has been obtained by subjecting an original image data to a positional interpolation process at least either in the sub-scanning direction or in the main-scanning direction, the correction unit selects appropriate data and carries out a controlling operation.

7. The image formation apparatus according to claim 6, wherein the optical writing device main-scans the at least one photosensitive drum by deflecting a light beam released from a light source by using a polygon mirror that is driven to rotate at a constant velocity by a polygon motor, with the optical writing position being fixed on the at least one photosensitive drum, and the correction unit outputs the image data in synchronized timing with a start of main-scanning by the polygon mirror.

8. The image formation apparatus according to claim 7, wherein the correction unit carries out an optical writing operation by changing optical recording conditions in response to the peripheral velocity of the at least one photosensitive drum.

9. The image formation apparatus according to claim 5, wherein the correction unit controls an optical writing position on the outer surface of the at least one photosensitive drum so as not to select the appropriate data of image data for modulating the exposing beam outputted by the optical writing device.

10. The image formation apparatus according to claim 9, wherein a contact portion between the paper conveyor belt and the at least one photosensitive drum forms an apex on a round cross section of the at least one photosensitive drum in the paper conveyor belt direction.

11. The image formation apparatus according to claim 9, wherein the paper conveyor belt presses a sheet of paper onto the at least one photosensitive drum to transfer the toner image formed on the at least one photosensitive drum.

12. The image formation apparatus according to claim 1, wherein a contact portion between the paper conveyor belt, the sheet or the paper conveyor belt and the photosensitive drum forms an apex on a round cross section of the at least one photosensitive drum in an paper conveyor belt direction.

13. The image formation apparatus according to claim 1, wherein the at least one photosensitive drum comprises a plurality of photosensitive drums aligned in one row on the paper conveyor belt in the shifting direction of the paper conveyor belt, and when toner images respectively formed on the photosensitive drums are transferred and superposed, the phases between the eccentricities of the photosensitive drums and positions of electrostatic latent images respectively formed on the photosensitive drums are made virtually coincident with each other with respect to the photosensitive drums so that the phases in variations in density of transferred images caused by the eccentricities are made coincident with respect to the photosensitive drums.

14. The image formation apparatus according to claim 1, further comprising an image reading device which reads an image of an original, wherein image formation is carried out based upon the image data thus read.

* * * * *